(12) United States Patent
Karafin et al.

(10) Patent No.: US 12,228,766 B2
(45) Date of Patent: Feb. 18, 2025

(54) ENERGY RELAYS WITH TRAVERSE ENERGY LOCALIZATION

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 18/212,446

(22) Filed: Jun. 21, 2023

(65) Prior Publication Data
US 2023/0408758 A1    Dec. 21, 2023

Related U.S. Application Data

(63) Continuation of application No. 17/135,952, filed on Dec. 28, 2020, now Pat. No. 11,740,402, which is a
(Continued)

(51) Int. Cl.
*G02B 6/02*    (2006.01)
*F21V 8/00*    (2006.01)
(Continued)

(52) U.S. Cl.
CPC ....... *G02B 6/0096* (2013.01); *G02B 6/02042* (2013.01); *G02B 6/023* (2013.01);
(Continued)

(58) Field of Classification Search
CPC . G02B 6/04; G02B 6/08; G02B 6/023; G02B 6/29325; G02B 30/25; G02B 30/34; G02B 30/56; G02B 30/00; G02B 3/0056; G02B 3/08; G02B 5/32; G02B 25/00; G02B 25/002; G02B 27/01; G02B 27/0103;
(Continued)

(56) References Cited

U.S. PATENT DOCUMENTS

| | | |
|---|---|---|
| 947,702 A | 1/1910 | Rowley |
| 3,505,046 A | 4/1970 | Phaneuf |

(Continued)

FOREIGN PATENT DOCUMENTS

| | | |
|---|---|---|
| CA | 979696 A | 12/1975 |
| CN | 1046998 A | 11/1990 |

(Continued)

OTHER PUBLICATIONS

EP-19738344.1 European Exam Report of European Patent Office dated Aug. 9, 2023.
(Continued)

*Primary Examiner* — Michael P Mooney

(57) ABSTRACT

Disclosed are relay elements exhibiting transverse localization. The relay elements may include a relay element body having one or more structures, where the structures can be coupled in series, in parallel and/or in stacked configurations. The structures may have multiple surfaces such that energy waves propagating therethrough the relay elements may experience spatial magnification or de-magnification.

20 Claims, 33 Drawing Sheets

Related U.S. Application Data continuation of application No. 16/063,513, filed as application No. PCT/US2017/042275 on Jul. 14, 2017, now Pat. No. 10,877,210.

(60) Provisional application No. 62/507,500, filed on May 17, 2017, provisional application No. 62/366,076, filed on Jul. 24, 2016, provisional application No. 62/362,602, filed on Jul. 15, 2016.

(51) Int. Cl.

| | | |
|---|---|---|
| *G02B 6/04* | (2006.01) | |
| *G02B 6/08* | (2006.01) | |
| *G02B 6/293* | (2006.01) | |
| *G02B 27/00* | (2006.01) | |
| *G02B 27/01* | (2006.01) | |
| *G02B 27/09* | (2006.01) | |
| *G02B 27/10* | (2006.01) | |
| *G02B 30/00* | (2020.01) | |
| *G02B 30/33* | (2020.01) | |
| *H04N 13/388* | (2018.01) | |
| G02B 3/00 | (2006.01) | |
| G02B 3/08 | (2006.01) | |
| G02B 5/32 | (2006.01) | |
| G02B 25/00 | (2006.01) | |
| G02B 30/56 | (2020.01) | |
| G03H 1/00 | (2006.01) | |
| G03H 1/02 | (2006.01) | |
| G03H 1/22 | (2006.01) | |
| G06F 3/01 | (2006.01) | |
| G10K 11/26 | (2006.01) | |
| G21K 1/00 | (2006.01) | |
| H04N 5/89 | (2006.01) | |
| H04N 13/344 | (2018.01) | |
| H04N 23/957 | (2023.01) | |

(52) U.S. Cl.
CPC ............... *G02B 6/04* (2013.01); *G02B 6/08* (2013.01); *G02B 6/29325* (2013.01); *G02B 27/0172* (2013.01); *G02B 27/0955* (2013.01); *G02B 27/0994* (2013.01); *G02B 27/1066* (2013.01); *G02B 30/00* (2020.01); *G02B 30/33* (2020.01); *H04N 13/388* (2018.05); G02B 3/0056 (2013.01); G02B 3/08 (2013.01); G02B 5/32 (2013.01); G02B 6/0229 (2013.01); G02B 6/02295 (2013.01); G02B 25/00 (2013.01); G02B 25/002 (2013.01); G02B 27/0093 (2013.01); G02B 27/0103 (2013.01); G02B 2027/0105 (2013.01); G02B 2027/0134 (2013.01); G02B 2027/0174 (2013.01); G02B 27/1073 (2013.01); G02B 30/56 (2020.01); G03H 1/0005 (2013.01); G03H 2001/0088 (2013.01); G03H 1/0248 (2013.01); G03H 1/2202 (2013.01); G03H 1/2294 (2013.01); G03H 2223/19 (2013.01); G06F 3/01 (2013.01); G06F 3/013 (2013.01); G10K 11/26 (2013.01); G21K 1/00 (2013.01); H04N 5/89 (2013.01); H04N 13/344 (2018.05); H04N 23/957 (2023.01); Y02E 10/52 (2013.01)

(58) Field of Classification Search
CPC ............ G02B 27/0101; G02B 27/0172; G02B 27/095; G02B 27/0955; G02B 27/0994; G02B 27/1066; G02B 27/1073; H04N 13/344; H04N 13/388; H04N 5/22541; H04N 5/89; G03H 1/00; G03H 1/0005; G03H 1/04; G03H 1/0248; G03H 1/2202; G03H 1/2294; G06F 3/01; G06F 3/013; G06F 3/011; G10K 11/26; G21K 1/00

See application file for complete search history.

(56) References Cited

U.S. PATENT DOCUMENTS

| | | |
|---|---|---|
| 3,567,549 A | 3/1971 | Hoffmeister et al. |
| 3,626,040 A | 12/1971 | Nagao et al. |
| 3,859,071 A | 1/1975 | Beasley et al. |
| 3,870,399 A | 3/1975 | Randall et al. |
| 3,961,931 A | 6/1976 | Nakagawa et al. |
| 4,087,159 A | 5/1978 | Ulrich |
| 4,099,833 A | 7/1978 | Tosswill |
| 4,134,642 A | 1/1979 | Kapron et al. |
| 4,143,234 A | 3/1979 | Johnson et al. |
| 4,149,772 A | 4/1979 | Iyengar et al. |
| 4,265,515 A | 5/1981 | Kao |
| 4,372,769 A | 2/1983 | Hicks, Jr. |
| 5,371,826 A | 12/1994 | Friedman |
| 5,374,976 A | 12/1994 | Spannenburg |
| 5,465,308 A | 11/1995 | Hutcheson et al. |
| 5,479,550 A | 12/1995 | Nishioka et al. |
| 5,481,385 A | 1/1996 | Zimmerman et al. |
| 5,519,801 A | 5/1996 | Noane et al. |
| 5,553,184 A | 9/1996 | Eikelmann et al. |
| 5,822,125 A | 10/1998 | Meyers |
| 5,949,581 A | 9/1999 | Kurtenbach et al. |
| 5,974,215 A | 10/1999 | Bilbro et al. |
| 6,013,072 A | 1/2000 | Winston et al. |
| 6,041,154 A | 3/2000 | Ono et al. |
| 6,384,400 B1 | 5/2002 | Albagli et al. |
| 6,487,351 B1 | 11/2002 | Cryan et al. |
| 6,611,648 B2 | 8/2003 | Kumar et al. |
| 6,614,972 B1 | 9/2003 | Lundin |
| 6,680,761 B1 | 1/2004 | Greene et al. |
| 7,016,516 B2 | 3/2006 | Rhoads |
| 7,054,850 B2 | 5/2006 | Matsugu |
| 7,235,047 B2 | 6/2007 | MacAulay et al. |
| RE39,864 E | 10/2007 | Athale et al. |
| 7,329,982 B2 | 2/2008 | Conner et al. |
| 7,773,849 B2 | 8/2010 | Shani |
| 8,149,265 B2 | 4/2012 | Smalley et al. |
| 8,406,595 B2 | 3/2013 | Hayashi |
| 8,477,906 B2 | 7/2013 | Morse et al. |
| 8,619,177 B2 | 12/2013 | Perwass et al. |
| 8,736,675 B1 | 5/2014 | Holzbach et al. |
| 8,743,466 B2 | 6/2014 | Yamamoto |
| 9,063,289 B1 | 6/2015 | Farmer et al. |
| 9,158,080 B2 | 10/2015 | Logunov et al. |
| 9,494,738 B1 | 11/2016 | Farmer et al. |
| 9,612,395 B2 | 4/2017 | Karbasivalashani et al. |
| 9,813,673 B2 | 11/2017 | Smits |
| 9,835,812 B2 | 12/2017 | Yadlowsky |
| 9,945,985 B2 | 4/2018 | Morasse |
| 10,009,597 B2 | 6/2018 | Karafin et al. |
| 10,052,831 B2 | 8/2018 | Welker et al. |
| 10,094,974 B2 | 10/2018 | Chen et al. |
| 10,132,993 B2 | 11/2018 | Buczynski et al. |
| 10,432,919 B2 | 10/2019 | Lapstun |
| 10,488,584 B2 | 11/2019 | Karafin et al. |
| 10,551,628 B2 | 2/2020 | Karafin et al. |
| 10,560,689 B2 | 2/2020 | Lapstun |
| 10,860,142 B1 | 12/2020 | Northcott et al. |
| 10,877,210 B2 * | 12/2020 | Karafin .................. G06F 3/011 |
| 10,884,142 B2 | 1/2021 | Welker |
| 10,884,251 B2 | 1/2021 | Karafin et al. |
| 10,989,869 B2 | 4/2021 | Karafin et al. |
| 10,996,393 B2 | 5/2021 | Karafin et al. |
| 11,221,670 B2 | 1/2022 | Karafin et al. |
| 11,237,307 B2 | 2/2022 | Karafin et al. |
| 11,556,015 B2 | 1/2023 | Karafin et al. |
| 2001/0002865 A1 | 6/2001 | Lipponen et al. |
| 2001/0028356 A1 | 10/2001 | Balogh |
| 2002/0009261 A1 | 1/2002 | Bhagavatula et al. |
| 2002/0021501 A1 | 2/2002 | Kawashima et al. |
| 2002/0048427 A1 | 4/2002 | Chiarulli et al. |

(56) References Cited

U.S. PATENT DOCUMENTS

| | | |
|---|---|---|
| 2002/0172478 A1 | 11/2002 | Sahlin |
| 2003/0026567 A1 | 2/2003 | Cryan et al. |
| 2003/0030912 A1 | 2/2003 | Gleckman et al. |
| 2003/0137730 A1 | 7/2003 | Fridman et al. |
| 2004/0001679 A1 | 1/2004 | Sisodia et al. |
| 2004/0108806 A1 | 6/2004 | Cok et al. |
| 2005/0041944 A1 | 2/2005 | Cryan et al. |
| 2006/0028400 A1 | 2/2006 | Lapstun et al. |
| 2006/0102604 A1 | 5/2006 | Dane et al. |
| 2006/0146428 A1 | 7/2006 | Lim et al. |
| 2006/0165358 A1 | 7/2006 | Trebst et al. |
| 2006/0191566 A1 | 8/2006 | Schaafsma |
| 2006/0241572 A1 | 10/2006 | Zhou |
| 2006/0256415 A1 | 11/2006 | Holmes et al. |
| 2007/0097108 A1 | 5/2007 | Brewer |
| 2007/0238296 A1 | 10/2007 | Shimizu |
| 2007/0291504 A1 | 12/2007 | Lu |
| 2008/0023137 A1 | 1/2008 | Jiang et al. |
| 2008/0087047 A1 | 4/2008 | Bayindir et al. |
| 2008/0144174 A1 | 6/2008 | Lucente et al. |
| 2008/0170293 A1 | 7/2008 | Lucente et al. |
| 2008/0285125 A1 | 11/2008 | Lee et al. |
| 2009/0040294 A1 | 2/2009 | Smalley et al. |
| 2009/0085831 A1 | 4/2009 | Odoi et al. |
| 2009/0148098 A1 | 6/2009 | Lewis et al. |
| 2009/0164397 A1 | 6/2009 | Kwok |
| 2009/0220201 A1 | 9/2009 | Reichel et al. |
| 2009/0266992 A1 | 10/2009 | Beekman |
| 2009/0273538 A1 | 11/2009 | Smith et al. |
| 2009/0314929 A1 | 12/2009 | Lee et al. |
| 2010/0119200 A1 | 5/2010 | Tabor |
| 2010/0265457 A1 | 10/2010 | Chomyn et al. |
| 2010/0272234 A1 | 10/2010 | Morse et al. |
| 2010/0278480 A1 | 11/2010 | Vasylyev |
| 2011/0012895 A1 | 1/2011 | Lucente et al. |
| 2011/0094269 A1 | 4/2011 | Mukasa |
| 2011/0114831 A1 | 5/2011 | Grier |
| 2011/0169832 A1 | 7/2011 | Brown et al. |
| 2012/0050562 A1 | 3/2012 | Perwass et al. |
| 2012/0268950 A1 | 10/2012 | Parkyn et al. |
| 2012/0313839 A1 | 12/2012 | Smithwick et al. |
| 2013/0069933 A1 | 3/2013 | Smithwick et al. |
| 2013/0076930 A1 | 3/2013 | Border et al. |
| 2013/0082905 A1 | 4/2013 | Ranieri et al. |
| 2013/0088785 A1 | 4/2013 | Yamamoto |
| 2013/0140916 A1 | 6/2013 | Dunlap et al. |
| 2013/0163089 A1 | 6/2013 | Bohn |
| 2013/0195410 A1 | 8/2013 | Karbasivalashani et al. |
| 2013/0208082 A1 | 8/2013 | Williams et al. |
| 2013/0265485 A1 | 10/2013 | Kang |
| 2014/0035959 A1 | 2/2014 | Lapstun |
| 2014/0126322 A1 | 5/2014 | Cipolla et al. |
| 2014/0132694 A1 | 5/2014 | Shacham et al. |
| 2014/0184496 A1 | 7/2014 | Gribetz et al. |
| 2014/0192087 A1 | 7/2014 | Frost |
| 2014/0293385 A1 | 10/2014 | Smithwick |
| 2014/0300694 A1 | 10/2014 | Smalley et al. |
| 2014/0300695 A1 | 10/2014 | Smalley et al. |
| 2014/0300709 A1 | 10/2014 | Futterer et al. |
| 2014/0307179 A1 | 10/2014 | Zhao et al. |
| 2014/0371353 A1 | 12/2014 | Mitchell et al. |
| 2015/0085464 A1 | 3/2015 | Suzuki |
| 2015/0146132 A1 | 5/2015 | Katsuta et al. |
| 2015/0201186 A1 | 7/2015 | Smithwick |
| 2015/0212274 A1 | 7/2015 | Kopp et al. |
| 2015/0219940 A1 | 8/2015 | Kim et al. |
| 2015/0241608 A1 | 8/2015 | Shian et al. |
| 2015/0247976 A1 | 9/2015 | Abovitz et al. |
| 2015/0277378 A1 | 10/2015 | Smithwick et al. |
| 2016/0004055 A1 | 1/2016 | Delsaut et al. |
| 2016/0070059 A1 | 3/2016 | Chen et al. |
| 2016/0139402 A1 | 5/2016 | Lapstun |
| 2016/0170372 A1 | 6/2016 | Smithwick |
| 2016/0175701 A1 | 6/2016 | Froy et al. |
| 2016/0209657 A1 | 7/2016 | Popovich et al. |
| 2016/0274539 A1 | 9/2016 | Smithwick |
| 2016/0282614 A1 | 9/2016 | Zagolla et al. |
| 2016/0282808 A1 | 9/2016 | Smalley |
| 2017/0016996 A1 | 1/2017 | Welker et al. |
| 2017/0209121 A1 | 7/2017 | Davis et al. |
| 2017/0214907 A1 | 7/2017 | Lapstun |
| 2017/0289530 A1 | 10/2017 | Smithwick et al. |
| 2017/0363805 A1 | 12/2017 | Iwakawa |
| 2018/0063519 A1 | 3/2018 | Smithwick et al. |
| 2018/0084245 A1 | 3/2018 | Lapstun |
| 2018/0356591 A1 | 12/2018 | Karafin et al. |
| 2018/0372926 A1 | 12/2018 | Karafin et al. |
| 2018/0372958 A1 | 12/2018 | Karafin et al. |
| 2019/0004228 A1 | 1/2019 | Bevensee et al. |
| 2019/0004319 A1 | 1/2019 | Karafin et al. |
| 2019/0004326 A1 | 1/2019 | Karafin et al. |
| 2019/0011621 A1 | 1/2019 | Karafin et al. |
| 2019/0227226 A1 | 7/2019 | Abaie et al. |
| 2019/0259320 A1 | 8/2019 | Lapstun |
| 2020/0124746 A1 | 4/2020 | Welker |
| 2020/0394791 A1 | 12/2020 | Pang et al. |
| 2021/0063766 A1 | 3/2021 | Karafin et al. |
| 2021/0253468 A1 | 8/2021 | Wood et al. |

FOREIGN PATENT DOCUMENTS

| | | |
|---|---|---|
| CN | 1717927 A | 1/2006 |
| CN | 1973226 A | 5/2007 |
| CN | 101052910 A | 10/2007 |
| CN | 101095244 A | 12/2007 |
| CN | 101730859 A | 6/2010 |
| CN | 102231044 A | 11/2011 |
| CN | 102591124 A | 7/2012 |
| CN | 103616770 A | 3/2014 |
| CN | 103777455 A | 5/2014 |
| CN | 105334690 A | 2/2016 |
| CN | 105378377 A | 3/2016 |
| CN | 105589185 A | 5/2016 |
| CN | 106233227 A | 12/2016 |
| EP | 1076246 A1 | 2/2001 |
| GB | 474564 A | 11/1937 |
| GB | 1399597 A | 7/1975 |
| GB | 2253070 A | 8/1992 |
| JP | S59105800 A | 6/1984 |
| JP | S60030407 U | 3/1985 |
| JP | H0561417 A | 3/1993 |
| JP | H06258532 A | 9/1994 |
| JP | H08179131 A | 7/1996 |
| JP | H10191496 A | 7/1998 |
| JP | 2000009947 A | 1/2000 |
| JP | 2000347046 A | 12/2000 |
| JP | 2001313959 A | 11/2001 |
| JP | 2003330109 A | 11/2003 |
| JP | 2004078123 A | 3/2004 |
| JP | 2005181460 A | 7/2005 |
| JP | 2005222087 A | 8/2005 |
| JP | 2007098930 A | 4/2007 |
| JP | 2007512954 A | 5/2007 |
| JP | 2008052010 A | 3/2008 |
| JP | 2008058583 A | 3/2008 |
| JP | 2008518473 A | 5/2008 |
| JP | 2009169142 A | 7/2009 |
| JP | 2009169143 A | 7/2009 |
| JP | 2009530661 A | 8/2009 |
| JP | 2010156786 A | 7/2010 |
| JP | 2011090272 A | 5/2011 |
| JP | 2014142368 A | 8/2014 |
| JP | 2015143858 A | 8/2015 |
| JP | 2016518629 A | 6/2016 |
| JP | 7063520 B2 | 5/2022 |
| KR | 101298848 B1 | 8/2013 |
| TW | 200402012 A | 2/2004 |
| TW | 200633258 A | 9/2006 |
| TW | 201527819 A | 7/2015 |
| WO | 0106287 A1 | 1/2001 |
| WO | 0154106 A2 | 7/2001 |
| WO | 2005057670 A2 | 6/2005 |
| WO | 2008048360 A2 | 4/2008 |
| WO | 2008093721 A1 | 8/2008 |

(56) References Cited

FOREIGN PATENT DOCUMENTS

| WO | 2011158752 A1 | 12/2011 |
|---|---|---|
| WO | 2012029081 A1 | 3/2012 |
| WO | 2017007526 A2 | 1/2017 |
| WO | 2017127897 A1 | 8/2017 |
| WO | 2019140348 A2 | 7/2019 |

OTHER PUBLICATIONS

CA-3030873 Office action dated Aug. 10, 2023.
"Plastics—Vocabulary", International Organization for Standardization, Switzerland 1999, ISO 472 2013.
AU-2017296073 Examination Report No. 1 dated Aug. 15, 2018.
AU-2017296234 Examination Report No. 1 dated Jul. 19, 2018.
AU-2017296234 Examination Report No. 2 dated Sep. 24, 2018.
AU-2017297625 Examination Report No. 1 dated Jul. 20, 2018.
AU-2017297625 Examination Report No. 2 dated Sep. 24, 2018.
AU-2017297629 Notice of Acceptance dated Jul. 26, 2018.
AU-2018256628 Examination Report No. 1 dated Jul. 1, 2019.
AU-2019200583 Examination Report No. 1 dated Oct. 17, 2019.
Choi et al., "Multiple-viewing-zone integral imaging using a dynamic barrier array for three-dimensional displays", Optics Express, vol. 11, No. 8, Apr. 21, 2003 (Apr. 21, 2003), p. 927.
CN201780043946.8 First Office Action of the Chinese Patent Office mailed Dec. 22, 2020.
CN201780043946.8 Second Office Action of the Chinese Patent Office mailed Sep. 15, 2021.
CN201780044006.0 First Office Action of the Chinese Patent Office mailed Dec. 16, 2020.
CN201780044008.X First Office Action of the Chinese Patent Office mailed Sep. 29, 2020.
CN201980018280.X First Office Action mailed Jun. 8, 2022.
CN201980018334.2 First Office Action of the Chinese Patent Office mailed Sep. 13, 2022.
CN201980018334.2 Second Office Action of the Chinese Patent Office mailed May 10, 2023.
Davis et al., "Simulation of Anderson localization in a random fiber using a fast Fresnel diffraction algorithm", Optical Engineering, Soc. of Photo-Optical Instrumentation Engineers, Bellingham, vol. 55, No. 6, Jun. 1, 2016 (Jun. 1, 2016), p. 66122.
EA-201892633 Office Action of the Eurasian Patent Office dated Aug. 10, 2020.
EA-201892637 Office Action of the Eurasian Patent Office dated Mar. 6, 2020.
EA-202193101 Notification of the Search Report of the Eurasian Patent Office dated Sep. 16, 2022.
EP-17828596.1 European Extended Search Report of European Patent Office dated Mar. 23, 2020.
EP-17828613.4 European Exam Report of European Patent Office dated Aug. 16, 2021.
EP-17828613.4 European Extended Search Report of European Patent Office dated Mar. 6, 2020.
EP-17828622.5 European Exam Report of European Patent Office dated Aug. 16, 2021.
EP-17828622.5 European Extended Search Report of European Patent Office dated Mar. 6, 2020.
EP-17828628.2 European Extended Search Report of European Patent Office dated Mar. 6, 2020.
EP-17828632.4 European Partial Search Report of European Patent Office dated Feb. 10, 2020.
EP-19738109.8 European Extended Search Report of European Patent Office dated Oct. 18, 2021.
EP-19738344.1 European Extended Search Report of European Patent Office dated Oct. 7, 2021.
EP-19738383.9 European Extended Search Report of European Patent Office dated Oct. 15, 2021.
Fifty years of Anderson localization, Ad Lagendijk, Bart van Tiggelen, and Diederik S. Wiersma, Phsyics Today 62(8), 24 (2009). (Year: 2009).
Gerald L., "Size of Letters Required for Visibility as a Function of Viewing Distance and Observer Visual Acuity," U.S. Department of Commerce/National Bureau of Statistics, Jul. 1983.
International Preliminary Report on Patentability of PCT/US2017/042418 dated Mar. 25, 2019.
International Search Report and Written Opinion of PCT/US2017/042275 dated Dec. 4, 2017.
International Search Report and Written Opinion of PCT/US2017/042418 dated Dec. 20, 2017.
International Search Report and Written Opinion of PCT/US2017/042452 dated Nov. 17, 2017.
International Search Report and Written Opinion of PCT/US2017/042466 dated Nov. 28, 2017.
International Search Report and Written Opinion of PCT/US2017/042470 dated Dec. 28, 2017.
International Search Report and Written Opinion of PCT/US2019/013310 dated May 13, 2019.
International Search Report and Written Opinion of PCT/US2019/013399 dated Jun. 10, 2019.
International Search Report and Written Opinion of PCT/US2019/013552 dated May 2, 2019.
International Search Report and Written Opinion of PCT/US2021/010055 dated May 23, 2022.
JP2019-501428 Non-Final Notice of Reasons for Rejection from the Japan Patent Office mailed Aug. 3, 2021.
JP2019-501531 Non-Final Notice of Reasons for Rejection of the Japan Patent Office dated Sep. 24, 2021.
JP2019-501554 Final Notice of Reasons for Rejection of the Japan Patent Office dated Dec. 6, 2022.
JP2019-501554 Non-Final Notice of Reasons for Rejection of the Japan Patent Office dated Jun. 8, 2021.
JP2019-501554 Non-Final Notice of Reasons for Rejection of the Japan Patent Office dated Mar. 29, 2022.
JP2020-538912 Final Notice of Reasons for Rejection of the Japan Patent Office dated May 30, 2023.
JP2020-538912 Non-Final Notice of Reasons for Rejection from the Japan Patent Office mailed Dec. 6, 2022.
JP2020-538941 Final Notice of Reasons for Rejection of the Japan Patent Office dated May 30, 2023.
JP2020-538941 Non-Final Notice of Reasons for Rejection from the Japan Patent Office mailed Dec. 6, 2022.
JP2022-067992 Non-Final Notice of Reasons for Rejection from the Japan Patent Office mailed Mar. 14, 2023.
Karbasi et al., "Image transport using Anderson localized modes in disordered optical fibers", Proeedings of SPIE, IEEE, US, vol. 8992, Mar. 8, 2014 (Mar. 8, 2014), pp. 89920J-89920J.
KR-10-2019-7004588 Notice of Preliminary Rejection mailed Apr. 25, 2022.
Lewter, "Adjustable Slab Slump Molds—Electric Cone 6 & Other Ways w/ Clay", Oct. 2, 2017 (Oct. 2, 2017) pp. 1-3.
Mafi et al., "Anderson localisation in fibres", 2014 The European Conference on Optical Communication (ECOC), Systematic Paris Region Systems and ICT Cluster, Sep. 21, 2014 (Sep. 21, 2014), pp. 1-3.
Mafi, "Transverse Anderson localization of light: a tutorial", Advances in Optics and Photonics, vol. 7, No. 3, Sep. 30, 2015 (Sep. 30, 2015), p. 459.
NZ-743822 Further Examination Report dated Jun. 11, 2019.
Smith, T.E., "Notebook for Spatial Data Analysis, Part I, Spatial Point Pattern Analysis", (2016) ESE 502, (http://www.seas.upenn.edu/~ese502/#notebook).
TW106123878 Office Action of the Taiwan Patent Office dated Nov. 15, 2021.
Wetzstein et al., "On Plenoptic Multiplexing and Reconstruction", International Journal on Computer Vision (IJCV, vol. 101, No. 2, (20130000), pp. 384-400, URL: https://hal.inria.fr/hal-00876493, (Sep. 26, 2017).
EP-19738109.8 European Exam Report of European Patent Office dated Sep. 12, 2024.
KR-10-2020-7023602 Notice of Preliminary Rejection mailed Apr. 18, 2024.
AU-2019206712 Examination Report No. 2 dated May 28, 2024.

(56) References Cited

OTHER PUBLICATIONS

CN202210077932.0 First Office Action of the Chinese Patent Office mailed Mar. 14, 2024.
EP-17828596.1 European Office Action of European Patent Office dated Oct. 8, 2024.
Karbasi et al., "Observation of transverse Anderson localization in an optical fiber", 2304 Optics Letters, vol. 37, No. 12, Jun. 15, 2012, XP001576281.
TW-112145627 Office Action of the Taiwan Patent Office dated Nov. 20, 2024.

* cited by examiner

SIDE VIEW

ENERGY RELAYS WITH TRAVERSE ENERGY LOCALIZATION

TECHNICAL FIELD

This disclosure generally relates to implementations of ultra-high resolution holographic energy sources, and more specifically, to generalized energy wave relays leveraging the principles of transverse Anderson localization.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike.

SUMMARY

Disclosed are high resolution two-dimensional energy source systems using relay elements for light field and holographic energy sources leveraging optical relays and transverse Anderson localization.

In one embodiment, a device for an energy source system includes a relay element formed of one or more structures, the relay element having a first surface, a second surface, a transverse orientation and a longitudinal orientation. In this embodiment, the first surface has a surface area different than the second surface, and the relay element includes a sloped profile portion between the first surface and the second surface.

In operation, energy waves propagating between the first surface and the second surface travel substantially parallel to the longitudinal orientation due to a substantially higher transport efficiency in the longitudinal orientation than in the transverse orientation, and energy waves passing therethrough the relay element result in spatial magnification or spatial de-magnification.

In one embodiment, the energy waves passing through the first surface has a first resolution, while the energy waves passing through the second surface has a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of about +/−10 degrees relative to the normal to the second surface, irrespective of location on the second surface.

In one embodiment, the one or more structures of the relay element include glass, carbon, optical fiber, optical film, plastic, polymer or mixtures thereof. In another embodiment, the relay element of the device includes a plurality of elements in a stacked configuration in the longitudinal orientation, whereby a first element of the plurality of elements includes the first surface and a second element of the plurality of elements includes the second surface.

In one embodiment, each of the first element and the second element causes spatial magnification of the energy. In another embodiment, each of the first element and the second element causes spatial de-magnification of the energy. In yet another embodiment, the first element causes spatial magnification of the energy and the second element causes spatial de-magnification of the energy. In yet another embodiment, the first element causes spatial de-magnification of the energy and the second element causes spatial magnification of the energy.

In some embodiments, the plurality of elements in the stacked configuration includes a plurality of faceplates. In other embodiments, the plurality of faceplates have different lengths. In some other embodiments, the plurality of faceplates are loose coherent optical relays.

In one embodiment, the sloped profile portion of the relay element can be angled, linear, curved, tapered, faceted or aligned at a non-perpendicular angle relative to a normal axis of the relay element. In some embodiments, the relay element includes randomized refractive index variability such that the energy is localized in the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

In some embodiments, the first surface of the relay element is configured to receive the energy from an energy source unit, the energy source unit having a mechanical envelope having a width different than the width of at least one of the first surface and the second surface. In other embodiments, the mechanical envelope includes a projection system having a lens, and a plurality of energy source panels disposed adjacent to the lens, the plurality of energy source panels being planar, non-planar or combinations thereof.

In one embodiment, the plurality of energy source panels are arranged in various configurations including at least one of tilted, aligned at an angle, staggered, on-axis, off-axis, rotated, parallel, perpendicular, or any combinations thereof. In some embodiments, the plurality of energy source panels are arranged in a radially-symmetrical configuration. In other embodiments, the projection system includes focused energy transmission through a waveguide, and further includes a telecentric lens relay element at an off-aligned angle.

In one embodiment, the device further includes a curved energy source between the relay element and the projection system. In some embodiments, the first surface is planar and the second surface planar, or the first surface is planar and the second surface is non-planar, or the first surface is non-planar and the second surface is planar, or the first surface is non-planar and the second surface is non-planar.

In other embodiments, the first surface is concave and the second surface is concave, or the first surface is concave and the second surface is convex, or the first surface is convex and the second surface is concave, or the first surface is convex and the second surface is convex.

In one embodiment, at least one of the first surface and the second surface is concave. In another embodiment, at least one of the first surface and the second surface is convex.

In one embodiment, an energy source system includes a plurality of relay elements arranged across first and second directions, where each of the plurality of relay elements has a randomized refractive index variability and extends along a longitudinal orientation between first and second surfaces of the respective relay element. In this embodiment, the first and second surfaces of each of the plurality of relay elements extends generally along a transverse orientation defined by the first and second directions, while the longitudinal orientation is substantially normal to the transverse orientation.

In some embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

In one embodiment, the plurality of relay system may be arranged across the first direction or the second direction to form a single tiled surface along the first direction or the second direction, respectively. In some embodiments, the plurality of relay elements are arranged in a matrix having at least a 2×2 configuration, or in other matrices including without limitation 3×3 configuration, 4×4 configuration, 3×10 configuration, among other configurations as can be appreciated by one skilled in the art. In other embodiments, seams between the single tiled surface may be imperceptible at a viewing distance of twice a minimum dimension of the single tiled surface.

In one embodiment, each of the plurality of relay elements is configured to transport energy along the longitudinal orientation, and where the energy waves propagating through the plurality of relay elements higher transport efficiency in the longitudinal orientation than in the transverse orientation due to the randomized refractive index variability such that the energy are localized in the transverse orientation. In some embodiments, the energy waves propagating between the relay elements may travel substantially parallel to the longitudinal orientation due to the substantially higher transport efficiency in the longitudinal orientation than in the transverse orientation. In some embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

In one embodiment, the first and second surfaces of each of the plurality of relay elements of the system, in general, can curve along the transverse orientation. In another embodiment, the plurality of relay elements can be integrally formed across the first and second directions. In yet another embodiment, the plurality of relay elements can be assembled across the first and second directions.

In one embodiment, the plurality of relay system may be arranged across the first direction or the second direction to form a single tiled surface along the first direction or the second direction, respectively. In some embodiments, the plurality of relay elements are arranged in a matrix having at least a 2×2 configuration, or in other matrices including without limitation 3×3 configuration, 4×4 configuration, 3×10 configuration, among other configurations as can be appreciated by one skilled in the art. In other embodiments, seams between the single tiled surface may be imperceptible at a viewing distance of twice a minimum dimension of the single tiled surface.

In some embodiments, the plurality of relay elements include glass, carbon, optical fiber, optical film, plastic, polymer or mixtures thereof. In other embodiments, the plurality of relay elements cause spatial magnification or spatial de-magnification of the energy. In some embodiments, the plurality of relay elements include a plurality of faceplates, where the faceplates can have different lengths or where the faceplates can be loose coherent optical relays.

In one embodiment, each of the plurality of relay elements of the system includes a sloped profile portion between the first and second surface of the respective relay element, and where the sloped profile portion can be angled, linear, curved, tapered, faceted or aligned at a non-perpendicular angle relative to a normal axis of the plurality of relay elements.

In some embodiments, the first surface of each of the plurality of relay elements may be configured to receive the energy from an energy source unit, the energy source unit including a mechanical envelope having a width different than the width of at least one of the first surface and the second surface. In another embodiment, the mechanical envelope includes a projection system having a lens, and a plurality of energy source panels disposed adjacent to the lens, the plurality of energy source panels being planar, non-planar or combinations thereof.

In one embodiment, the energy waves passing through the first surface has a first resolution, while the energy waves passing through the second surface has a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of about +/−10 degrees relative to the normal to the second surface, irrespective of location on the second surface.

In some embodiments, the plurality of energy source panels may be arranged in various configurations including at least one of tilted, aligned at an angle, staggered, on-axis, off-axis, rotated, parallel, perpendicular, or any combinations thereof. In other embodiments, the plurality of energy source panels are arranged in a radially-symmetrical configuration.

In one embodiment, the projection system includes focused energy transmission through a waveguide, and further includes a telecentric lens relay element at an off-aligned angle. In another embodiment, the system further includes a curved energy source between the plurality of relay elements and the projection system.

In one embodiment, an energy source system includes a plurality of energy source units configured to provide an energy surface, the plurality of energy source units having a first pitch, a plurality of relay elements disposed adjacent to an energy source, the plurality of relay elements having a second pitch, the second pitch smaller than the first pitch, where a first energy source unit of the plurality of energy source units is configured to have a first field of view defined by an angular extent of energy propagation paths through the first energy source unit, and where a subset of the plurality of relay elements disposed in the energy propagation paths are configured to redistribute the energy propagation paths such that the angular extent of the energy propagation paths through the subset of the plurality of relay elements have a second field of view wider than the first field of view.

In one embodiment, each of energy source unit of the plurality of energy source units is a pixel. In another embodiment, each energy source unit of the plurality of energy source units is a tapered relay element. In some embodiments, the energy propagation paths are light paths. In other embodiments, the energy source is provided on a surface of the plurality of energy source units.

In one embodiment, the surface on which the energy source is provided on is a virtual surface, where the virtual surface is a surface configured to receive energy relayed from the plurality of energy source units.

In some embodiments, the plurality of relay elements include faceplates, relay elements and optical fibers. In other embodiments, each of the plurality of relay elements is operable to redistribute the energy through the energy propagation paths with higher transport efficiency in the longitudinal orientation than in the transverse orientation due to randomized refractive index variability of the each of the plurality of relay elements such that the energy is localized in the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

In one embodiment, an energy source system includes a plurality of flexible relay elements each configured to transport energy between first and second ends of the respective relay elements, where the first ends of the plurality of flexible relay elements are optically coupled to a plurality of energy source units, the plurality of energy source units being spaced apart from the second ends of the plurality of flexible relay elements, and where the second ends of the plurality of flexible relay elements are bundled to form an aggregated energy surface.

In some embodiments, the plurality of flexible relay elements include a plurality of loose coherent optical relays. In other embodiments, the aggregated energy surface is an end portion of the system, the energy at the end portion being spatially non-magnified relative to the energy from the energy source units. In another embodiment, the aggregated energy surface is an end portion of the system, the energy at the end portion being spatially magnified relative to the energy from the energy source units. In yet another embodiment, the aggregated energy surface is an end portion of the system, the energy at the end portion being spatially de-magnified relative to the energy from the energy source units.

In one embodiment, an energy source system includes a relay element having first and second different materials, the first and second materials being arranged in a substantially repeating internal structure in at least one of a transverse orientation and a longitudinal orientation such that the relay element has a higher transport efficiency in the longitudinal orientation versus the transverse orientation, where energy is operable to be provided to a first end of the relay element, the energy having a first resolution at the first end, where the first end of the relay element is configured to have a pitch of the substantially repeating internal structure in at least one of the transverse orientation and the longitudinal orientation, the pitch approximately equal to or less than the first resolution of the energy at the first end in the transverse orientation, and whereby the energy exiting a second end of the relay element has a second resolution, wherein the second resolution is no less than 50% of the first resolution. In another embodiment, the energy waves, while having a uniform profile when presented to the first surface, may pass through the second surface radiating in every direction with an energy density in the forward direction that substantially fills a cone with an opening angle of about +/−10 degrees relative to the normal to the second surface, irrespective of location on the second surface.

In one embodiment, the relay element includes a third material different from the first and second materials, where the third material is arranged in a substantially repeating internal structure in at least one of the transverse orientation and the longitudinal orientation. In another embodiment, the relay element includes a third material different from the first and second materials, where the third material is arranged in a substantially randomized internal structure in at least one of the transverse orientation and the longitudinal orientation.

In some embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

In one embodiment, a center portion of the first end of the relay element is configured to have an energy entry cone aligned substantially perpendicular to a first end surface of the relay element. In another embodiment, a center portion of the second end of the relay element is configured to have an energy exit cone aligned substantially perpendicular to a second end surface of the relay element. In yet another embodiment, a center portion of the first end of the relay element is configured to have an energy entry cone aligned non-perpendicular to a first end surface of the relay element, and where the first end of the relay element includes a non-planar end surface.

In one embodiment, a center portion of the second end of the relay element is configured to have an energy exit cone aligned non-perpendicular to a second end surface of the relay element, and where the second end of the relay element includes a non-planar end surface.

In one embodiment, the relay element includes a first region of an end surface and where the second end of the relay element including a second region of the end surface. In another embodiment, each of the first and second ends of the relay element includes a plurality of discrete end portions.

In some embodiments, the relay element includes glass, carbon, optical fiber, optical film, plastic, polymer or mixtures thereof. In some embodiments, the relay element causes spatial magnification or spatial de-magnification of the energy.

In one embodiment, the relay element includes a stacked configuration having a plurality of faceplates. In some embodiments, the plurality of faceplates have different lengths, or are loose coherent optical relays.

In one embodiment, the relay element includes a sloped profile portion, where the sloped profile portion can be angled, linear, curved, tapered, faceted or aligned at a non-perpendicular angle relative to a normal axis of the relay element. In another embodiment, the energy is received from an energy source unit, the energy source unit having a mechanical envelope having a width different than the width of at least one of the first and the second ends of the relay element. In yet another embodiment, the mechanical envelope includes a projection system having a lens, and a plurality of energy source panels disposed adjacent to the lens, the plurality of energy source panels being planar, non-planar or combinations thereof.

In one embodiment, the plurality of energy source panels are arranged in various configurations including at least one of tilted, aligned at an angle, staggered, on-axis, off-axis, rotated, parallel, perpendicular, or any combinations thereof. In another embodiment, the plurality of energy source panels are arranged in a radially-symmetrical configuration. In some embodiments, the projection system includes focused energy transmission through a waveguide, and further includes a telecentric lens relay element at an off-aligned angle.

In one embodiment, the system further includes a curved energy source between the relay element and the projection system. In some embodiments, the first and second ends of the relay element are both planar, or the first and second ends of the relay element are both non-planar, or the first end of the relay element is non-planar and the second end of the relay element is planar, or the first end of the relay element is non-planar and the second end of the relay element is non-planar.

In some embodiments, the first and second ends of the relay element are both concave, or the first end of the relay element is concave and the second end of the relay element is convex, or the first end of the relay element is convex and the second end of the relay element is concave, or the first and second ends of the relay element are both convex.

In one embodiment, at least one of the first and second ends of the relay element is concave. In another embodiment, at least one of the first and second ends of the relay element is convex.

These and other advantages of the present disclosure will become apparent to those skilled in the art from the following detailed description and the appended claims.

DETAILED DESCRIPTION

Figure 1:
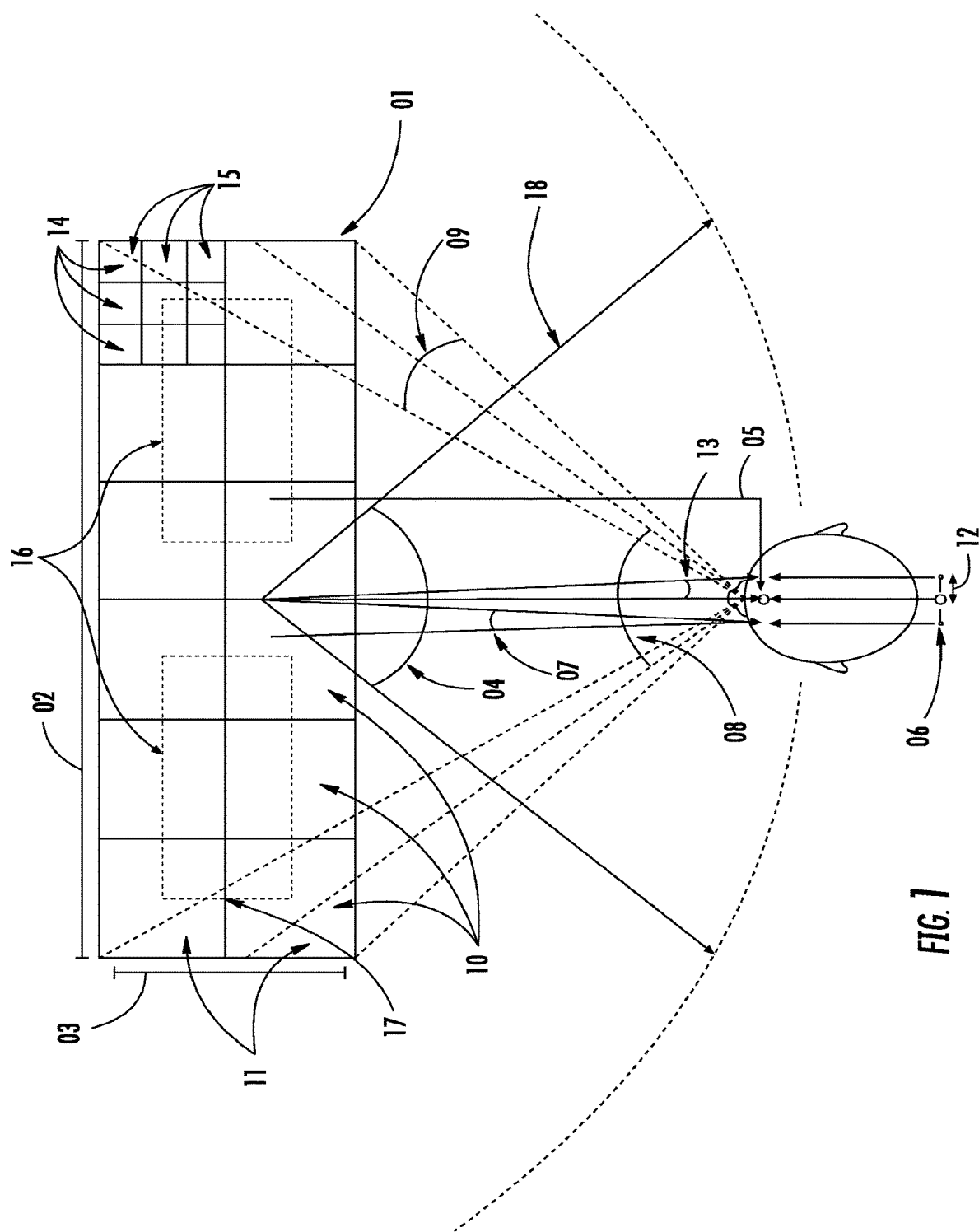
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of electromagnetic and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory system at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have 1 to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bidirectional energy surface architecture, all components may be configured to form the appropriate structures for any energy domain to enable holographic propagation.

However, the main challenge to enable the Holodeck today involves available visual technologies and electromagnetic device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 01, surface width 02, surface height 03, a determined target seating distance 18, the target seating field of view from the center of the display 04, the number of intermediate samples demonstrated here as samples between the eyes 05, the average adult interocular separation 06, the average resolution of the human eye in arcmin 07, the horizontal field of view formed between the target viewer location and the surface width 08, the vertical field of view formed between the target viewer location and the surface height 09, the resultant horizontal waveguide element resolution, or total number of elements 10, across the surface 10, the resultant vertical waveguide element resolution, or total number of elements 11, across the surface 11, the sample distance based upon the interocular spacing between the eyes and the number of intermediate samples for angular projection between the eyes 12, the angular sampling 13 may be based upon the sample distance and the target seating distance 18, the total resolution Horizontal per waveguide element derived from the angular sampling desired 14, the total resolution Vertical per waveguide element derived from the angular sampling desired 15, device Horizontal is the count of the determined number of discreet energy sources desired 16, and device Vertical is the count of the determined number of discreet energy sources desired 17.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately 1 arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{\text{Width}(W)}{\text{Heigh}(H)}$$

$$\text{Surface Horizontal Size} = \text{Surface Diagonal} * \left(\frac{1}{\sqrt{1+\left(\frac{H}{W}\right)^2}}\right)$$

$$\text{Surface Vertical Size} = \text{Surface Diagonal} * \left(\frac{1}{\sqrt{1+\left(\frac{W}{H}\right)^2}}\right)$$

$$\text{Horizontal Field of View} = 2 * \text{atan}\left(\frac{\text{Surface Horizontal Size}}{2 * \text{Seating Distance}}\right)$$

$$\text{Vertical Field of View} = 2 * \text{atan}\left(\frac{\text{Surface Verticle Size}}{2 * \text{Seating Distance}}\right)$$

$$\text{Horizontal Element Resolution} = \text{Horizontal } FoV * \frac{60}{\text{Eye Resolution}}$$

$$\text{Vertical Element Resolution} = \text{Vertical } FoV * \frac{60}{\text{Eye Resolution}}$$

The above calculations result in approximately a 32×18° field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter-Ocula Distance}}{(\text{Number of Desired Intermediate Samples} + 1)}$$

$$\text{Angular Sampling} = \text{atan}\left(\frac{\text{Sample Distance}}{\text{Seating Distance}}\right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element }(N) = \frac{\text{Seating } FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
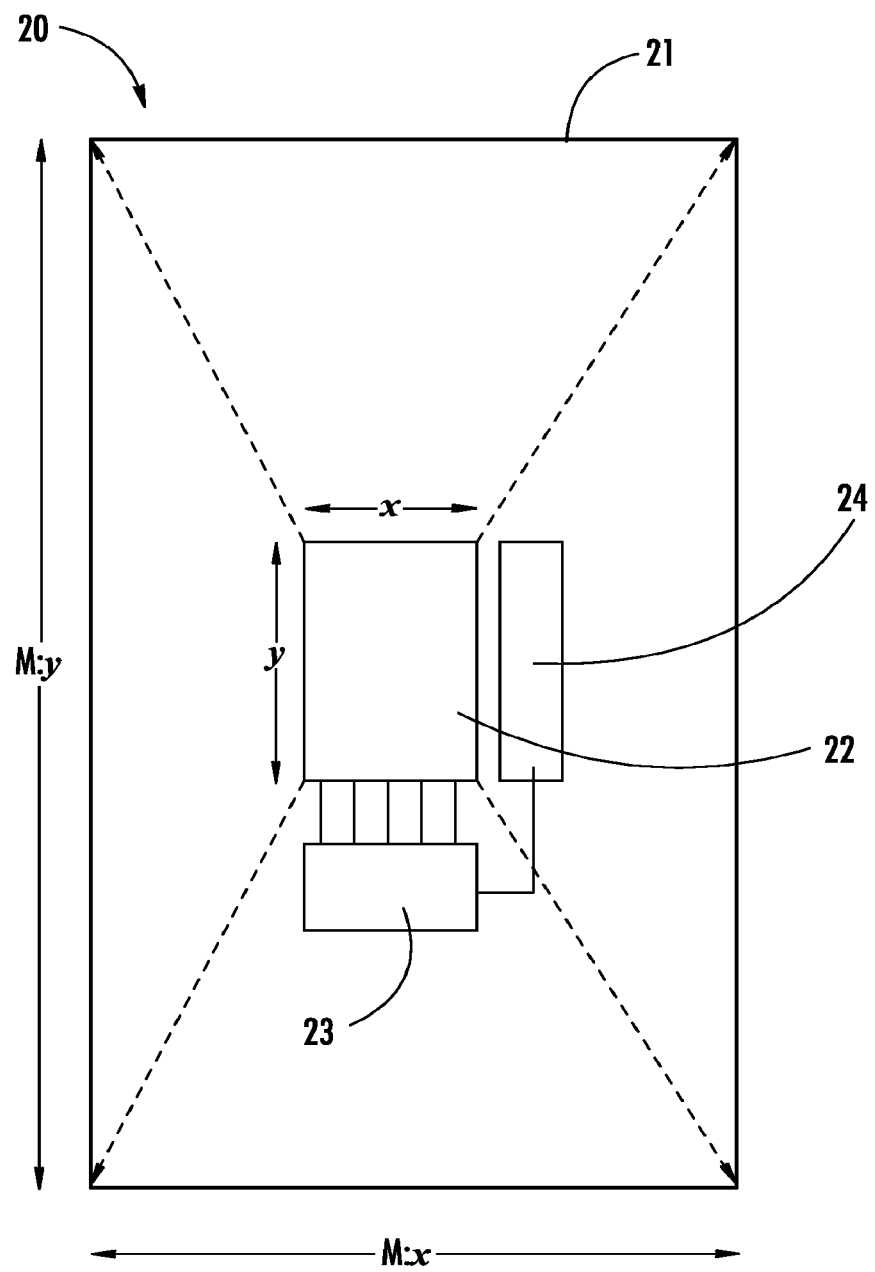
FIG. 2 is a schematic diagram illustrating an energy system having an active device area with a mechanical envelope.

FIG. 2 illustrates a device 20 having an active area 22 with a certain mechanical form factor. The device 20 may include drivers 24 and electronics 24 for powering and interface to the active area 22, the active area having a dimension as shown by the x and y arrows. This device 20 does not take into account the cabling and mechanical structures to drive, power and cool components, and the mechanical footprint may be further minimized by introducing a flex cable into the device 20. The minimum footprint for such a device 20 may also be referred to as a mechanical envelope 21 having a dimension as shown by the M:x and M:y arrows. This device 20 is for illustration purposes only and custom electronics designs may further decrease the mechanical envelope overhead, but in almost all cases may not be the exact size of the active area of the device. In an embodiment, this device 20 illustrates the dependency of electronics as it relates to active image area 22 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 20 may result in a design that is much larger with less reliability.

For exemplary purposes only, assuming energy devices with an energy location density of 3840×2160 sites, one may determine the number of individual energy devices (e.g., device 100) desired for an energy surface, given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices consist of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase of the effective size of the active device area to meet or exceed the mechanical dimensions to configure an array of relays and form a singular seamless energy surface.

Figure 3:
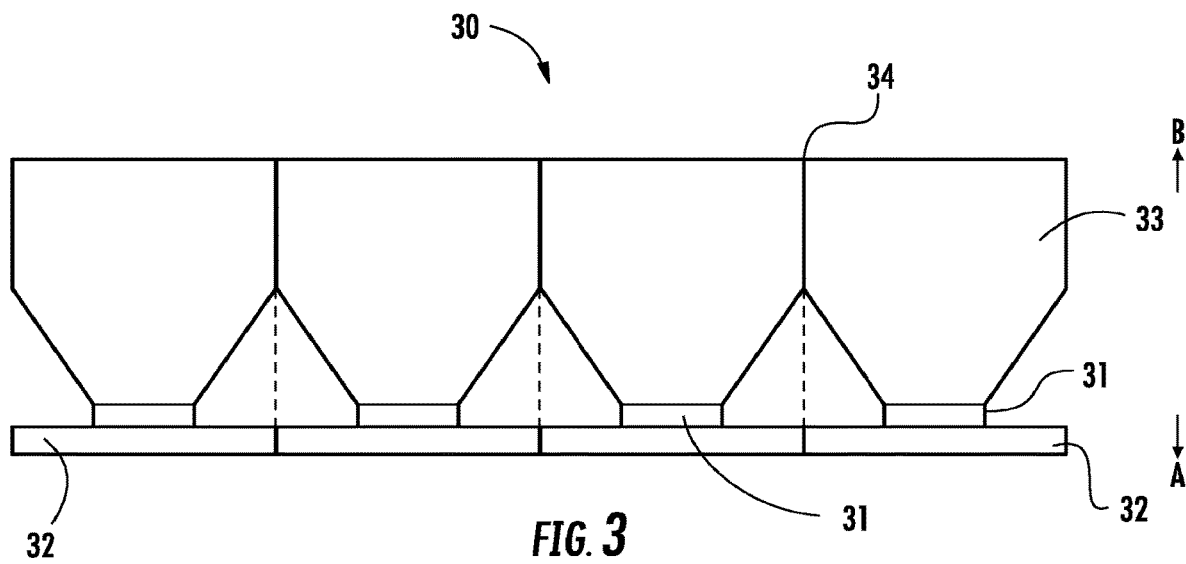
FIG. 3 is a schematic diagram illustrating an energy relay system.

FIG. 3 illustrates an embodiment of such an energy relay system 30. As shown, the relay system 30 may include a device 31 mounted to a mechanical envelope 32, with an energy relay element 33 propagating energy from the device 31. The relay element 33 may be configured to provide the ability to mitigate any gaps 34 that may be produced when multiple mechanical envelopes 32 of the device are placed into an array of multiple devices 31.

For example, if a device's active area 31 is 20 mm×10 mm and the mechanical envelope 32 is 40 mm×20 mm, an energy relay element 33 may be designed with a magnification of 2:1 to produce a tapered form that is approximately 20 mm×10 mm on a minified end (arrow A) and 40 mm×20 mm on a magnified end (arrow B), providing the ability to align an array of these elements 33 together seamlessly without altering or colliding with the mechanical envelope 32 of each device 31. Mechanically, the relay elements 33 may be bonded or fused together to align and polish ensuring minimal seam gap 34 between devices 31. In one such embodiment, it is possible to achieve a seam gap 34 smaller than the visual acuity limit of the eye.

Figure 4:
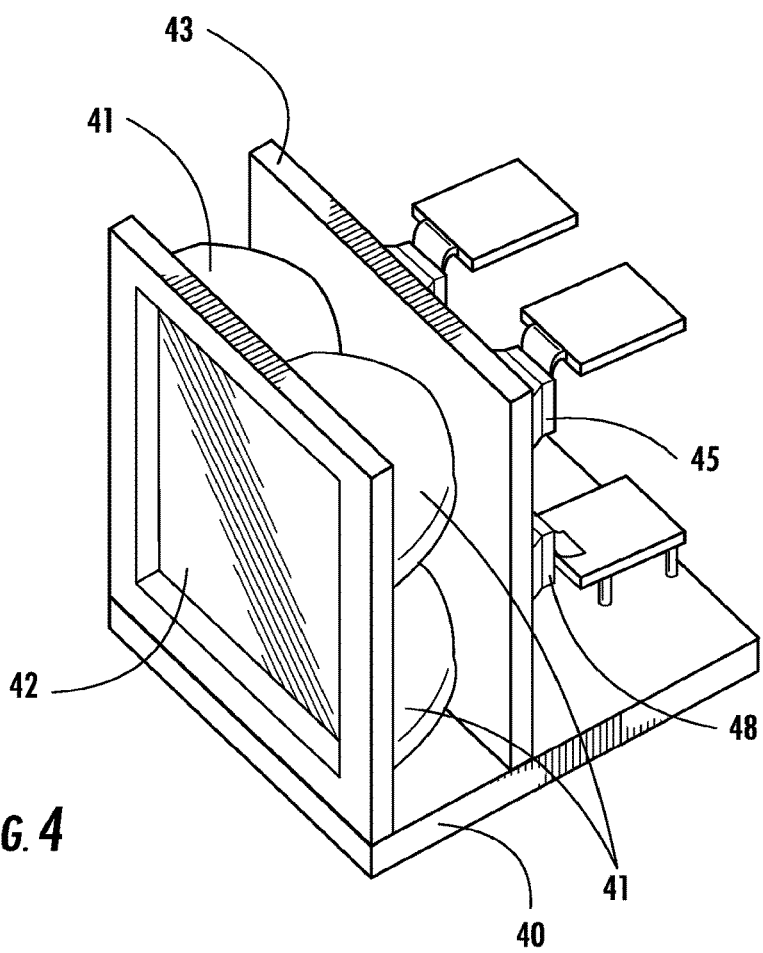
FIG. 4 is a schematic diagram illustrating an embodiment of energy relay elements adhered together and fastened to a base structure.

FIG. 4 illustrates an example of a base structure 40 having energy relay elements 41 formed together and securely fastened to an additional mechanical structure 43. The mechanical structure of the seamless energy surface 42 provides the ability to couple multiple energy relay elements 41, 45 in series to the same base structure through bonding or other mechanical processes to mount relay elements 41, 45. In some embodiments, each relay element 41 may be fused, bonded, adhered, pressure fit, aligned or otherwise attached together to form the resultant seamless energy surface 42. In some embodiments, a device 48 may be mounted to the rear of the relay element 41 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless display surface directing energy along propagation paths extending between one or more energy locations and the seamless display surface, and where the separation between the edges of any two adjacent second sides of the terminal energy relay elements is less than the minimum perceptible contour as defined by the visual acuity of a human eye having better than 20/100 vision at a distance greater than the width of the singular seamless display surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10 degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bidirectional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of will transmit at best 70% of received energy transmission) and additionally forms a strong pixelated patterning in the propagated energy.

Figure 5A:
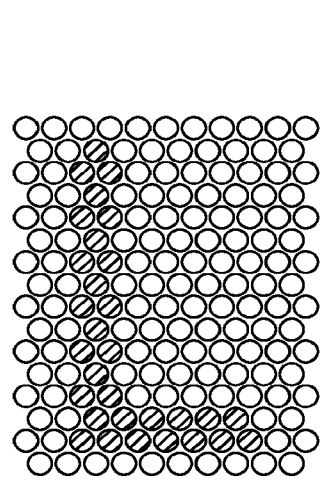
FIG. 5A is a schematic diagram illustrating an example of a relayed image through multi-core optical fibers.

FIG. 5A illustrates an end view of an example of one such non-Anderson Localization energy relay 50, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 3.

Figure 5B:
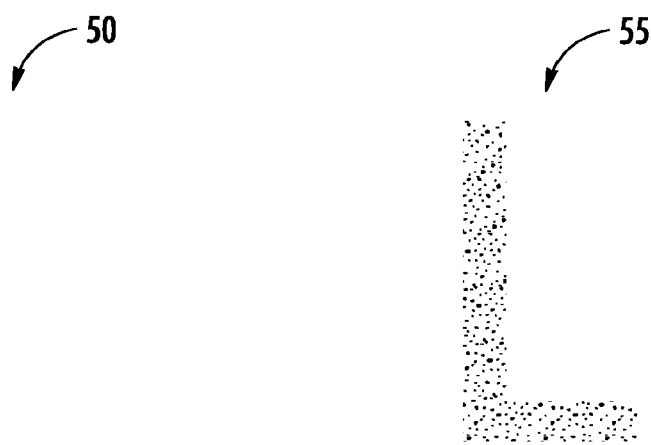
FIG. 5B is a schematic diagram illustrating an example of a relayed image through an optical relay that exhibits the properties of the Transverse Anderson Localization principle.

FIG. 5B, illustrates an example of the same relayed image 55 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

There is significant advantage to the Transverse Anderson Localization material properties in terms of both cost and weight, where a similar optical grade glass material, may cost and weigh upwards of 10 to 100-fold more than the cost for the same material generated within an embodiment, wherein disclosed systems and methods comprise randomized microscopic component engineered structures demonstrating significant opportunities to improve both cost and quality over other technologies known in the art.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein localized energy waves propagating through the energy relay have higher transport efficiency in the longitudinal orientation versus the transverse orientation.

In an embodiment, multiple energy domains may be configured within a single, or between multiple Transverse Anderson Localization energy relays to direct one or more sensory holographic energy propagation paths including visual, acoustic, tactile or other energy domains.

In an embodiment, the seamless energy surface is configured with Transverse Anderson Localization energy relays that comprise two or more first sides for each second side to both receive and emit one or more energy domains simultaneously to provide bidirectional energy propagation throughout the system.

In an embodiment, the Transverse Anderson Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plentopic function with a structure configured to alter an angular direction of the energy waves passing through representing the angular component of the 4D plenoptic function, wherein the energy waves propagated may converge in space in accordance with a plurality of propagation paths directed by the 4D plentopic function.

Figure 6:
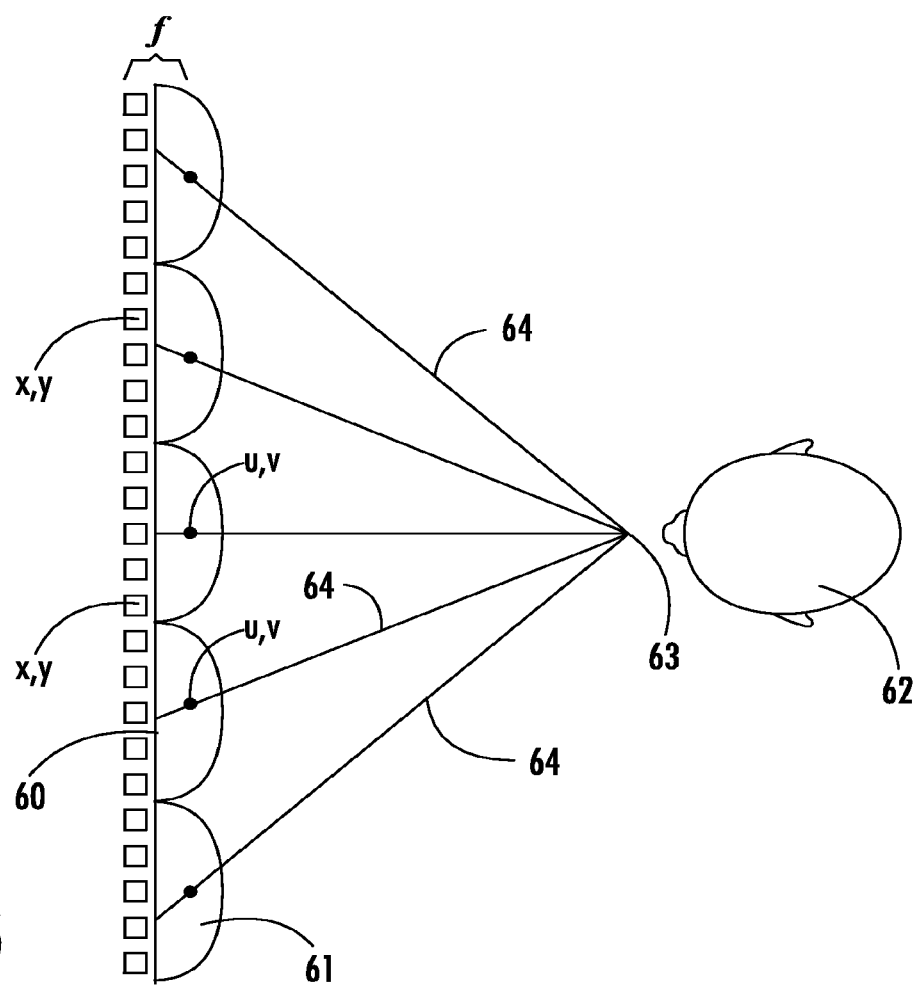
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 60 to a viewer 62 in describing how the rays of energy converge in space 63 from various positions within the viewing volume. As shown, each waveguide element 61 defines four dimensions of information describing energy propagation 64 through the energy surface 60. Two spatial dimensions (herein referred to as x and y) are the physical plurality of energy locations that can be viewed in image space, and the angular components theta and phi (herein referred to as u and v), which is viewed in virtual space when projected through the energy waveguide array. In general and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due designs that have not accurately accounted for any of diffraction, scatter, diffusion, angular direction, calibration, focus, collimation, curvature, uniformity, element cross-talk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bidirectional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Bidirectional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bidirectional holographic energy propagation, emission, reflection, or sensing.

In an embodiment, an environment of tiled seamless energy systems are aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregated tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bidirectionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bidirectional energy propagation and aggregated surfaces are possible.

In an embodiment, the system comprises an energy waveguide capable of bidirectional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bidirectional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bidirectional captured data and projection information.

In some embodiments, a plurality of combinations of three energy devices comprising an ultrasonic sensor, a visible electromagnetic display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and electromagnetic energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bidirectional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Optical Image Relay and Taper Elements

Extremely dense fiber bundles can be manufactured with a plethora of materials to enable light to be relayed with pixel coherency and high transmission. Optical fibers provide the guidance of light along transparent fibers of glass, plastic, or a similar medium. This phenomenon is controlled by a concept called total internal reflection. A ray of light will be totally internally reflected between two transparent optical materials with a different index of refraction when the ray is contained within the critical angle of the material and the ray is incident from the direction of the more dense material.

Figure 7:
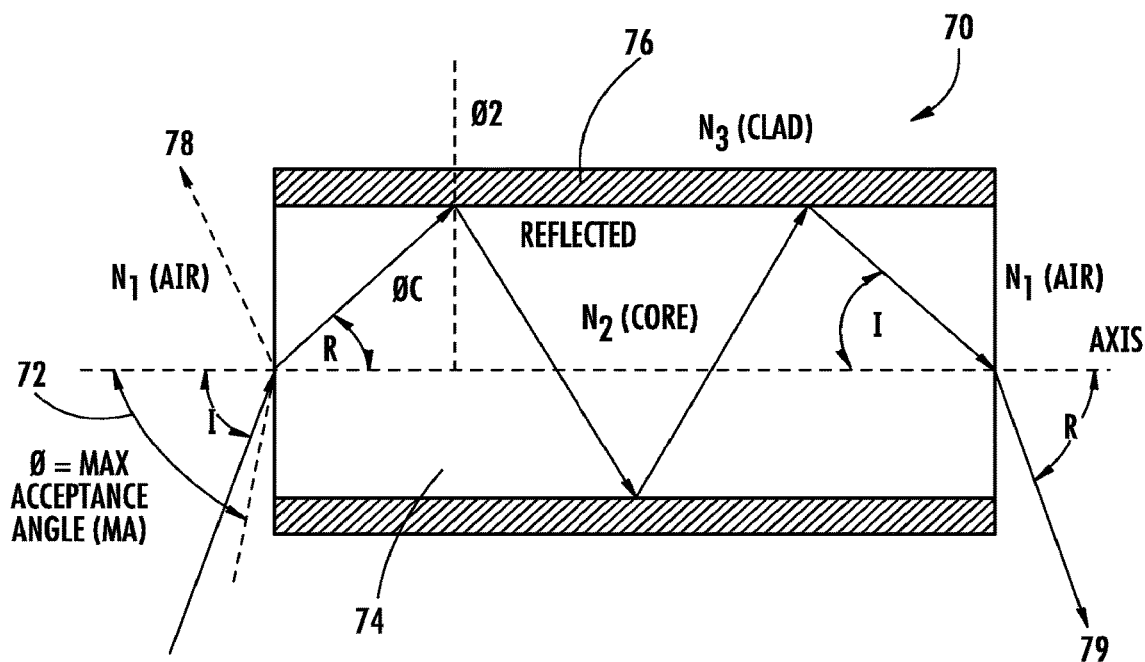
FIG. 7 illustrates an orthogonal view of the fundamental principles of internal reflection.

FIG. 7 illustrates an orthogonal view of fundamental principles of internal reflection 70 detailing a maximum acceptance angle Ø72 (or NA of the material), core 74 and clad 76 materials with differing refractive indices, and reflected 78 and refracted 79 rays. In general, the transmission of light decreases by less than 0.001 percent per reflection and a fiber that is about 50 microns in diameter may have 3,000 reflections per foot, which is helpful to understand how efficient that light transmission may be as compared to other compound optical methodologies.

One can calculate the relationship between the angle of incidence (I) and the angle of refraction (R) with Snell's law:

$$\frac{\sin_I}{\sin\theta_R} = \frac{n_2}{n_1},$$

where $n_1$ is the index of refraction of air and $n_2$ as the index of refraction of the core material 74.

One skilled at the art of fiber optics will understand the additional optical principles associated with light gathering power, maximum angle of acceptance, and other required calculations to understand how light travels through the optical fiber materials. It is important to understand this concept, as the optical fiber materials should be considered a relay of light rather than a methodology to focus as will be described within the following embodiments.

Understanding the angular distribution of light that exits the optical fiber is important to this disclosure, and may not be the same as would be expected based upon the incident angle. The azimuthal angle on emergence from the fiber tends to vary rapidly with the maximum acceptance angle, the length and diameter of the fiber, as well as the other parameters of the materials that the emerging ray tends to emerge as a conical shape as defined by the incident and refracted angles.

Figure 8:
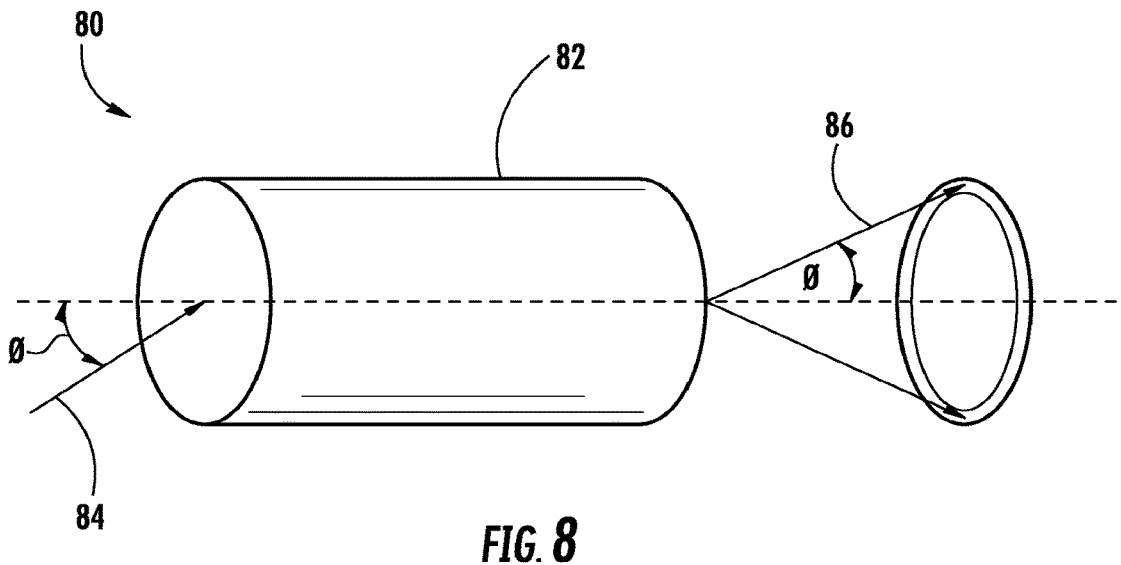
FIG. 8 illustrates an orthogonal view of a light ray entering an optical fiber, and the resulting conical light distribution at the exit of the relay.

FIG. 8 demonstrates how a ray of light 84 entering an optical fiber 82 may exit in a conical shape distribution of light 86 with a specific azimuthal angle θ. This effect may be observed by shining a laser pointer through a fiber and view the output ray at various distances and angles on a surface. The conical shape of exit with a distribution of light across the entire conical region (e.g., not only the radius of the conical shape) which will be an important concept moving forward with the designs proposed.

The main source for transmission loss in fiber materials are cladding, length of material, and loss of light for rays outside of the acceptance angle. The cladding is the material that surrounds each individual fiber within the larger bundle to insulate the core and help mitigate rays of light from traveling between individual fibers. In addition to this, additional opaque materials may be used to absorb light outside of acceptance angle called extra mural absorption (EMA). Both materials can help improve viewed image quality in terms of contrast, scatter and number of other factors, but may reduce the overall light transmission from entry to exit. For simplicity, the percent of core to clad can be used to understand the approximate transmission potential of the fiber, as this may be one of the reasons for the loss of light. In most materials, the core to clad ratio may be in the range of approximately about 50% to about 80%, although other types of materials may be available and will be explored in the below discussion.

Each fiber may be capable of resolving approximately 0.5 photographic line pairs per fiber diameter, thus when relaying pixels, it may be important to have more than a single fiber per pixel. In some embodiments, a dozen or so per pixel may be utilized, or three or more fibers may be acceptable, as the average resolution between each of the fibers helps mitigate the associate MTF loss when leveraging these materials.

In one embodiment, optical fiber may be implemented in the form of a fiber optic faceplate. A faceplate is a collection of single or multi, or multi-multi fibers, fused together to form a vacuum-tight glass plate. This plate can be considered a theoretically zero-thickness window as the image presented to one side of the faceplate may be transported to the external surface with high efficiency. Traditionally, these faceplates may be constructed with individual fibers with a pitch of about 6 microns or larger, although higher density may be achieved albeit at the effectiveness of the cladding material which may ultimately reduce contrast and image quality.

In some embodiments, an optical fiber bundle may be tapered resulting in a coherent mapping of pixels with different sizes and commensurate magnification of each surface. For example, the magnified end may refer to the side of the optical fiber element with the larger fiber pitch and higher magnification, and the minified end may refer to the side of the optical fiber element with the smaller fiber pitch and lower magnification. The process of producing various shapes may involve heating and fabrication of the desired magnification, which may physically alter the original pitch of the optical fibers from their original size to a smaller pitch thus changing the angles of acceptance, depending on location on the taper and NA. Another factor is that the fabrication process can skew the perpendicularity of fibers to the flat surfaces. One of the challenges with a taper design, among others, is that the effective NA of each end may change approximately proportional to the percentage of magnification. For example, a taper with a 2:1 ratio may have a minified end with a diameter of 10 mm and a magnified end with a diameter of 20 mm. If the original material had an NA of 0.5 with a pitch of 10 microns, the minified end will have an approximately effective NA of 1.0 and pitch of 5 microns. The resulting acceptance and exit angles may change proportionally as well. There is far more complex analysis that can be performed to understand the exacting results from this process and anyone skilled in the art will be able to perform these calculations. For the purposes of this discussion, these generalizations are sufficient to understand the imaging implications as well as overall systems and methods.

Transverse Anderson Localization

While the Anderson localization principle was introduced in the 1950s, it wasn't until recent technological breakthroughs in materials and processes that allowed the principle to be explored practically in optical transport. Transverse Anderson localization is the propagation of a wave transported through a transversely disordered but longitudinally constant material without diffusion of the wave in the transverse plane.

Figure 9:
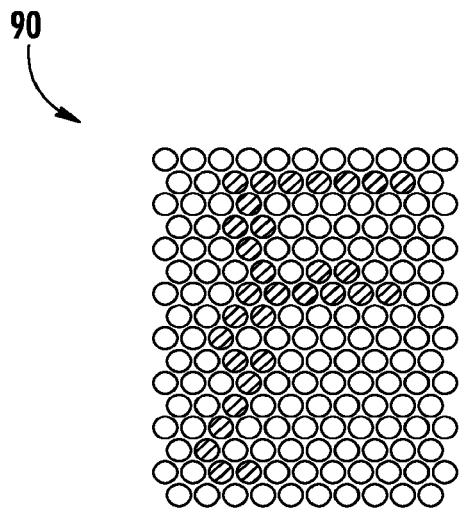
FIG. 9 illustrates an orthogonal view of an example image relayed through traditional multicore optical fibers where pixilation and fiber noise may be exhibited due to the properties of the optical fibers.
Figure 10:
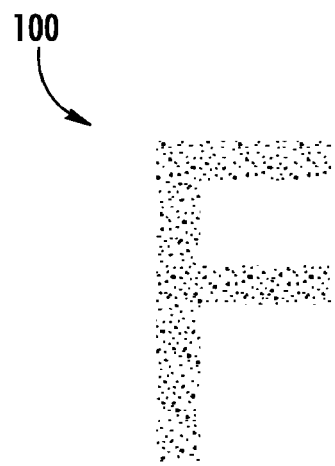
FIG. 10 illustrates an orthogonal view of an example image relayed through an optical relay exhibiting the properties of the Anderson localization principle.

Within the prior art, Transverse Anderson localization has been observed through experimentation in which a fiber optic face plate is fabricated through drawing millions of individual strands of fiber with different RI that were mixed randomly and fused together. When an input beam is scanned across one of the surfaces of the face plate, the output beam on the opposite surfaces follows the transverse position of the input beam. Since Anderson localization exhibits in disordered mediums an absence of diffusion of waves, some of the fundamental physics are different when compared to the previous calculations for ordered optical fiber relays. This implies that the effect of the optical fibers that produce the Anderson localization phenomena are less impacted by total internal reflection than by the randomization of between multiple-scattering paths where wave interference can completely limit the propagation in the transverse orientation while continuing in the longitudinal path FIG. 9 illustrates an orthogonal view of an example image relayed through traditional multicore optical fibers 90 where pixilation and fiber noise may be exhibited due to the properties of traditional optical fibers. FIG. 10 illustrates an orthogonal view of the same image relayed through an optical fiber 100 exhibiting the properties of Anderson localization principle, in accordance with one embodiment of the present disclosure.

Figure 11:
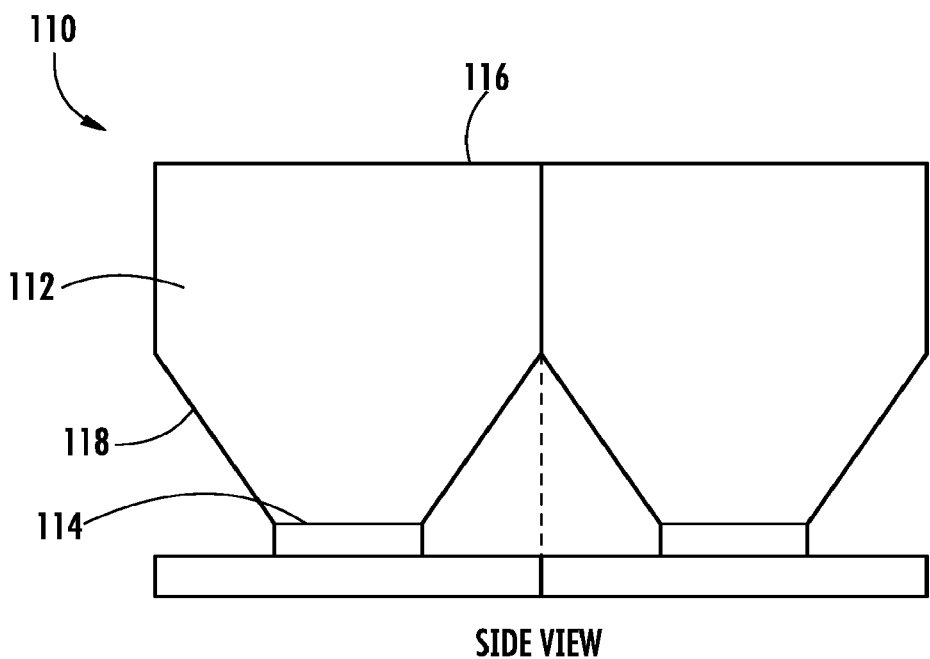
FIG. 11 illustrates an orthogonal view of a tapered energy relay mosaic arrangement, in accordance with one embodiment of the present disclosure.

In an embodiment, it is possible for Transverse Anderson Localization materials to transport light as well as, or better than, the highest quality commercially available multimode glass image fibers with a higher MTF. With multimode and multicore optical fibers, the relayed images are intrinsically pixelated due to the properties of total internal reflection of the discrete array of cores where any cross-talk between cores will reduce MTF and increase blurring. The resulting imagery produced with multicore optical fiber tends to have a residual fixed noise fiber pattern, as illustrated in FIG. 10. By contrast, FIG. 11 illustrates the same relayed image through an example material sample that exhibits the properties of the Transverse Anderson localization principle where the noise pattern appears much more like a grain structure than a fixed fiber pattern.

Another significant advantage to optical relays that exhibit the Anderson localization phenomena is that it they can be fabricated from a polymer material, resulting in reduced cost and weight. A similar optical grade material, generally made of glass or other similar materials, may cost ten to a hundred (or more) times more than the cost of the same dimension of material generated with polymers. Further, the weight of the polymer relay optics can be 10-100× less given that up to a majority of the density of the material is air and the other light weight plastics. For the avoidance of doubt, any material that exhibits the Anderson localization property is included in this disclosure herein, even if it does not meet the above cost and weight suggestions. As one skilled in the art will understand that the above suggestion is a single embodiment that lends itself to significant commercial viabilities that similar glass products exclude. Of significant additional benefit is that for Transverse Anderson localization to work, optical fiber cladding is not needed, which for traditional multicore fiber optics is required to prevent the scatter of light between fibers, but simultaneously blocks a portion of the rays of light and thus reduces transmission by at least the core to clad ratio (e.g. a core to clad ratio of 70:30 will transmit at best 70% of received illumination).

Another significant benefit is the ability to produce many smaller parts that can be bonded or fused without seams as the material fundamentally has no edges in the traditional sense and the merger of any two pieces is nearly the same as generating the component as a singular piece depending on the process to merge the two or more pieces together. For large scale applications, this is a significant benefit for the ability to manufacturer without massive infrastructure or tooling costs, and it provides the ability to generate single pieces of material that would otherwise be impossible with other methods. Traditional plastic optical fibers have some of these benefits but due to the cladding, generally still involve a seam line of some distances.

It is proposed that optical relays exhibiting Transverse Anderson localization can be constructed from one or more building block structures that each has a controlled index of refraction RI, a size on the order of the wavelength of visible light, about 1 um, and an elongated shape to facilitate transmission of electromagnetic energy along the long axis of the structure. The structures should be arranged so that channels of minimal RI variation are formed longitudinally throughout the optical relay length, but the RI varies randomly in the transverse plane. In one embodiment for visible electromagnetic energy wave relays, two building block structures with a refractive index offset of −0.1 are selected including elongated particles of poly methyl methacrylate (PMMA, RI of 1.49), and poly styrene (PS, RI of 1.59). The first and the second structures are arranged, intermixed with an optical bonding agent, and then cured. In one embodiment, the ratio of materials may be 50:50.

Transverse Anderson Localization is a general wave phenomenon that applies to the transport of electromagnetic waves, acoustic waves, quantum waves, etc. The one or more building block structures required to form an energy wave relay that exhibits Transverse Anderson Localization each have a size that is on the order of the corresponding wavelength. Another critical parameter for the building blocks is the speed of the energy wave in the materials used for those building blocks, which includes refractive index for electromagnetic waves, and acoustic impedance for acoustic waves. For example, the building block sizes and refractive indices can vary to accommodate any frequency in the electromagnetic spectrum, from X-rays to radio waves.

For this reason, discussions in this disclosure about optical relays can be generalized to not only the full electromagnetic spectrum, but to acoustical energy and many other types of energy. For this reason, the use of the terms energy source, energy surface, and energy relay will be used often, even if the discussion is focused on one particular form of energy such as the visible electromagnetic spectrum.

For the avoidance of doubt, the material quantities, process, types, RI, and the like are merely exemplary and any optical material that exhibits the Anderson localization property is included herein. Further, any use of disordered materials and processes is included herein.

It should be noted that the principles of optical design noted in this disclosure apply generally to all forms of energy relays, and the design implementations chosen for specific products, markets, form factors, mounting, etc. may or may not need to address these geometries but for the purposes of simplicity, any approach disclosed is inclusive of all potential energy relay materials.

Energy Mosaic Array

In order to further solve the challenge of generating high resolution from an array of individual energy wave sources without seams due to the limitation of mechanical requirements for said energy wave sources, the use of tapered optical relays can be employed to increase the effective size of the active display area to meet or exceed the required mechanical dimensions to seamlessly stitch an array of tapers together and form a singular contiguous electromagnetic energy surface.

For example, if an energy wave source's active area is 20 mm×10 mm and the mechanical envelope is 40 mm×20 mm, a tapered energy relay may be designed with a magnification of 2:1 to produce a taper that is 20 mm×10 mm (when cut) on the minified end and 40 mm×20 mm (when cut) on the magnified end, providing the ability to align an array of these tapers together seamlessly without altering or violating the mechanical envelope of each energy wave source.

FIG. 11 illustrates one such tapered energy relay mosaic arrangement 110, in an orthogonal view in accordance with one embodiment of the present disclosure. In one embodiment, the relay device 110 may include two or more relay elements 112, each relay element 112 formed of one or more structures, each relay element 112 having a first surface 114, a second surface 116, a transverse orientation (generally parallel to the surfaces 114, 116) and a longitudinal orientation (generally perpendicular to the surfaces 114, 116). In one embodiment, the surface area of the first surface 114 may be different than the surface area of the second surface 116. For example, the surface area of the first surface 114 may be greater or lesser than the surface area of the second surface 116. In another embodiment, the surface area of the first surface 114 may be the same as the surface area of the second surface 116. Energy waves can pass from the first surface 114 to the second surface 116, or vice versa.

In one embodiment, the relay element 112 of the relay element device 110 includes a sloped profile portion 118 between the first surface 114 and the second surface 116. In operation, energy waves propagating between the first surface 114 and the second surface 116 may have a higher transport efficiency in the longitudinal orientation than in the transverse orientation, and energy waves passing through the relay element 112 may result in spatial magnification or spatial de-magnification. In other words, energy waves passing through the relay element 112 of the relay element device 110 may experience increased magnification or decreased magnification. In some embodiments, the one or more structures for forming the relay element device 110 may include glass, carbon, optical fiber, optical film, plastic, polymer, or mixtures thereof.

In one embodiment, the energy waves passing through the first surface 114 has a first resolution, while the energy waves passing through the second surface 116 has a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of about +/−10 degrees relative to the normal to the second surface, irrespective of location on the second surface.

In some embodiments, the first surface 114 may be configured to receive energy from an energy wave source, the energy wave source including a mechanical envelope having a width different than the width of at least one of the first surface 114 and the second surface 116.

Mechanically, these tapered energy relays are bonded or fused together in order to align, polish, and ensure that the smallest possible seam gap between the wave energy sources is possible. In one such embodiment, using an epoxy that is thermally matched to the taper material, it is possible to achieve a maximum seam gap of 50 um. In another embodiment, a manufacturing process that places the taper array under compression and/or heat provides the ability to fuse the elements together. In another embodiment, the use of plastic tapers can be more easily chemically fused or heat-treated to create the bond without additional bonding. For the avoidance of doubt, any methodology may be used to bond the array together, to explicitly include no bond other than gravity and/or force.

Optical Fiber Mosaic Design

A mechanical structure may be necessary in order to hold the multiple components in a fashion that meets a certain tolerance specification. In some embodiments, the surfaces 114, 116 tapered relay elements can have any polygonal shapes including without limitation circular, elliptical, oval, triangular, square, rectangle, parallelogram, trapezoidal, diamond, pentagon, hexagon, and so forth. In some examples, for non-square tapers, such as rectangular tapers for example, the relay elements 110 may be rotated to have the minimum taper dimension parallel to the largest dimensions of the overall energy source. This approach allows for the optimization of the energy source to exhibit the lowest rejection of rays of light due to the acceptance cone of the magnified relay element as when viewed from center point of the energy source. For example, if the desired energy source size is 100 mm by 60 mm and each tapered energy relay is 20 mm by 10 mm, the relay elements may be aligned and rotated such that an array of 3 by 10 taper energy relay elements may be combined to produce the desired energy source size. Nothing here should suggest that an array with an alternative configuration of an array of 6 by 5 matrix, among other combinations, could not be utilized. The array consisting of a 3×10 layout generally will perform better than the alternative 6×5 layout.

While the most simplistic formation of the energy source system consists of a single tapered energy relay element, multiple elements may be coupled to form a single energy source module with increased quality or flexibility. One such embodiment includes a first tapered energy relay with the minified end attached to the energy source, and a second tapered energy relay connected to the first relay element, with the minified end of the second optical taper in contact with the magnified end of the first relay element generating a total magnification equal to the product of the two individual taper magnifications.

Figure 12:
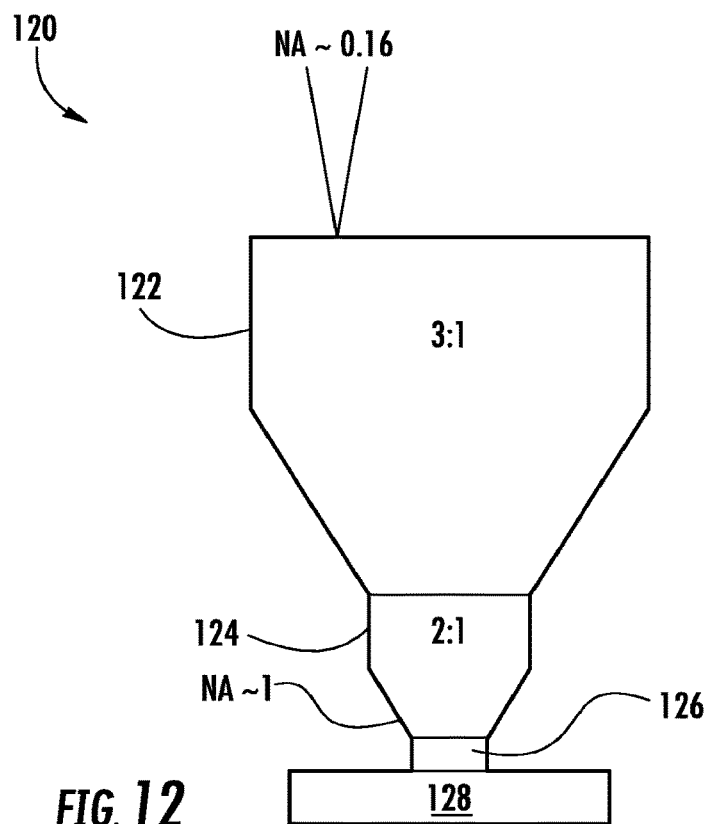
FIG. 12 illustrates an orthogonal view of two compound tapered energy relays in series, both with minified ends facing an energy source, in accordance with one embodiment of the present disclosure.

FIG. 12 illustrates an orthogonal view of two compound optical relay tapers in series 120, tapers 122, 124 both with minified ends facing an energy source surface 126, in accordance with one embodiment of the present disclosure. In this example, the input NA is 1.0 for the input of taper 124, but only about 0.16 for the output of taper 122. Notice that the output gets divided by the total magnification of 6, which is the product of 2 for taper 124, and 3 for taper 122. One advantage of this approach is the ability to customize the first energy wave relay to account for various dimensions of energy source without alteration of the second energy wave relay. It additionally provides the flexibility to alter the size of the output energy surface without changing the design of the first relay element. Also shown is the display 126 and the mechanical envelope 128.

Figure 13:
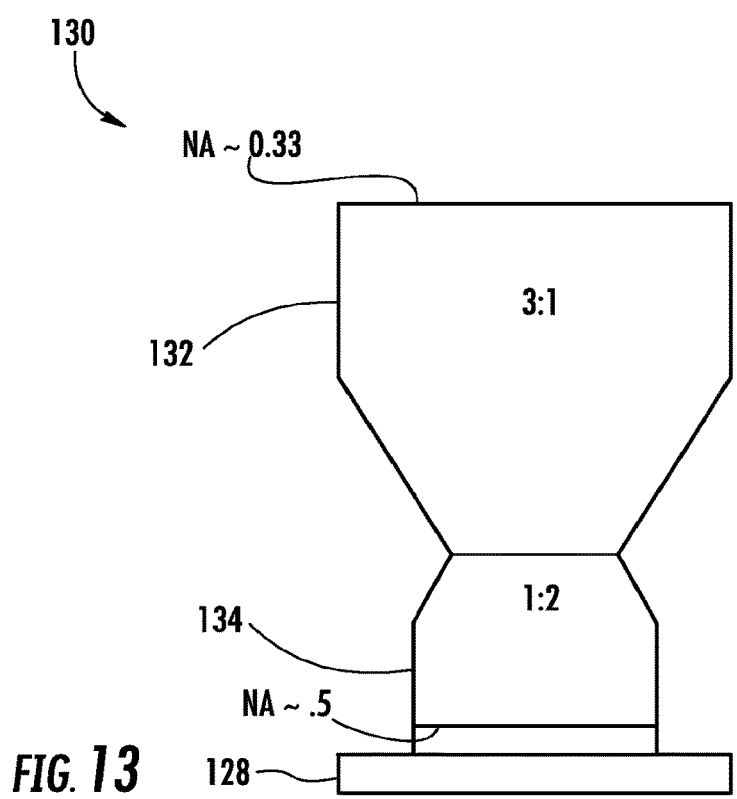
FIG. 13 illustrates an orthogonal view of a compound tapered energy relay with a second taper rotated to have the minified end mate to the minified end of a first taper, in accordance with one embodiment of the present disclosure.

FIG. 13 illustrates an orthogonal view of a compound tapered energy relay 130 with a second taper 134 rotated to have the minified end mate to the minified end of a first taper 132, in accordance with one embodiment of the present disclosure. This has similar advantages as that shown in FIG. 12. For energy waves, it holds the additional advantage of partially restoring the origination angle of light as both minified ends are mated, although rejected rays cannot be restored but angle of exit may be more controllable. Once again, the input NA of 0.5 may be reduced by a factor equal to the total magnification of the system 1.5, to an output value of 0.3.

In some embodiments, the relay element may include a plurality of relay elements in a stacked configuration in the longitudinal orientation, such as those shown in FIGS. 12 and 13. In these stacked configurations, a first element (e.g., 124) of the plurality of elements may include a first surface (e.g., surface closes to the energy source surface 126) and a second element (e.g., 122) of the plurality of elements includes a second surface (e.g., surface furthest away from the energy source surface 126). Each of the first element and the second element may cause either spatial magnification or spatial de-magnification of the energy individually or together, as discussed above.

In one embodiment, the energy waves passing through the first surface may have a first resolution, while the energy waves passing through the second surface may have a second resolution, whereby the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of about +/−10 degrees relative to the normal to the second surface, irrespective of location on the second surface.

Figure 29:
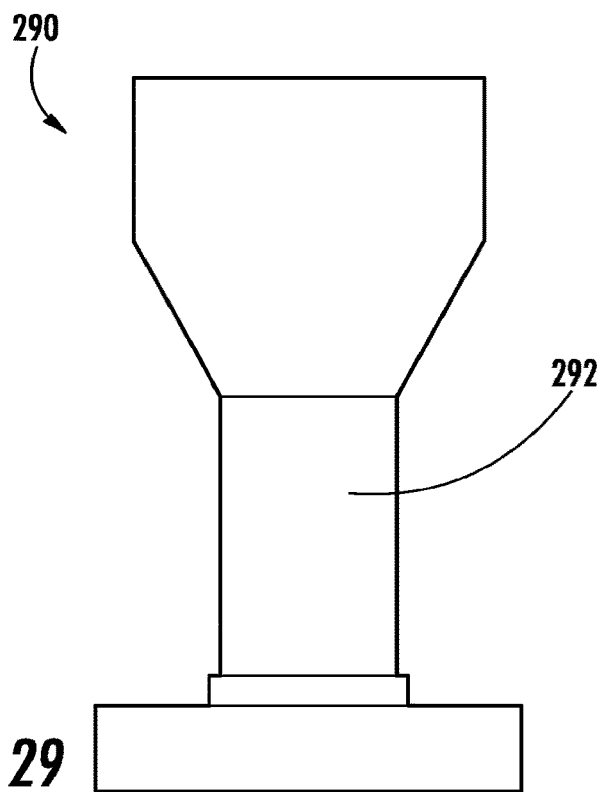
FIG. 29 illustrates an orthogonal view of a system that includes an additional optical faceplate, which offers a mechanical offset between the energy source and the taper, in accordance with one embodiment of the present disclosure.

In one embodiment, the plurality of elements in the stacked configuration may include a plurality of faceplates (best shown in FIG. 29). In some embodiments, the plurality of faceplates may have different lengths or are loose coherent optical relays (best shown in FIGS. 31-35). In other embodiments, the plurality of elements may have sloped profile portions similar to that of FIG. 11, where the sloped profile portions may be angled, linear, curved, tapered, faceted or aligned at a non-perpendicular angle relative to a normal axis of the relay element. In yet another embodiment, the relay element may include randomized refractive index variability such that the energy is localized in the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation. This will be described in more detail in subsequent figures and discussion.

Returning now to FIG. 12, in operation, the first surface may be configured to receive energy waves from an energy source unit (e.g., 126), the energy source unit including a mechanical envelope 128 having a width different than the width of at least one of the first surface and the second surface. In one embodiment, the energy waves passing through the first surface may have a first resolution, while the energy waves passing through the second surface may have a second resolution, such that the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of about +/−10 degrees relative to the normal to the second surface, irrespective of location on the second surface.

In one embodiment, the mechanical envelope 128 may include a projection system 234 (best shown in FIG. 24) having a lens 236, and a plurality of energy source panels disposed adjacent to the lens, the plurality of energy source panels being planar, non-planar or combinations thereof (best shown in FIGS. 24-28 and 30-31). As shown in these subsequent figures, in some embodiments the plurality of energy source panels (e.g., 242, 252, 262, 274) may be arranged in various configurations including at least one of tilted, aligned at an angle, staggered, on-axis, off-axis, rotated, parallel, perpendicular, or any combinations thereof. In other embodiments, the plurality of energy source panels may be arranged in a radially-symmetrical configuration (best shown in FIGS. 27, 28 and 30). In one embodiment, the projection system may also include focused energy transmission through a waveguide, and further include a telecentric lens relay element at an off-aligned angle. These embodiments, along with others, will be described in more detail in subsequent figures and discussion.

Use of Flexible Energy Sources and Curved Energy Relay Surfaces

It may be possible to manufacture certain energy source technologies or energy projection technologies with curved surfaces. For example, in one embodiment, for a source of energy, a curved OLED display panel may be used. In another embodiment, for a source of energy, a focus-free laser projection system may be utilized. In yet another embodiment, a projection system with a sufficiently wide depth of field to maintain focus across the projected surface may be employed. For the avoidance of doubt, these examples are provided for exemplary purposes and in no way limit the scope of technological implementations for this description of technologies.

Given the ability for optical technologies to produce a steered cone of light based upon the chief ray angle (CRA) of the optical configuration, by leveraging a curved energy surface, or a curved surface that may retain a fully focused projected image with known input angles of light and respective output modified angles may provide a more idealized viewed angle of light.

In one such embodiment, the energy surface side of the optical relay element may be curved in a cylindrical, spherical, planar, or non-planar polished configuration (herein referred to as "geometry" or "geometric") on a per module basis, where the energy source originates from one more source modules. Each effective light-emitting energy source has its own respective viewing angle that is altered through the process of deformation. Leveraging this curved energy source or similar panel technology allows for panel technology that may be less susceptible to deformation and a reconfiguration of the CRA or optimal viewing angle of each effective pixel.

Figure 14:
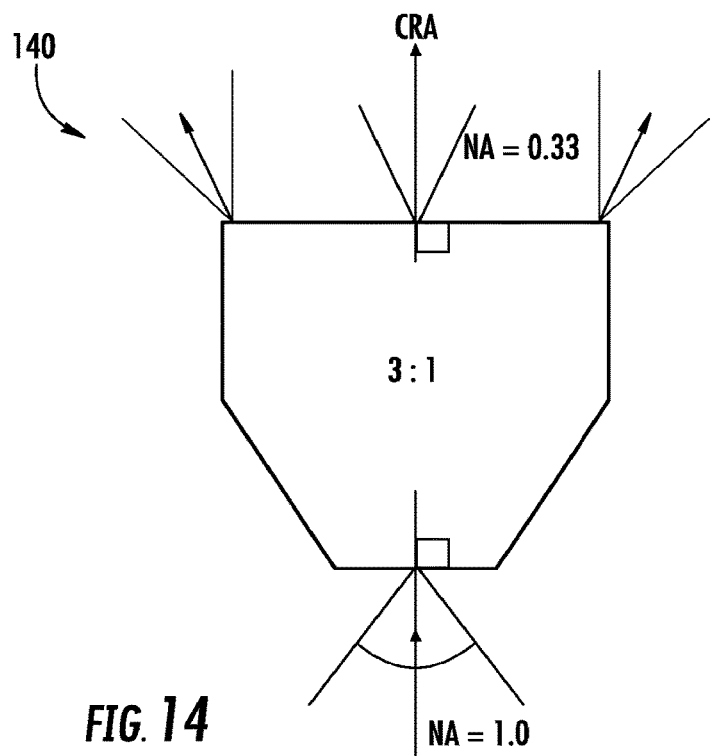
FIG. 14 illustrates an orthogonal view of an optical taper relay configuration with a 3:1 magnification factor and the resulting viewed angle of light of an attached energy source, in accordance with one embodiment of the present disclosure.

FIG. 14 illustrates an orthogonal view of an optical relay taper configuration 140 with a 3:1 magnification factor and the resulting viewed angle of light of an attached energy source, in accordance with one embodiment of the present disclosure. The optical relay taper has an input NA of 1.0 with a 3:1 magnification factor resulting in an effective NA for output rays of approximately 0.33 (there are many other factors involved here, this is for simplified reference only), with planar and perpendicular surfaces on either end of the tapered energy relay, and an energy source attached to the minified end. Leveraging this approach alone, the angle of view of the energy surface may be approximately ⅓ of that of the input angle. For the avoidance of doubt, a similar configuration with an effective magnification of 1:1 (leveraging an optical faceplate or otherwise) may additionally be leveraged, or any other optical relay type or configuration.

Figure 15:
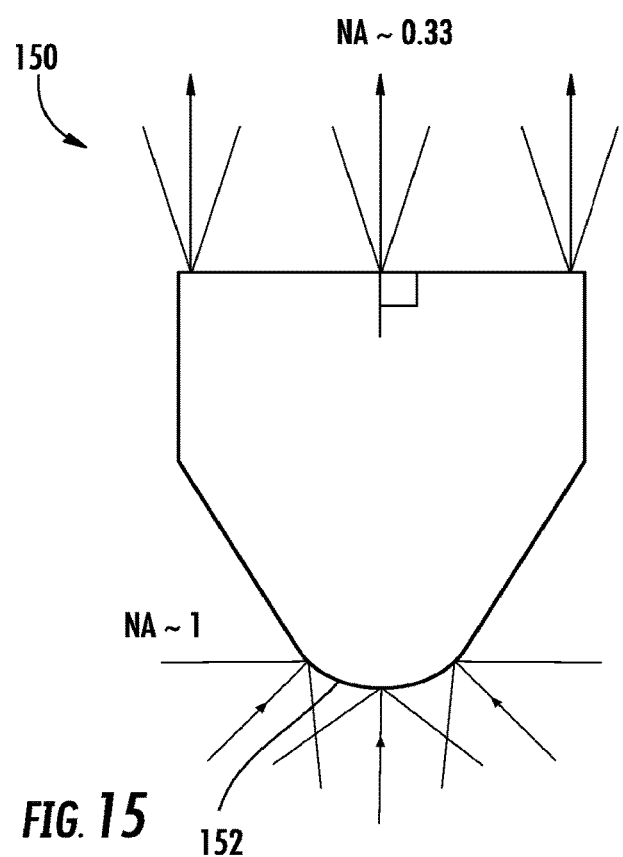
FIG. 15 illustrates an orthogonal view of the optical taper relay of FIG. 14, but with a curved surface on the energy source side of the optical taper relay resulting in the increased overall viewing angle of the energy source, in accordance with one embodiment of the present disclosure.

FIG. 15 illustrates the same tapered energy relay module 150 as that of FIG. 14 but now with a surface on an energy source side having a curved geometric configuration 152 while a surface opposite an energy source side 154 having a planar surface and perpendicular to an optical axis of the module 150. With this approach, the input angles (e.g., see arrows near 152) may be biased based upon this geometry, and the output angles (e.g., see arrows near 154) may be tuned to be more independent of location on the surface, different than that of FIG. 14, given the curved surface 152 as exemplified in FIG. 15, although the viewable exit cone of each effective light emission source may be less than the overall energy source. This may be advantageous when considering a specific energy surface that optimizes the viewed angles of light for wider or more compressed density of available rays of light.

Figure 17:
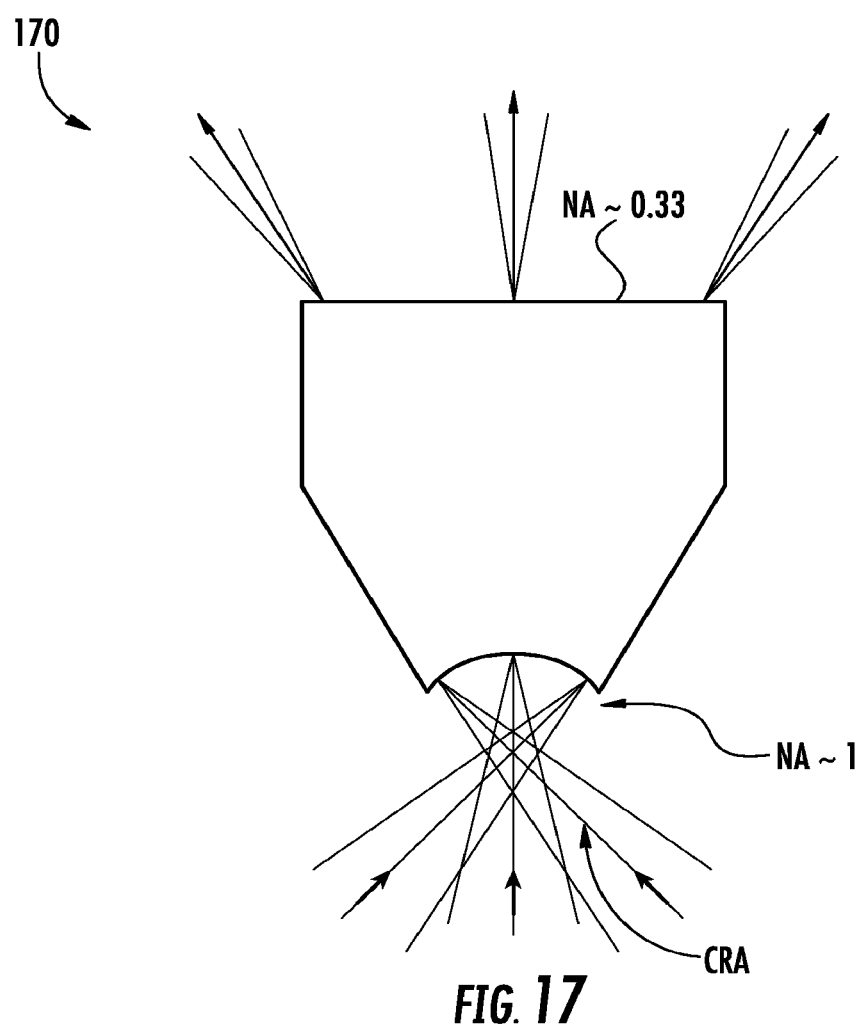
FIG. 17 illustrates an orthogonal view of the optical relay and illumination cones of FIG. 14 with a concave surface on the side of the energy source.
Figure 18:
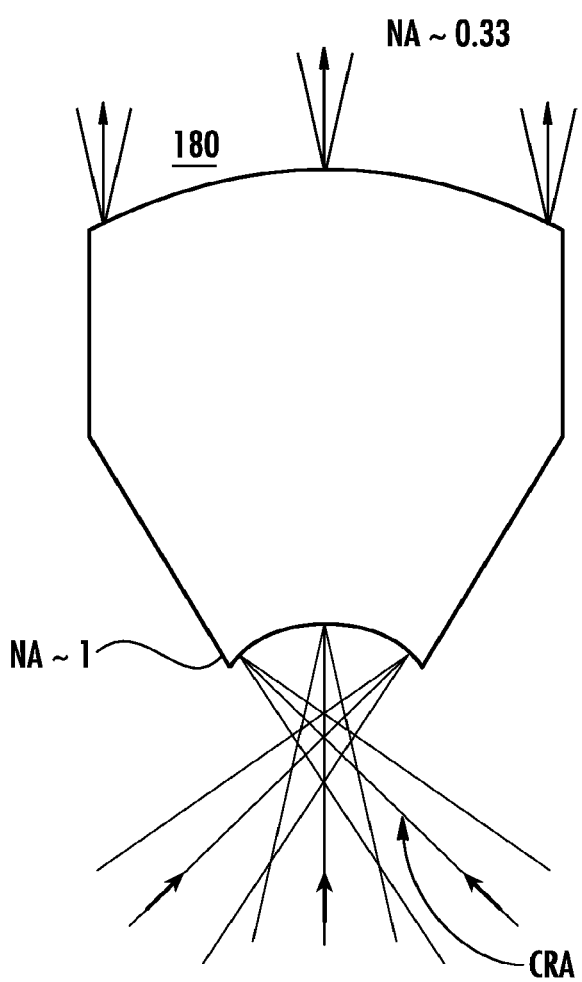
FIG. 18 illustrates an orthogonal view of the optical taper relay and light illumination cones of FIG. 17 with the same convex surface on the side of the energy source, but with a concave output energy surface geometry, in accordance with one embodiment of the present disclosure.

In another embodiment, variation in output angle may be achieved by making the energy surface of FIG. 15 convex in shape (as shown in FIGS. 17-18). If such a change were made, the output cones of light near the edge of the energy surface 152 would turn in toward the center.

In some embodiments, the relay element device may include a curved energy source (not shown) between the relay element and the projection system. In one example, both the surfaces of the relay element device may be planar. Alternatively, in other examples, one surface may be planar and the other surface may be non-planar, or vice versa. Finally, in another example, both the surfaces of the relay element device may be non-planar. In other embodiments, a non-planar surface may be a concave surface or a convex surface, among other non-planar configurations. For example, both surfaces of the relay element may be concave. In the alternative, both surfaces may be convex. In another example, one surface may be concave and the other may be convex. It will be understood by one skilled in the art that multiple configurations of planar, non-planar, convex and concave surfaces are contemplated and disclosed herein.

Figure 16:
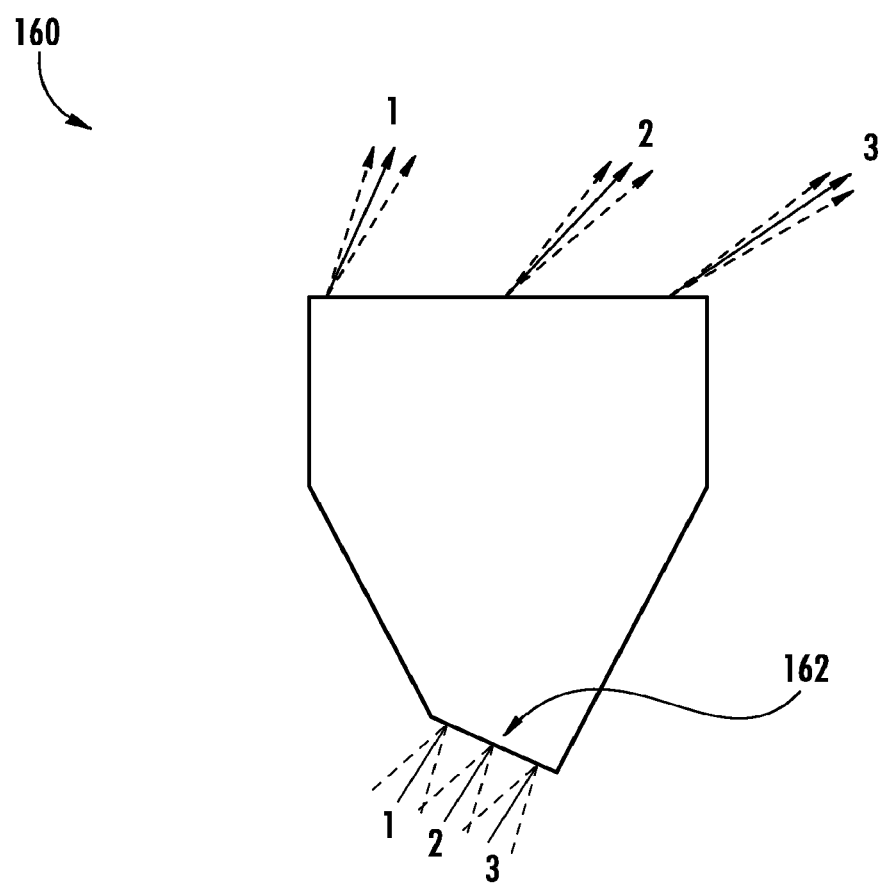
FIG. 16 illustrates an orthogonal view of the optical taper relay of FIG. 15, but with non-perpendicular but planar surface on the energy source side, in accordance with one embodiment of the present disclosure.

FIG. 16 illustrates an orthogonal view of an optical relay taper 160 with a non-perpendicular but planar surface 162 on the energy source side, in accordance with another embodiment of the present disclosure. To articulate the significant customizable variation in the energy source side geometries, FIG. 16 illustrates the result of simply creating a non-perpendicular but planar geometry for the energy source side for comparison to FIG. 15 and to further demonstrate the ability to directly control the input acceptance cone angle and the output viewable emission cone angles of light 1, 2, 3 that are possible with infinite potential surface characteristics.

Depending on the application, it may also be possible to design an energy source configuration where the energy source is a non-perpendicular geometric configuration with the energy source side remaining perpendicular or with both the energy source and the energy source side geometric configuration exhibiting various non-perpendicular geometric configurations. With this methodology, it may be possible to further increase control over the input and output energy source viewed angles of light.

In some embodiments, tapers may also be non-perpendicular to optimize a particular view angle. In one such embodiment, a single taper may be cut into quadrants and then re-assembled with each taper rotated about the individual optical center axis by 180 degrees to have the minified end of the taper facing away from the center of the re-assembled quadrants thus optimizing the field of view. In other embodiments, non-perpendicular tapers may also be manufactured directly as well to provide increased clearance between energy sources on the minified end without increasing the size or scale of the physical magnified end. These and other tapered configurations are disclosed herein.

FIG. 17 illustrates an orthogonal view of the optical relay and light illumination cones of FIG. 14 with a concave surface on the side of the energy source 170. In this case, the cones of output light are significantly more diverged near the edges of the output energy surface plane than if the energy source side were flat, in comparison with FIG. 14.

FIG. 18 illustrates an orthogonal view of the optical taper relay and light illumination cones of FIG. 17 with the same convex surface on the side of the energy source. In this example, the output energy surface 180 has a concave geometry. Compared to FIG. 17, the cones of output light on the concave output surface 180 are more collimated across the energy source surface due to the input acceptances cones and the exit cone of light produced from this geometric configuration. For the avoidance of doubt, the provided examples are illustrative only and not intended to dictate explicit surface characteristics where any geometric configuration for the input energy source side and the output energy surface may be employed depending on the desired angle of view and density of light for the output energy surface, and the angle of light produced from the energy source itself.

In some embodiments, multiple relay elements may be configured in series. In one embodiment, any two relay elements in series may additionally be coupled together with intentionally distorted parameters such that the inverse distortions from one element in relation to another help optically mitigate any such artifacts. In another embodiment, a first optical taper exhibits optical barrel distortions, and a second optical taper may be manufactured to exhibit the inverse of this artifact, to produce optical pin cushion distortions, such than when aggregated together, the resultant information either partially or completely cancels any such optical distortions introduced by any one of the two elements. This may additionally be applicable to any two or more elements such that compound corrections may be applied in series.

In some embodiments, it may be possible to manufacturer a single energy source board, electronics, and/or the like to produce an array of energy sources and the like in a small and/or lightweight form factor. With this arrangement, it may be feasible to further incorporate an optical relay mosaic such that the ends of the optical relays align to the energy source active areas with an extremely small form factor by comparison to individual components and electronics. Using this technique, it may be feasible to accommodate small form factor devices like monitors, smart phones and the like.

Figure 19:
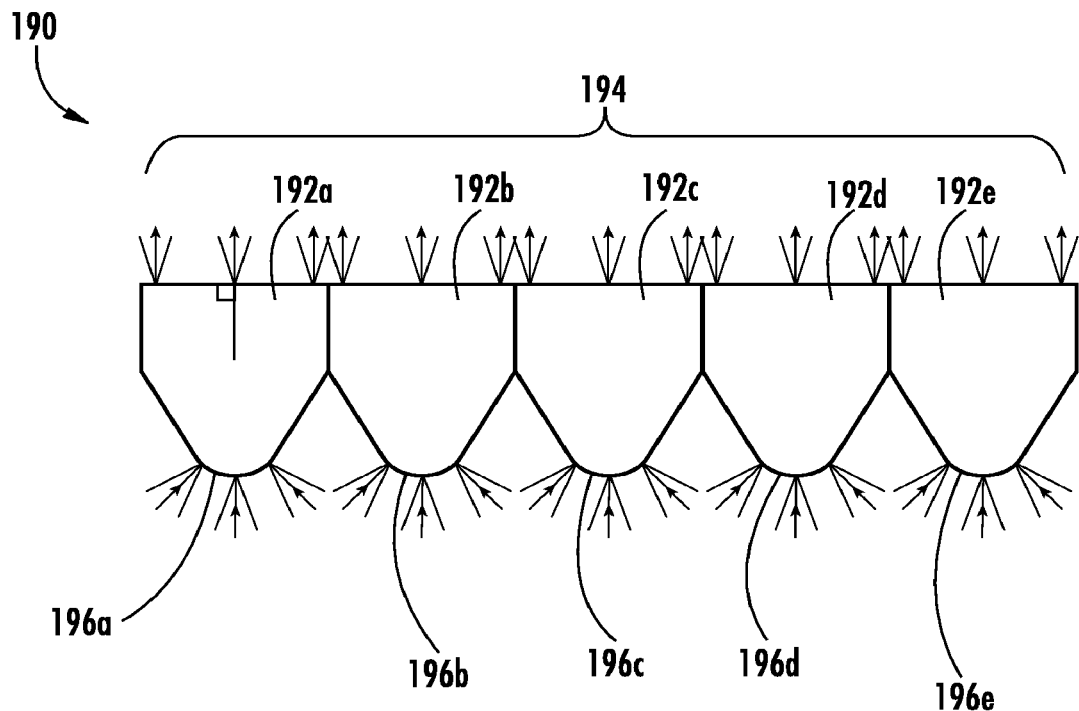
FIG. 19 illustrates an orthogonal view of multiple optical taper modules coupled together with curved energy source side surfaces to form an energy source viewable image from a perpendicular energy source surface, in accordance with one embodiment of the present disclosure.

FIG. 19 illustrates an orthogonal view of an assembly 190 of multiple optical taper relay modules 192 coupled together with curved energy source side surfaces 196 to form an optimal viewable image 194 from a plurality of perpendicular output energy surfaces 192, in accordance with one embodiment of the present disclosure. In this instance, the taper relay modules 192 are formed in parallel. Although only a single row of taper relay modules 192 is shown, in some embodiments, tapers with stacked configuration similar to those shown in FIGS. 12 and 13, may also be coupled together in parallel and in a row to form a contiguous, seamless viewable image 194.

Returning now to FIG. 19, each taper relay module 192 may operate independently or be designed based upon an array of optical relays. As shown in this figure, five modules with optical taper relays 192a, 192b, 192c, 192d, 192e are aligned together producing a larger optical taper output energy surface 194. In this configuration, the output energy surface 194 may be perpendicular, and each of the five energy source sides 196a, 196b, 196c, 196d, 196e may be deformed about a center axis, allowing the entire array to function as a single output energy surface rather than as individual modules. It may additionally be possible to optimize this assembly structure 190 further by computing the output viewed angle of light and determining the ideal surface characteristics required for the energy source side geometry. FIG. 19 illustrates one such embodiment where multiple modules are coupled together and the energy source side curvature accounts for the larger output energy surface viewed angles of light. Although five relay modules 192 are shown, it will be appreciated by one skilled in the art that more or fewer relay modules may be coupled together depending on the application.

In one embodiment, the system of FIG. 19 includes a plurality of relay elements 192 arranged across first and second directions (e.g., across a row or in stacked configuration), where each of the plurality of relay elements has a randomized refractive index variability and extends along a longitudinal orientation between first and second surfaces of the respective relay element. In some embodiments, the first and second surfaces of each of the plurality of relay elements extends generally along a transverse orientation defined by the first and second directions, wherein the longitudinal orientation is substantially normal to the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

In one embodiment, the plurality of relay system may be arranged across the first direction or the second direction to form a single tiled surface along the first direction or the second direction, respectively. In some embodiments, the plurality of relay elements are arranged in a matrix having at least a 2×2 configuration, or in other matrices including without limitation 3×3 configuration, 4×4 configuration, 3×10 configuration, among other configurations as can be appreciated by one skilled in the art. In other embodiments, seams between the single tiled surface may be imperceptible at a viewing distance of twice a minimum dimension of the single tiled surface.

In some embodiments, each of the plurality of relay elements 192 have randomized refractive index variability in the transverse orientation coupled with minimal refractive index variation in the longitudinal orientation, resulting in energy waves having substantially higher transport efficiency along the longitudinal orientation, and spatial localization along the transverse orientation. In some embodiments where the relay is constructed of multicore fiber, the energy waves propagating within each relay element may travel in the longitudinal orientation determined by the alignment of fibers in this orientation.

In other embodiments, each of the plurality of relay elements 192 is configured to transport energy along the longitudinal orientation, and wherein the energy waves propagating through the plurality of relay elements have higher transport efficiency in the longitudinal orientation than in the transverse orientation due to the randomized refractive index variability such that the energy is localized in the transverse orientation. In some embodiments, the energy waves propagating between the relay elements may travel substantially parallel to the longitudinal orientation due to the substantially higher transport efficiency in the longitudinal orientation than in the transverse orientation. In other embodiments, randomized refractive index variability in the transverse orientation coupled with minimal refractive index variation in the longitudinal orientation results in energy waves having substantially higher transport efficiency along the longitudinal orientation, and spatial localization along the transverse orientation.

Figure 20A:
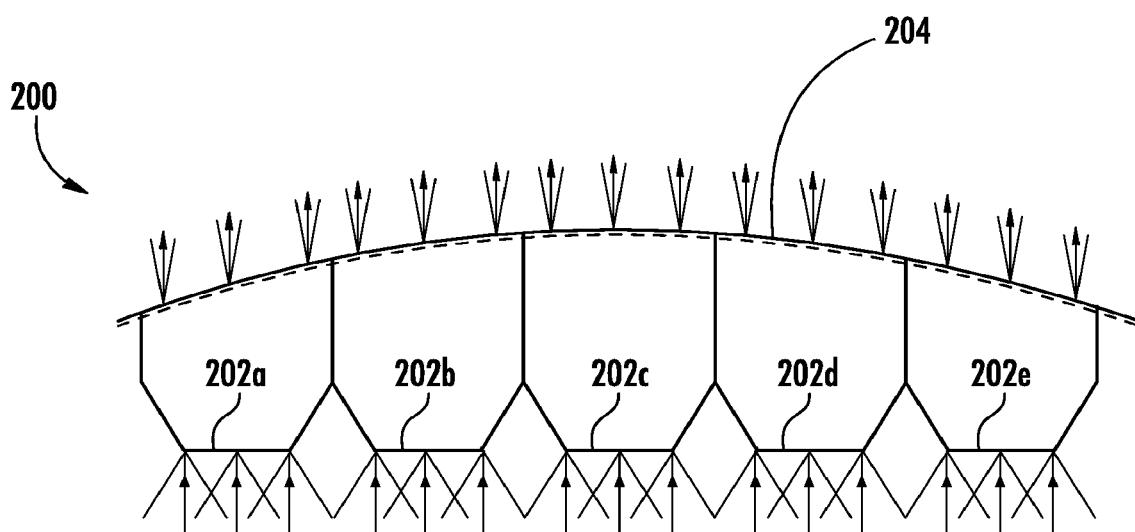
FIG. 20A illustrates an orthogonal view of multiple optical taper modules coupled together with perpendicular energy source side geometries and a convex energy source surface radial about a center axis, in accordance with one embodiment of the present disclosure.

FIG. 20A illustrates an orthogonal view of an arrangement 200 of multiple optical taper relay modules coupled together with perpendicular energy source side geometries 202a, 202b, 202c, 202d, 202e and a convex energy source surface 204 that is radial about a center axis, in accordance with one embodiment of the present disclosure. FIG. 20A illustrates the configuration of FIG. 19 with perpendicular energy source side geometries and a convex energy source that is radial about a center axis.

Figure 20B:
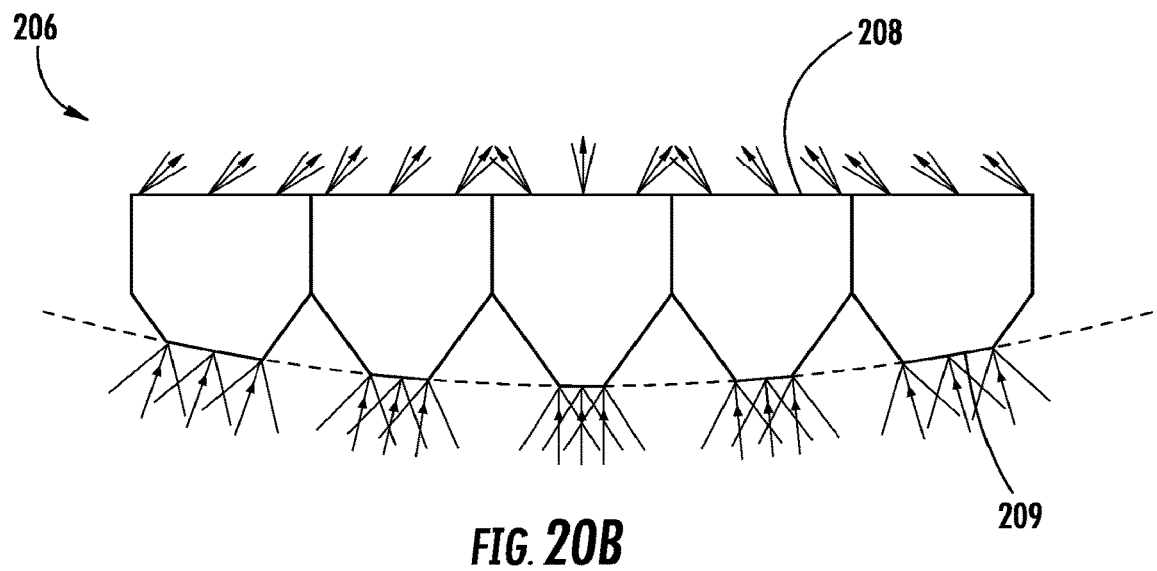
FIG. 20B illustrates an orthogonal view of multiple optical taper relay modules coupled together with perpendicular energy source side geometries and a convex energy source side surface radial about a center axis, in accordance with one embodiment of the present disclosure.

FIG. 20B illustrates an orthogonal view of an arrangement 206 of multiple optical relay modules coupled together with perpendicular energy source surface 208 geometries and a convex energy source side surface 209 radial about a center axis, in accordance with another embodiment of the present disclosure.

In some embodiments, by configuring the source side of the array of energy relays in a cylindrically curved shape about a center radius, and having a flat energy output surface, the input energy source acceptance angle and the output energy source emission angles may be decoupled, and it may be possible to better align each energy source module to the energy relay acceptance cone, which may itself be limited due to constraints on parameters such as energy taper relay magnification, NA, among other factors.

Figure 21:
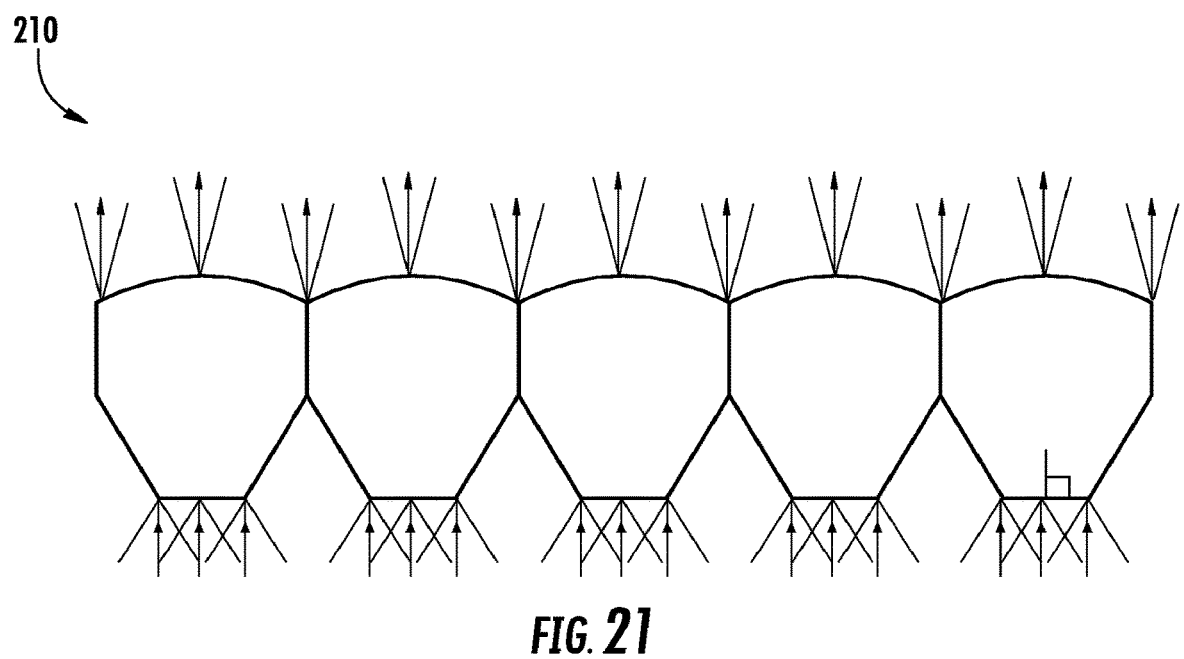
FIG. 21 illustrates an orthogonal view of multiple optical taper relay modules with each energy source independently configured such that the viewable output rays of light are more uniform as viewed at the energy source, in accordance with one embodiment of the present disclosure.

FIG. 21 illustrates an orthogonal view of an arrangement 210 of multiple energy relay modules with each energy output surface independently configured such that the viewable output rays of light are more uniform, in accordance with one embodiment of the present disclosure. FIG. 21 illustrates the configuration similar to that of FIG. 20A, but with each energy relay output surface independently configured such that the viewable output rays of light are more uniform (or less depending on the exact geometries employed) in consideration of the larger combined energy output surface.

Figure 22:
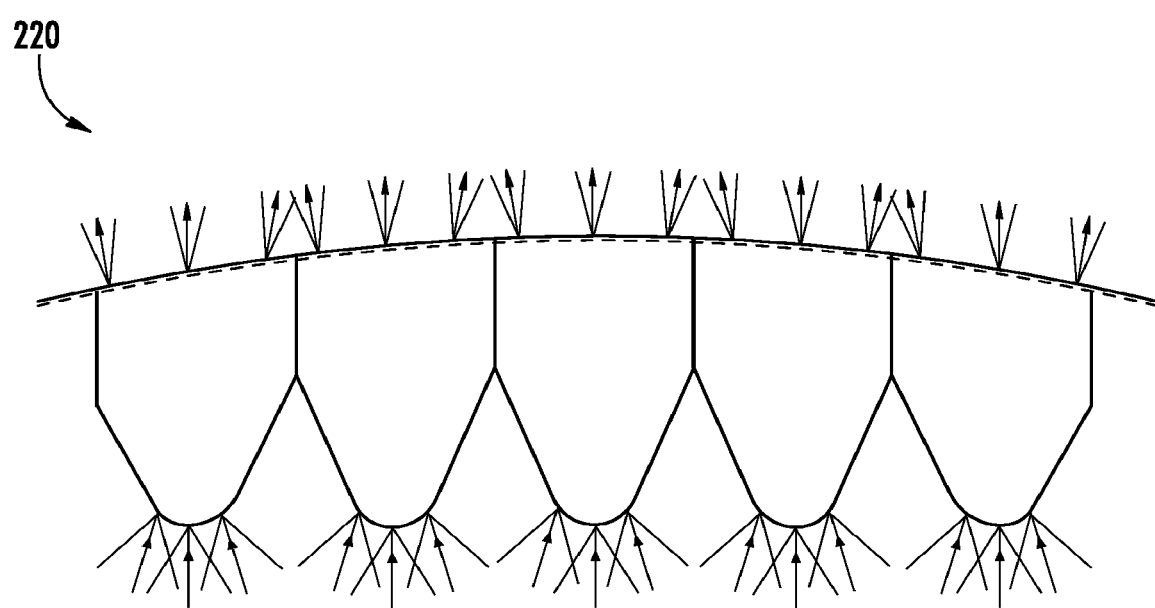
FIG. 22 illustrates an orthogonal view of multiple optical taper relay modules where both the energy source side and the energy source are configured with various geometries to provide control over the input and output rays of light, in accordance with one embodiment of the present disclosure.

FIG. 22 illustrates an orthogonal view of an arrangement 220 of multiple optical relay modules where both the emissive energy source side and the energy relay output surface are configured with various geometries producing explicit control over the input and output rays of light, in accordance with one embodiment of the present disclosure. To this end, FIG. 22 illustrates a configuration with five modules from FIG. 14 where both the emissive energy source side and the relay output surface are configured with curved geometries allowing greater control over the input and output rays of light.

Figure 23:
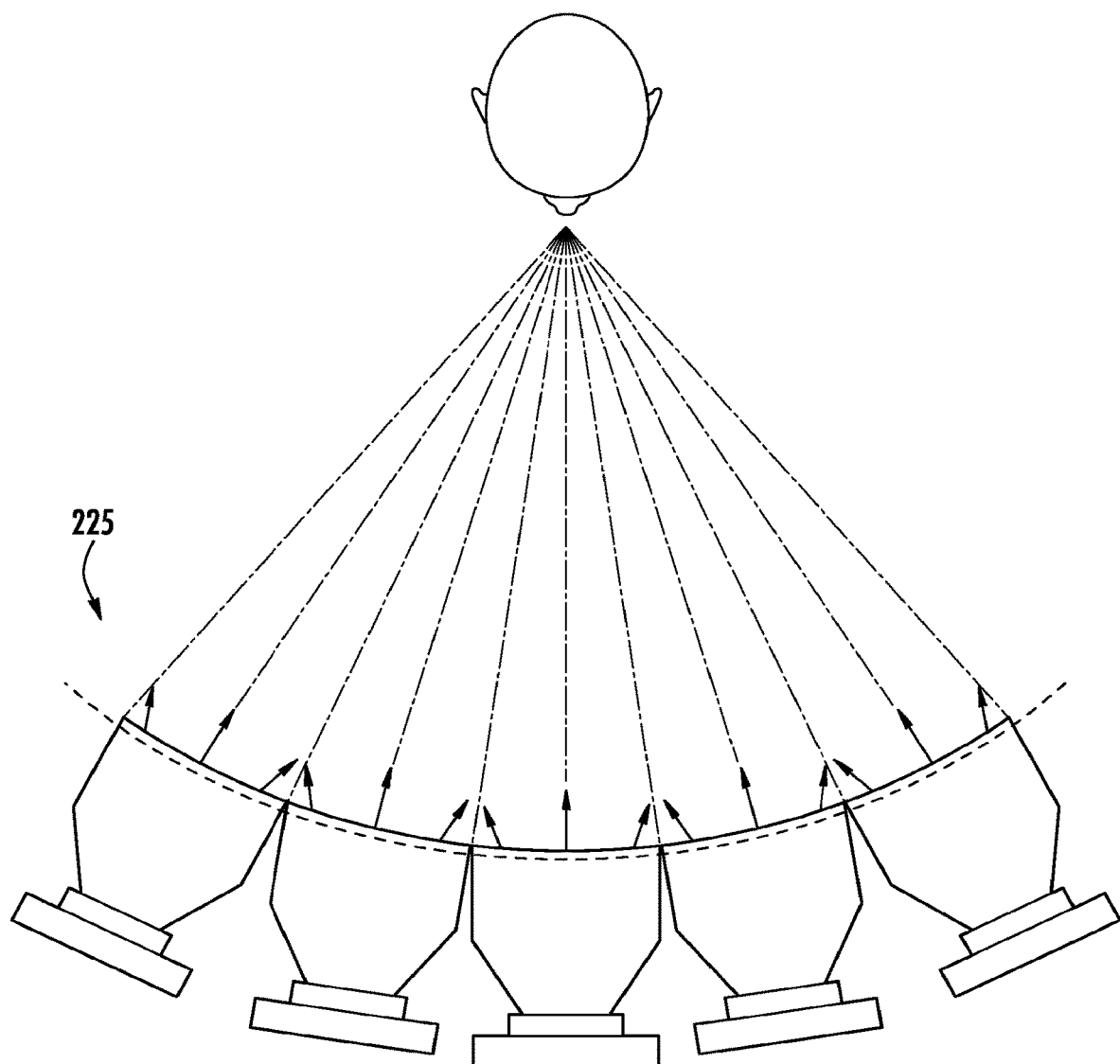
FIG. 23 illustrates an orthogonal view of an arrangement of multiple optical taper relay modules whose individual output energy surfaces have been ground to form a seamless concave cylindrical energy source which surrounds the viewer, with the source ends of the relays flat and each bonded to an energy source.

FIG. 23 illustrates an orthogonal view of an arrangement 225 of multiple optical relay modules whose individual output energy surfaces have been configured to form a seamless concave cylindrical energy source surface which surrounds the viewer, with the source ends of the relays flat and each bonded to an energy source.

In the embodiment shown in FIG. 23, and similarly in the embodiments shown in FIGS. 19, 20A, 20B, 21 and 22, a system may include a plurality of energy relays arranged across first and second directions, where in each of the relays, energy is transported between first and second surfaces which defines the longitudinal orientation, the first and second surfaces of each of the relays extends generally along a transverse orientation defined by the first and second directions, where the longitudinal orientation is substantially normal to the transverse orientation. Also in this embodiment, energy waves propagating through the plurality of relays have higher transport efficiency in the longitudinal orientation than in the transverse orientation due to randomized refractive index variability in the transverse orientation coupled with minimal refractive index variation in the longitudinal orientation. In some embodiments where each relay is constructed of multicore fiber, the energy waves propagating within each relay element may travel in the longitudinal orientation determined by the alignment of fibers in this orientation.

In one embodiment, similar to that discussed above, the first and second surfaces of each of the plurality of relay elements, in general, can curve along the transverse orientation and the plurality of relay elements can be integrally formed across the first and second directions. The plurality of relays can be assembled across the first and second directions, arranged in a matrix having at least a 2×2 configuration, and include glass, optical fiber, optical film, plastic, polymer, or mixtures thereof. In some embodiments, a system of a plurality of relays may be arranged across the first direction or the second direction to form a single tiled surface along the first direction or the second direction, respectively. Like above, the plurality of relay elements can be arranged in other matrices including without limitation 3×3 configuration, 4×4 configuration, 3×10 configuration, among other configurations as can be appreciated by one skilled in the art. In other embodiments, seams between the single tiled surface may be imperceptible at a viewing distance of twice a minimum dimension of the single tiled surface.

For a mosaic of energy relays, the following embodiments may be included: both the first and second surfaces may be planar, one of the first and second surfaces may be planar and the other non-planar, or both the first and second surfaces may be non-planar. In some embodiments, both the first and second surfaces may be concave, one of the first and second surfaces may be concave and the other convex, or both the first and second surfaces may be convex. In other embodiments, at least one of the first and second surfaces may be planar, non-planar, concave or convex.

In some embodiments, the plurality of relays can cause spatial magnification or spatial de-magnification of energy sources, including but not limited to electromagnetic waves, light waves, acoustical waves, among other types of energy waves. In other embodiments, the plurality of relays may also include a plurality of energy relays (e.g., such as faceplates for energy source), with the plurality of energy relays having different widths, lengths, among other dimensions. In some embodiments, the plurality of energy relays may also include loose coherent optical relays or fibers.

Use of Projection Technologies for Beam Steering

For various implementations of flexible energy sources and projection technologies for beam steering, it is additionally possible to leverage projection technology and control output viewable angles with further control.

Figure 24:
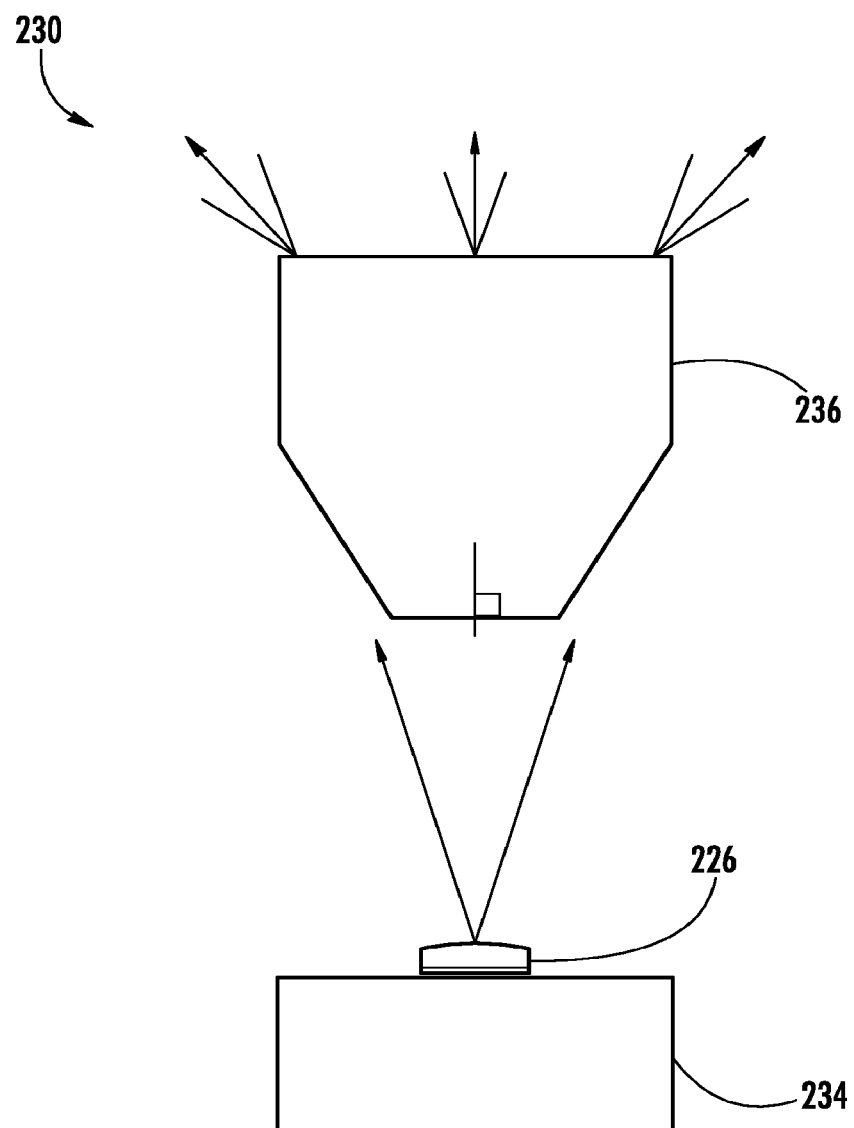
FIG. 24 illustrates an orthogonal view of image generation using an optical taper relay projection based technology, in accordance with one embodiment of the present disclosure.

FIG. 24 illustrates an orthogonal view of image generation using optical relay projection-based technologies versus the previously described panel-based methodologies, in accordance with one embodiment of the present disclosure. The projector mechanical envelope 234 contains a display which is projected using a lens 226 onto the minified end of a tapered optical relay 236.

In the most simplistic form, a known projector consists of an energy source panel (or light modulator or the like as known in the art), a light source, and a focusing lens 226. Some state of the art implementations may reduce the use of focusing elements or energy source panels by leveraging collimated or controlled light and are equally relevant for this embodiment. By simplifying the illustrations to pin hole descriptions of the projection (although for the avoidance of doubt, this is for illustration purposes and not how one would design a projection system or the relevant viewable rays of light), each viewable pixel from the projected image forms an explicitly defined viewable ray of light. Traditionally, these rays are projected onto more Lambertian surfaces that tend to scatter light and produce a more uniform image. However, if a silver screen is utilized which is traditionally used to maintain certain reflective properties of the light including polarization states, the projected image tends to retain more of the view angle dependencies of the projection system and create non-uniformities in the viewed image, including hot-spots or vignetting of the projected image.

While these properties are traditionally not ideal and avoided for projected imaging applications, the ability to relay specific angles of light through optical fibers has significant potential viewed energy source properties.

As shown in FIG. 24, leveraging a single projection source 234 and a single optical relay 236 (similar to that shown in FIG. 14) may produce a very different viewed output result in some instances. The dependencies with this approach are based upon the angle of entry for each pixel contained within the pixel(s) produced by the projection system resulting in the distance of the projection system from the energy source side of the optical taper relay as well as the field of view, aperture, illumination methodology, and other characteristics defined by the optical and light transmission system of the projection technology.

Assuming a pinhole projection system (for simplicity only), FIG. 24 illustrates the relative view angle dependency of the resulting rays of light from the energy source surface when a single projector projects onto a single energy source side of the optical material as illustrated in FIG. 24. The widest angles defined by the pixel(s) located at the edges of the projected image may produce a different resulting viewable output illumination cone than the same pixels addressed by a panel-based energy source of the same resulting projected image size or pixel pitch. This may be due to the relatively uniform angular distribution of the light from panel-based energy sources versus the more angularly retaining methodologies described by projection-based technologies.

Figure 25:
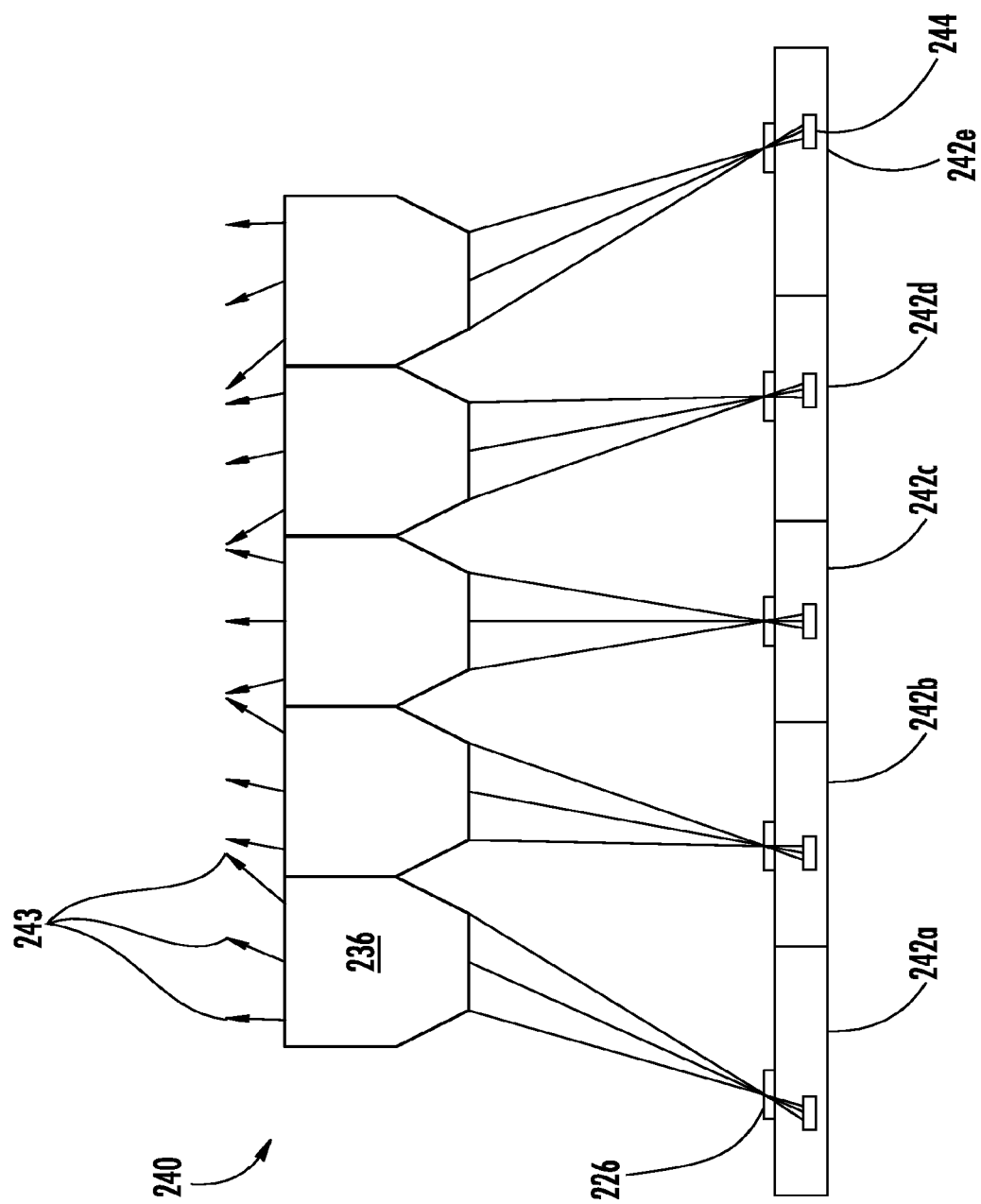
FIG. 25 illustrates an orthogonal view of an arrangement of five offset projection sources of FIG. 24 generating individual images as required for the output viewable rays of light from tapered optical relays with chief ray angles produced by a specified configuration, in accordance with one embodiment of the present disclosure.

FIG. 25 illustrates an orthogonal view of an arrangement 240 of five offset projection sources 242a, 242b, 242c, 242d, 242e of FIG. 25 generating individual images as required for the output viewable rays of light from tapered optical relays 236 with chief ray angles 243 produced by a specified configuration, in accordance with one embodiment of the present disclosure. With this approach, it is possible to project multiple images from one or more projection sources 242a, 242b, 242c, 242d, 242e in a parallel optical configuration where the viewable rays of light may retain angular bias for each described ray of light. The use of off-axis projection optics, where the energy source panel 244 is displaced from the optical axis of the energy source lens 226 by an amount in proportion to the energy source panel distance from the center of the array, may allow for the overlap of each of these defined images while maintaining a parallel array structure. This approach provides the ability to expand the energy source viewable angle of view when identical images are presented and calibrated to the energy source side, or to project different images and calibrate a multiplicity of 2D viewable images defined by view angle, or more evenly distribute controlled angles of light for holographic and/or light field display.

In other embodiments, each of the plurality of energy relays 236 may include a sloped profile portion between the first and second surface of the respective relay element, where the sloped profile portion can be angled, linear, curved, tapered, faceted, or aligned at a non-perpendicular angle relative to a normal axis of the plurality of relay elements.

In operation, similar to that discussed above, the first surface of each of the plurality of energy relays may be configured to receive an energy wave from an emissive energy source unit, the emissive energy source unit including a mechanical envelope (e.g., the entire length and width of each of individual unit 242) having a width different than the width of at least one of the first surface and the second surface. In one embodiment, the energy waves passing through the first surface has a first resolution, while the energy waves passing through the second surface has a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of about +/−10 degrees relative to the normal to the second surface, irrespective of location on the second surface.

The mechanical envelope includes a projection system having a waveguide to steer the wave energy as a function of position, and a plurality of emissive energy sources disposed adjacent to the relay elements, the plurality of emissive energy sources being planar, non-planar or combinations thereof. In some embodiments, the plurality of emissive energy sources may be arranged in various configurations including at least one of tilted, aligned at an angle, staggered, on-axis, off-axis, rotated, parallel, perpendicular, or any combinations thereof (best shown in FIGS. 26-28). In another embodiment, the plurality of emissive energy sources may be arranged in a radially-symmetrical configuration (best shown in FIGS. 26-28). This will become more apparent in subsequent figures and discussion.

The projection system may include focused energy transmission through a waveguide, and further include a telecentric lens relay element at an off-aligned angle. The system may further include a curved energy source between the plurality of energy relays and the projection system.

It may additionally be advantageous to align the projection sources by converging the projection systems to generate an illumination overlap without, or with less, optical offset. This may be performed in a radial, symmetric, non-symmetric, planar rotated or any combination of the above where exact distances and projected angles are known through manufacturing or calibration processes.

In a variation of FIG. 25, an arrangement of projection sources are aligned in a planar orientation with rotation to produce overlap at the energy source side of each module, in accordance with one embodiment of the present disclosure.

Figure 26:
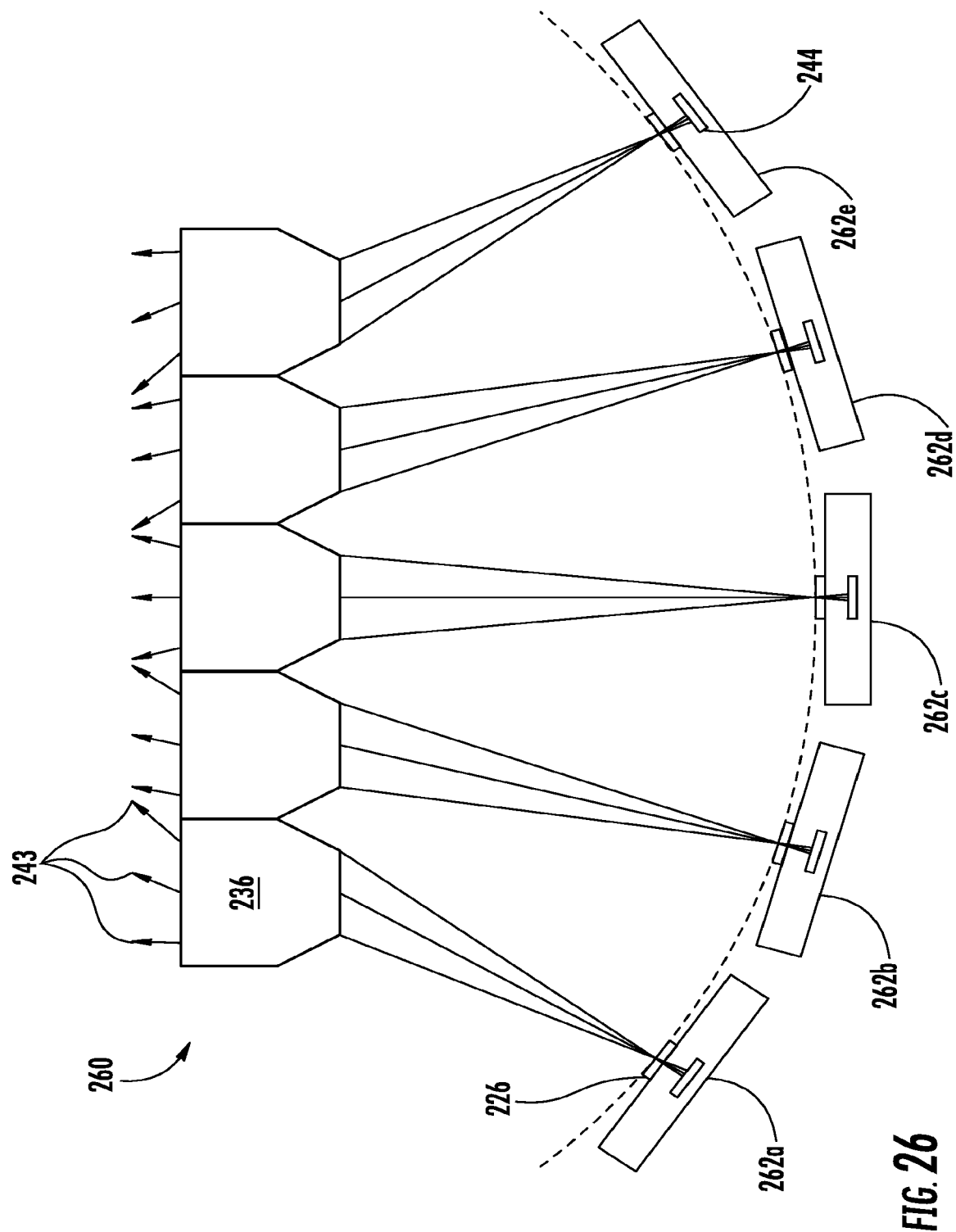
FIG. 26 illustrates an orthogonal view of a variation of FIG. 24 where projection sources are converged through radially symmetric configurations to overlap images on the energy source modules, in accordance with one embodiment of the present disclosure.

FIG. 26 illustrates an orthogonal view of a variation of FIG. 25 where an arrangement 260 of projection sources 262a, 262b, 262c, 262d, 262e are converged through radially symmetric configurations to overlap images on the energy source modules, in accordance with one embodiment of the present disclosure.

When any rotational convergence is leveraged, one must also account for the resulting keystone of the projected image as well as acceptable focus that may not be a wide enough region to maintain focus across all pixels presented to the energy source side of the module.

To accommodate image keystone-ing, it may be possible to calibrate the system to project warped images that account for the exact required displacement produced by each individual projection system and one may over-scan the image circle produced by each projector in order to eliminate any projected regions that would otherwise result in no illumination information if aligned to the largest width or height of the projected image.

To accommodate the increased acceptable focus range for any optical system not sufficient, one may decrease the aperture size to produce wider depth of field, alter the optics to accommodate the different focus plane required, leverage other projection technologies that employ more collimated light sources and/or leverage any other projection variation known in the art. In one such embodiment, a MEM's-type projection system steers spatially modulated collimated light to produce a focus free image regardless of distance.

It may also be possible to leverage the above projection approaches with the non-perpendicular energy source side and energy source surface configurations as well as configurations with an array of modules as previously defined in the above panel-based energy source section.

Figure 27:
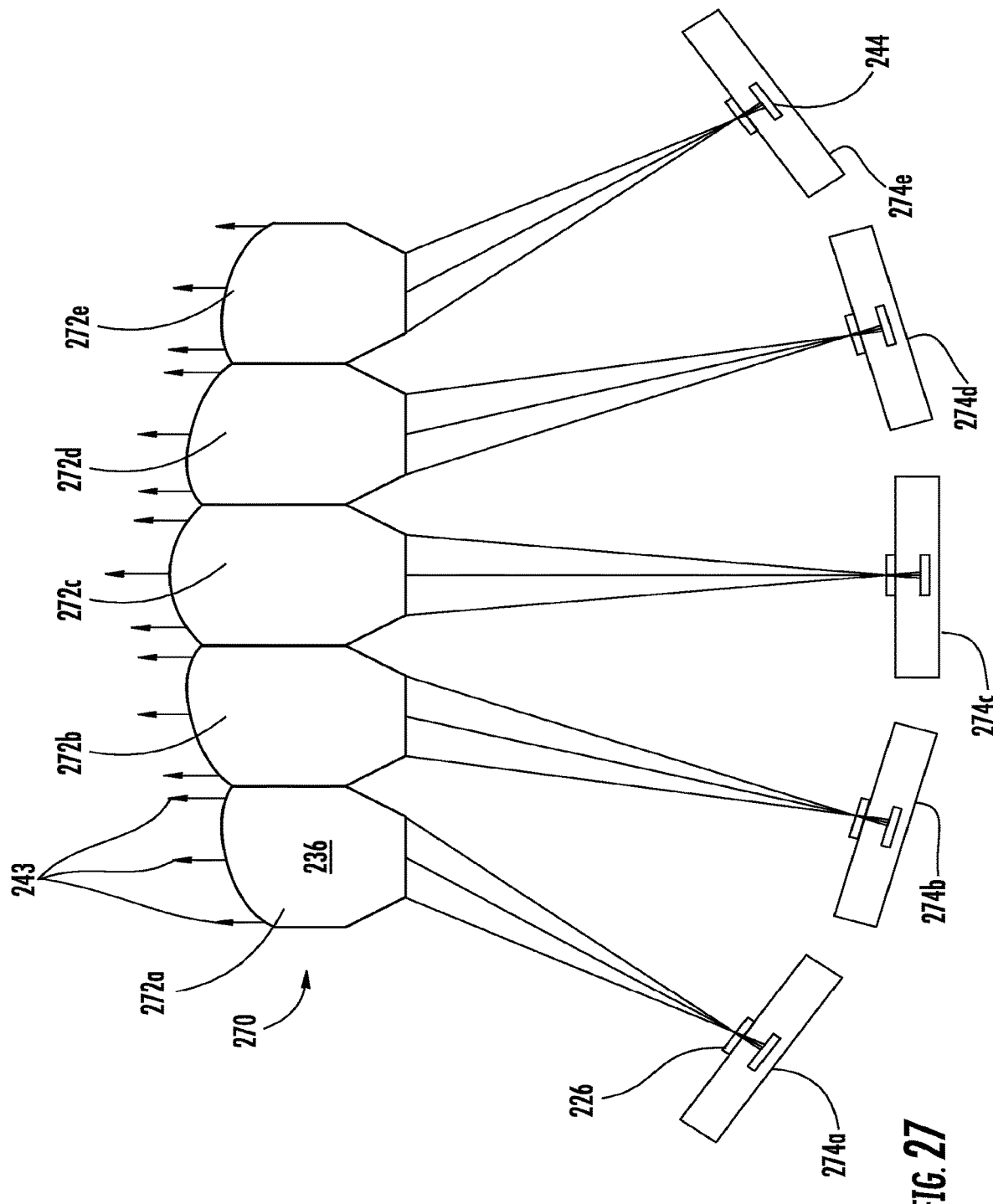
FIG. 27 illustrates an orthogonal view of an embodiment where five optical taper relay modules are aligned, each with an independently calculated concave energy source side surface and an independently calculated convex energy source configuration, each of the five projection sources configured in a radially converged fashion providing control over input, output and viewable angle of view profiles.

FIG. 27 illustrates an orthogonal view of an arrangement 270 where five optical taper relay modules 272a, 272b, 272c, 272d, 274e are aligned, each with an independently calculated concave energy source side surface and an independently calculated convex energy source configuration, and with five projection sources 274a, 274b, 274c, 274d, 274e configured in a radially converged fashion producing extreme control over input, output and viewable angle of view profiles, in accordance with one embodiment of the present disclosure. For the avoidance of doubt, FIG. 27 is one exemplary illustration where any surface geometries may have been leveraged and any projection configuration may have been employed, or any combination of these approaches with any panel-based approach may have been leveraged depending on the specific energy source requirements.

Figure 28:
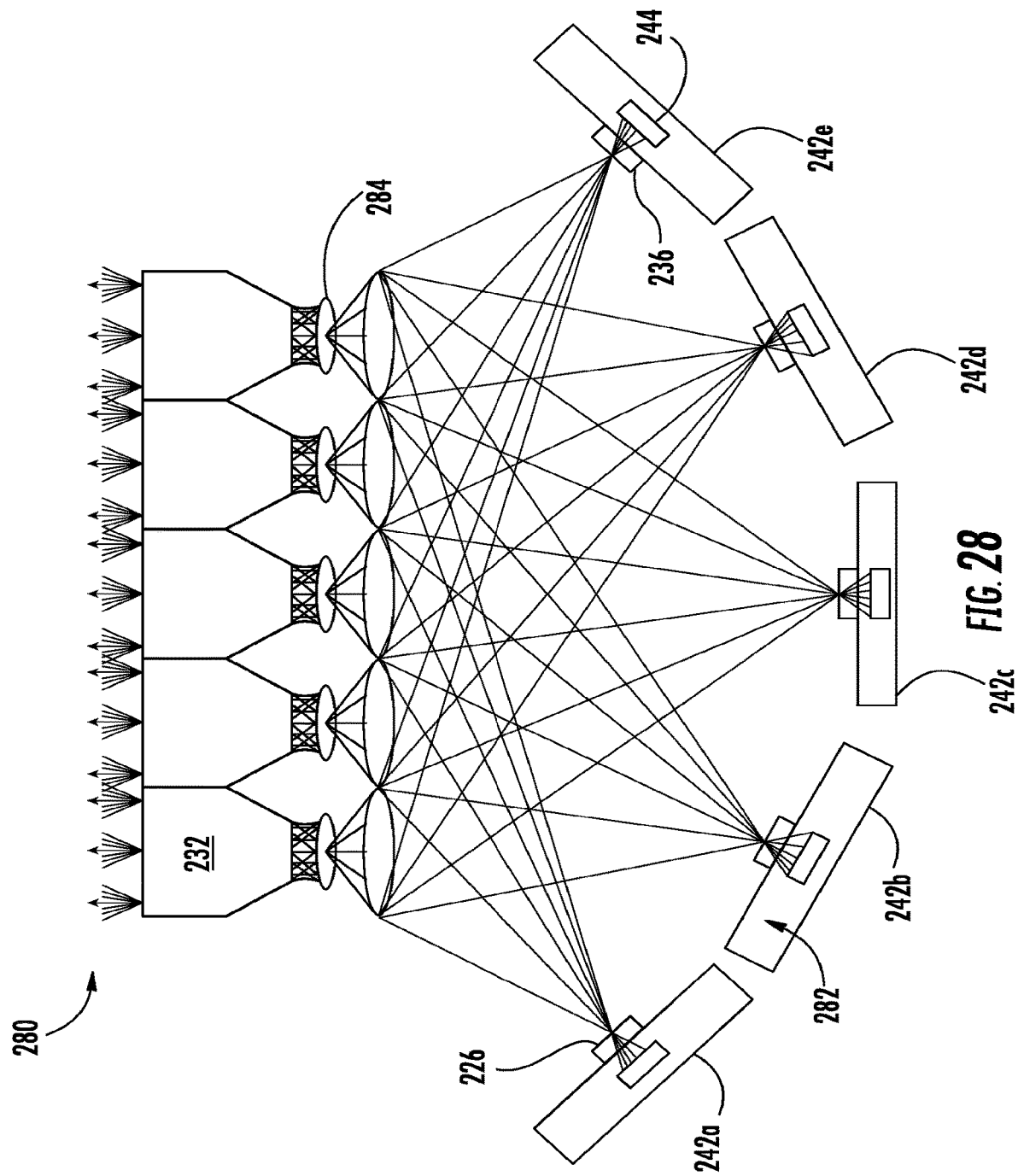
FIG. 28 illustrates an orthogonal view of an arrangement that leverages the modules from FIG. 27 but with each projector illuminating every optical relay, in accordance with one embodiment of the present disclosure.

FIG. 28 illustrates an orthogonal view of an arrangement 280 that leverages the modules from FIG. 27 but with each projector 242a, 242b, 242c, 242d, 242e illuminating every optical relay. The image from each individual projection source 282 may be subdivided by the number of optical relays 232. A dedicated multi-element lenslet from a lens array 284 focuses the overlapping light from all the projectors onto the first surface of each relay. This produces near-telecentric rays upon exit of each partial image from the projectors. This architecture eliminates the need for multiple projection sources dedicated for each optical relay.

In some instances, it may be possible to produce a lenslet array that has an aperture with an image circle that is the same (or similar, or intentionally designed otherwise) diameter as the energy source side diameter (and accounting for any over scanning that is required from converged cameras). For dense projection arrays, each overlapping image may be offset slightly based upon the CRA of each generated lenslet image. More complex optics may be implemented to further produce telecentric or near telecentric rays at the exit of the lenslet array to help accommodate this potential alignment challenge or artifact.

It is additionally possible to calculate the exact projection distance and/or CRA that would result in a projected image from the respective lenslet where an off-axis projection source may no longer align to the energy source side module directly underneath of the lenslet. In this fashion, it is possible to design a system that intentionally corrects projected sub-images to avoid the addition of more complex optical systems. Because this correction is primarily a shift to remove off-axis distortions, this correction is denoted as an offset. In reality, it is an offset and a warp, which requires additional image calibration and characterization.

In one such embodiment, five projection sources are leveraged with 10 lenslets and 10 optical relays where projector N addresses each of the energy source side images directly, each projector N−1 or N+1 is offset by 1 module (or some amount represented by X) respective to its orientation to the N projector, and the N−2 or N+2 is offset by 2 (or some number larger than X) modules respective to its orientation to the N projector in order to avoid provide increased angles of view from a singular projection array. This description is for exemplary purposes only and may be combined with any density, or other configuration previously described. Additionally, it is possible to leverage a more complex optical system to form more telecentric rays, in addition to applying a correction offset to projection clusters by a predetermined calibrated amount and simultaneously gain the benefit of the more telecentric structure.

For the avoidance of doubt, any of the above-proposed configurations may exhibit horizontal and/or array distributions and nothing contained within these descriptions or illustrations should be interpreted as a single horizontal or vertical configuration.

Addition of Rigid and Flexible Energy Relays or Bent Relays to the Fiber Optic Mosaic Design It is often advantageous to introduce an additional energy relay between the emissive energy source and the output energy surface in order to have more efficient mechanical alignment. To this end, for an energy source, one or more optical faceplates, optical fibers, optical elements or additional relay elements may be introduced as necessary for the mechanical design, alignment, and/or calibration process. FIG. 29 illustrates an orthogonal view of a system 290 that includes an additional optical faceplate 292, which offers a mechanical offset between the energy source and the taper, which may be advantageous. Multiple additional optical elements may be introduced and the embodiment depicted in FIG. 29 is provided for exemplary purposes only.

In a system with many side-by-side optical relays, it may be desirable to stagger the faceplates as noted in FIG. 29 to provide clearance for the mechanical envelope of the energy sources without altering the position of the optical center of the first optical taper, by off-setting the position of each energy source along the z-axis, perpendicular to the energy source. In this fashion, a faceplate or optical taper may exist with a varied length in relation to the adjacent energy source module, and this staggering may occur over multiple columns or rows within an array to produce higher overall mechanical density without offsetting the energy sources with other means.

Figure 30:
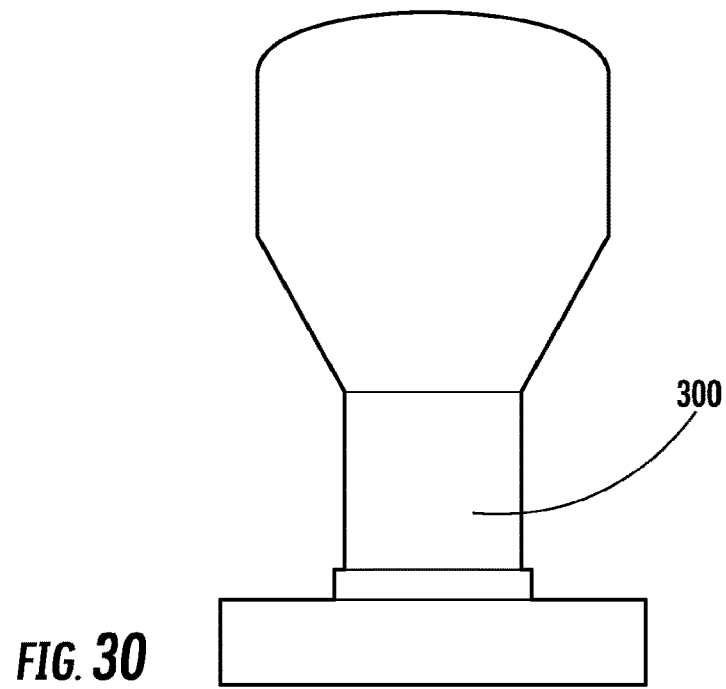
FIG. 30 illustrates an orthogonal view of a system that includes an additional optical faceplate, which offers a mechanical offset between the energy source and the taper, in accordance with one embodiment of the present disclosure.

FIG. 30 illustrates yet an orthogonal view of a system 300 that includes an additional optical faceplate, in accordance with another embodiment of the present disclosure. Similar to that of FIG. 29, the system 30 of FIG. 30 has a different relay surface (e.g., concave) and with an optical faceplate and the relay element being shorter in length. It will be appreciated by one skilled in the art that any number of additional relay elements may be introduced in any optical configuration, with or without the additional optical faceplate relay element.

Figure 31:
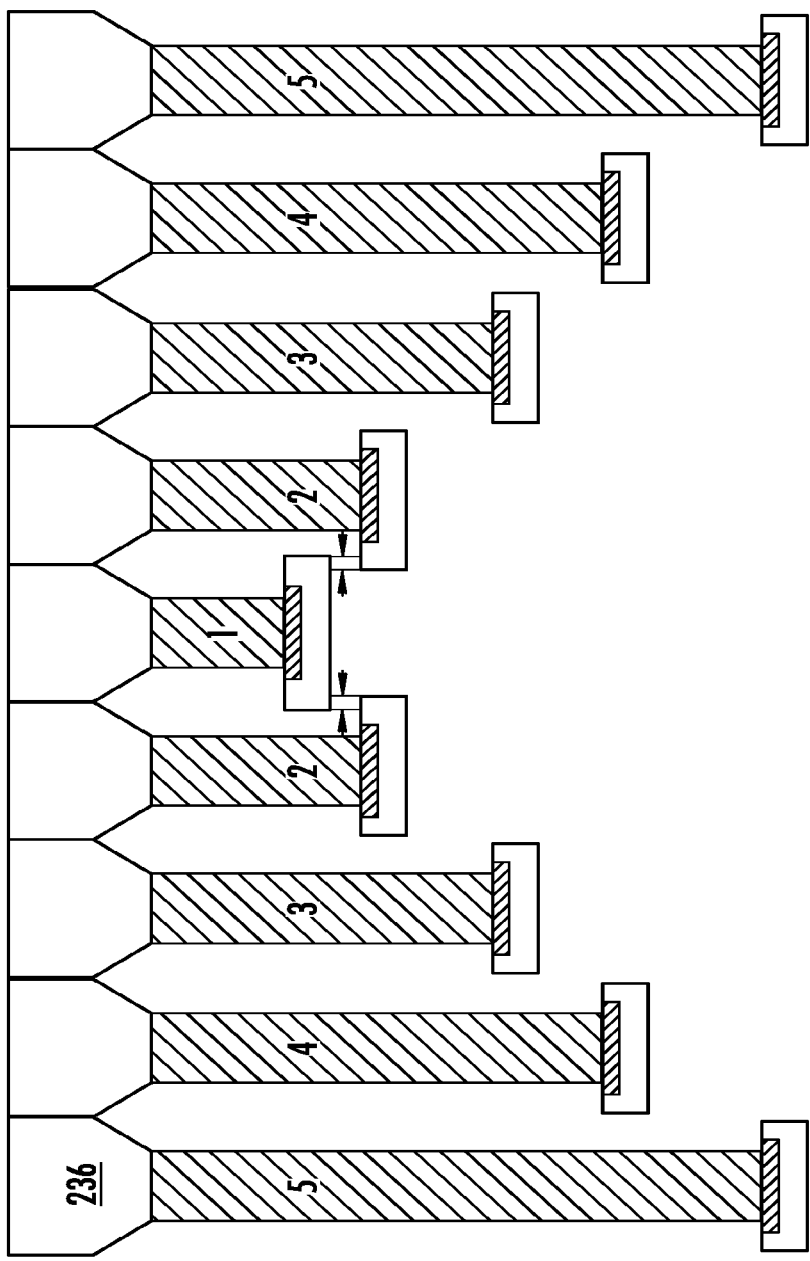
FIG. 31 illustrates an embodiment with an array of nine optical relays but five different staggered lengths of faceplate providing sufficient clearance for the mechanical envelopes for each of the energy sources within the system.

FIG. 31 illustrates one such embodiment with an array of nine tapered optical relays 236 but five different staggered lengths of faceplates 1-5, providing sufficient clearance for the mechanical envelopes for each of the energy sources within the overall energy source system.

Depending on the specifics of the energy source pixel pitch and the required output pixel and angular density, there often arises the necessity to maintain the same or decrease the active image area dimensions while mechanically providing sufficient clearance for required mechanical envelopes.

Figure 32:
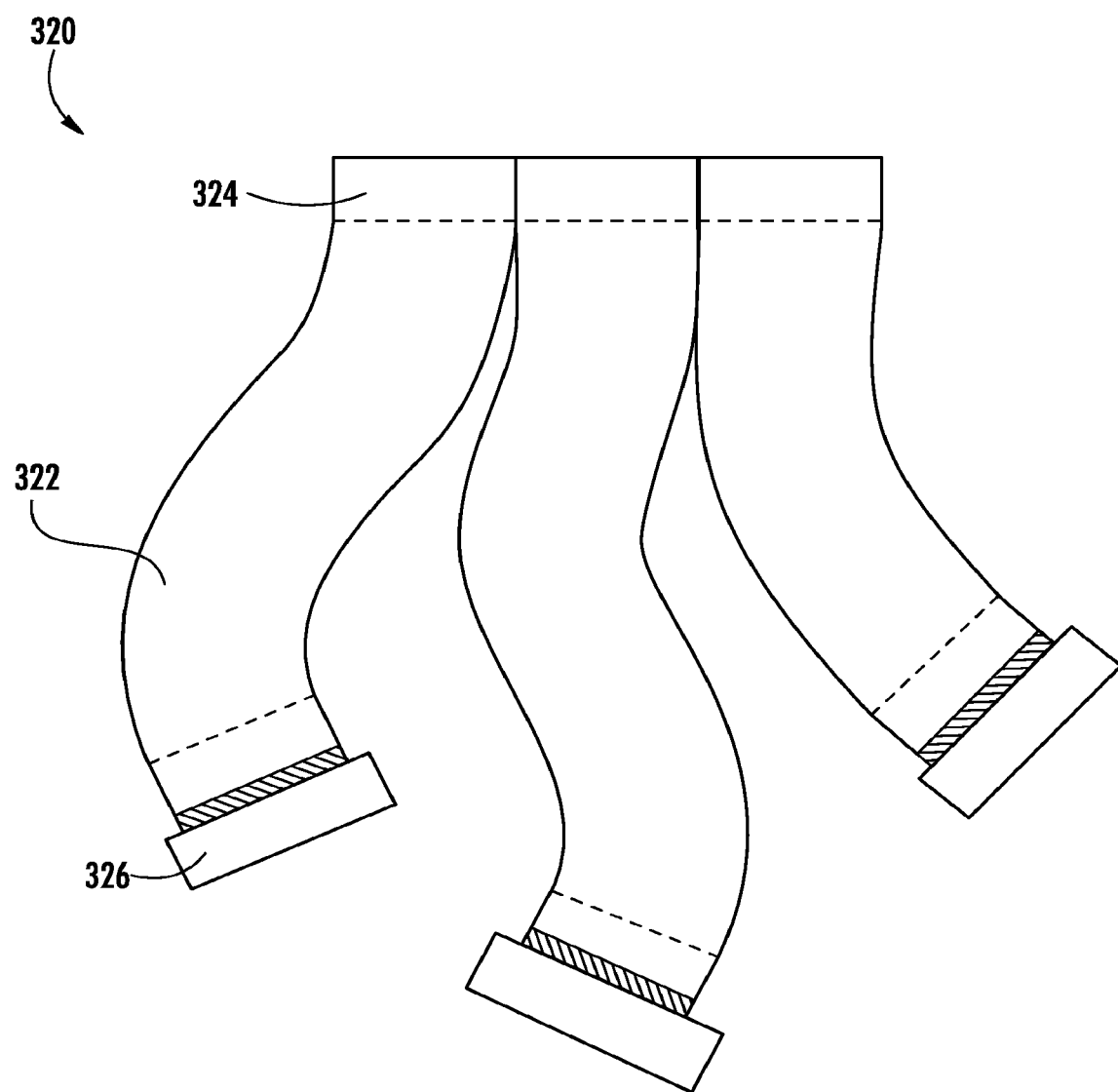
FIG. 32 illustrates an orthogonal view of multiple energy sources coupled together without any magnification by leveraging loose and/or bent optical relays, in accordance with one embodiment of the present disclosure.

FIG. 32 illustrates an orthogonal view of an arrangement 320 of multiple energy sources 326 coupled together without any magnification by leveraging loose and/or bent optical relays, in accordance with one embodiment of the present disclosure. In the most simplistic form where no changes to the active image area are desired, it is possible to leverage a loose coherent optical relay 322, image conduit, or a bent optical relay. A loose coherent optical relay 322 may be designed with two dense ends to maintain coherency between energy source side and energy source regions. A bent optical relay or image conduit, in one embodiment, may be an extruded faceplate that is designed with a specified curve as required for the mechanical design. Once the loose or bent optical relays are designed, they may be aggregated contiguously to form a single output display surface, and the alternate ends may be joined to the active area of the energy source without mechanical envelope interference. FIG. 32 illustrates such a design where multiple energy sources are coupled together without any magnification.

In one embodiment, a system 320 may include a plurality of flexible energy relays 322 each configured to transport energy between first and second ends of the respective relay, wherein the first ends of the plurality of flexible energy relays are optically coupled to a plurality of emissive energy source units 326, the plurality of emissive energy source units 326 being spaced apart from the second ends of the plurality of flexible energy relays, and where the second ends of the plurality of flexible energy relays are bundled to form an aggregated output energy surface 324. Without an additional tapered energy relay, the aggregated output energy surface may be spatially non-magnified relative to the energy from the emissive energy source units. If a tapered energy relay is attached to the aggregated output energy surface, the aggregated output energy surface may be relayed to the taper's second surface, which may be spatially minified or magnified relative to the energy from the emissive energy source units depending on the taper magnification or de-magnification. It will be appreciated by one skilled in the art that the disclosures above directed to relay elements may be incorporated herein.

Figure 33:
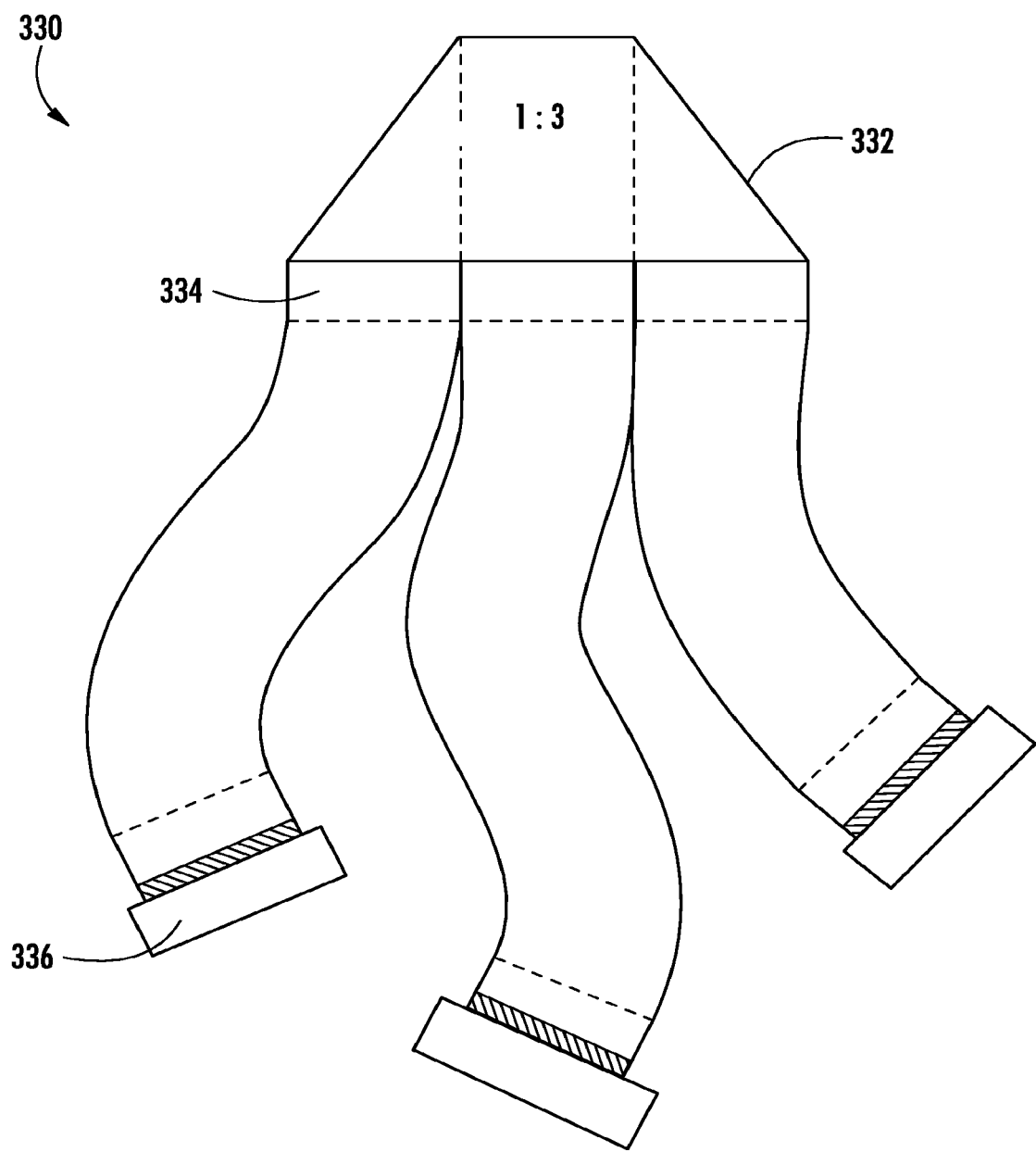
FIG. 33 illustrates an orthogonal view of FIG. 32 with an additional tapered energy relay added to the active display side to minify the image and provide a smaller dimension to the overall display, in accordance with one embodiment of the present disclosure.

FIG. 33 illustrates an orthogonal view of an arrangement 330, which is that of FIG. 32 with an additional optical taper relay 332 added to the active energy source to minify the image and provide a smaller dimension to the overall energy source, in accordance with one embodiment of the present disclosure.

In one embodiment, a system 330 may include a plurality of flexible relay elements 334 each configured to transport energy between first and second ends of the respective relay elements, where the first ends of the plurality of flexible relay elements are optically coupled to a plurality of energy source units 336, the plurality of energy source units 336 being spaced apart from the second ends of the plurality of flexible relay elements, and where the second ends of the plurality of flexible relay elements are bundled to form an aggregated energy surface 332.

In some embodiments, the plurality of flexible relay elements 334 include a plurality of loose coherent optical relays. In other embodiments, the aggregated energy surface 332 is an end portion of the system, the energy at the end portion being spatially non-magnified relative to the energy from the energy source units 336. In another embodiment, the aggregated energy surface 332 is an end portion of the system, the energy at the end portion being spatially magnified relative to the energy from the energy source units 336. In yet another embodiment, the aggregated energy surface 332 is an end portion of the system, the energy at the end portion being spatially de-magnified relative to the energy from the energy source units 336.

For mechanical reasons, it may be advantageous to provide a tapered optical relay that produces some amount of magnification to the energy source to offset any additional optical elements that need to be added. In this fashion, it may be possible to design a system with two or three (or more) optical elements where the first tapered optical relay is of a magnified dimension that in aggregate with the other tapers in the array, if any, equals the correct dimension with an amount of magnification necessary to couple the loose coherent optical relay or bent optical relay. This second element may be attached directly to the active energy source area, or a third optical faceplate or tapered optical relay as optimized for the design.

Figure 34:
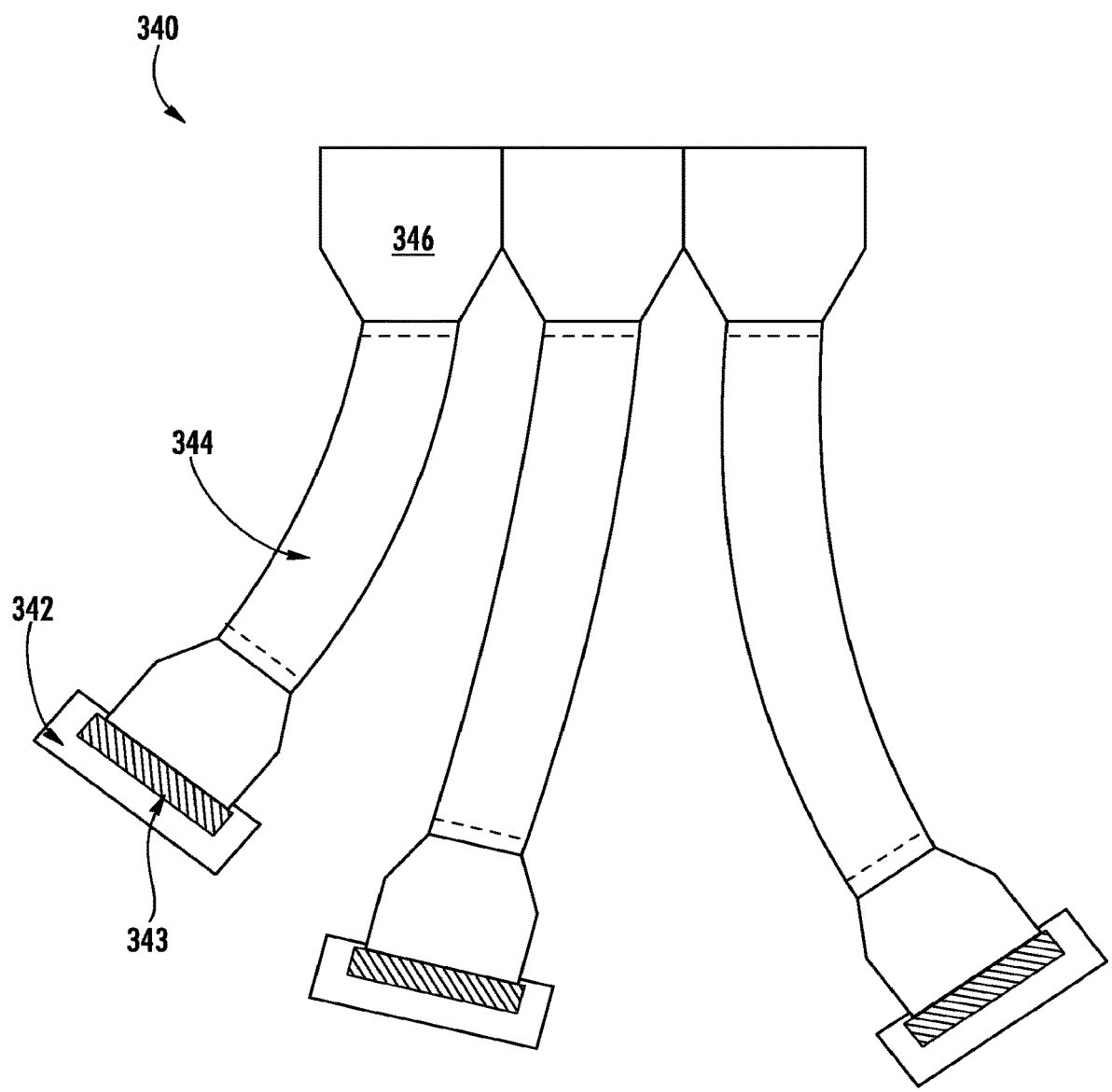
FIG. 34 illustrates an orthogonal view of an arrangement with a first tapered optical relay to form the minified energy source surface, a second loose coherent optical relay or bent optical relay to propagate the image and mate an additional optical faceplate or taper as provisioned for the mechanical design, in accordance with one embodiment of the present disclosure.

FIG. 34 illustrates an orthogonal view of an arrangement 340 with a first tapered optical relay connected to display 343 with mechanical envelope 342, the optical minified end of the tapered optical relay to present a minified image surface, a second loose coherent optical relay or bent optical relay 344 to propagate the minified image and mate to an additional tapered optical relay 346 which is part of a tapered optical relay mosaic with a single energy surface 348, in accordance with one embodiment of the present disclosure.

Figure 35:
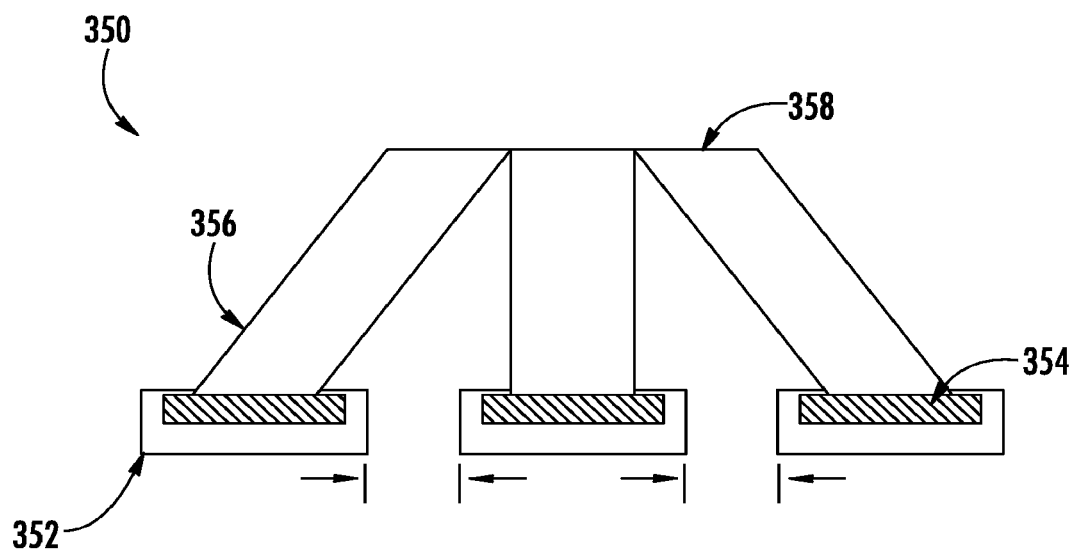
FIG. 35 illustrates an orthogonal view of an embodiment with the ability to slant an optical relay faceplate at varying degrees depending on the location of the optical relay element in the overall array to eliminate gaps with limited mechanical envelope spacing, in accordance with one embodiment of the present disclosure.

FIG. 35 illustrates an orthogonal view of an arrangement 350 with the ability to slant an optical faceplate 356 at varying degrees depending on the location of the optical relay element in the overall array to eliminate gaps with limited mechanical envelope spacing and create a single energy surface 358 in accordance with one embodiment of the present disclosure. Non-perpendicular faceplates may also be constructed in an additional embodiment to mitigate smaller gaps between energy sources that do not require a complete tapered design. In FIG. 35, the energy wave source 354 may be provided within the mechanical envelope 352 for the drive electronics.

For the avoidance of doubt, the examples provided are for exemplary purposes only and any combination of optical relay elements may be combined as required or suitable for practical, product or mechanical purposes. To clarify, a tapered optical relay has a magnification of some ratio which can include 1:1, thus all disclosures related to optical relay tapers may be considered interchangeable between optical relay tapers, optical faceplates, bent optical relays, loose coherent optical relays or any other use of these properties and materials for the purposes of aggregating multiple energy sources into a singular contiguous energy source.

View Dependency of Optical Fibers

Figure 36:
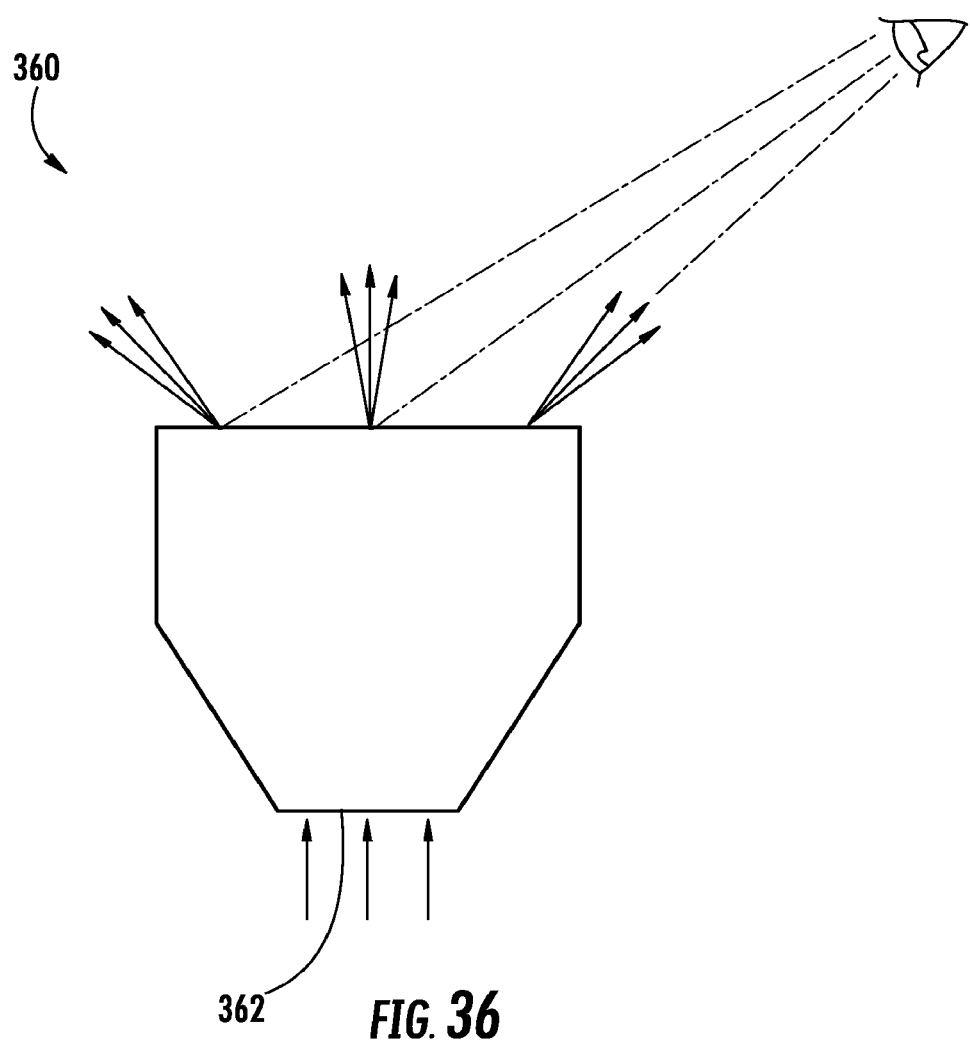
FIG. 36 illustrates an orthogonal view of a general geometry that is produced with an optical taper relayed design, in accordance with one embodiment of the present disclosure.

FIG. 36 illustrates an orthogonal view of a general geometry that is produced with an optical taper relay design 360, in accordance with one embodiment of the present disclosure. An angle of light entering a minified end 362 of the taper becomes more collimated as the diameter increases because the medium over which the light rays travel is no longer parallel and the resulting angle of exit is decreased. These more collimated rays, however, may tend to an angle that may not be perpendicular to the surface of the energy source. The same applies in reverse; a ray of light entering the magnified end of a taper becomes less collimated as the diameter decreases. FIG. 36 illustrates the concept with the general geometry that is produced with such a tapered relay element design.

In one embodiment, a system may include a plurality of energy source units configured to provide an energy surface, the plurality of energy source units having a first pitch, a plurality of relay elements disposed adjacent to an energy source, the plurality of relay elements having a second pitch, the second pitch smaller than the first pitch, where a first energy source unit of the plurality of energy source units is configured to have a first field of view defined by an angular extent of energy propagation paths through the first energy source unit, and where a subset of the plurality of relay elements disposed in the energy propagation paths are configured to redistribute the energy propagation paths such that the angular extent of the energy propagation paths through the subset of the plurality of relay elements have a second field of view wider than the first field of view.

In some embodiments, each energy source unit of the plurality of energy source units is a pixel or each energy source unit of the plurality of energy source units is a tapered relay element, and the energy propagation paths are light paths. In other embodiments, the energy source is provided on a surface of the plurality of energy source units. In some embodiments, the surface on which the energy source is provided on is a virtual surface, where the virtual surface is a surface configured to receive energy relayed from the plurality of energy source units. In other embodiments, the plurality of relay elements include faceplates, optical elements and optical fibers.

In one embodiment, each of the plurality of relay elements may be operable to redistribute energy through the energy propagation paths with higher transport efficiency in the longitudinal orientation than in the transverse orientation due to randomized refractive index variability of the each of the plurality of relay elements such that the energy is localized in the transverse orientation. In another embodiment, randomized refractive index variability in the transverse orientation of the relay element, coupled with minimal refractive index variation in the longitudinal orientation of the relay element, may result in energy waves propagating through the relay element having substantially higher transport efficiency along the longitudinal orientation, and spatial localization along the transverse orientation.

When viewing a taper from above with a light source underneath, if placed with the minified end (energy source side) down, the ability to view the light source is decreased from off axis, and imaging data at the light source will quickly loose contrast off-axis until it is no longer visible. This is because the acceptance angle of the minified end is relaying the available light or image into a more collimated cone at an angle commensurate with the relay orientation thereby reducing the ability to view the light based upon the magnification ratio. For example, if a taper magnified end has an NA of 1 and is tapered 3:1, under perfect situations and with a light source emitting light +/−60 degrees, the 3:1 magnification will alter the ability to view the light source to a cone that is approximately +/−20 degrees and result in an effective NA of approximately 0.33. This is an approximation for exemplary purposes only.

Figure 37:
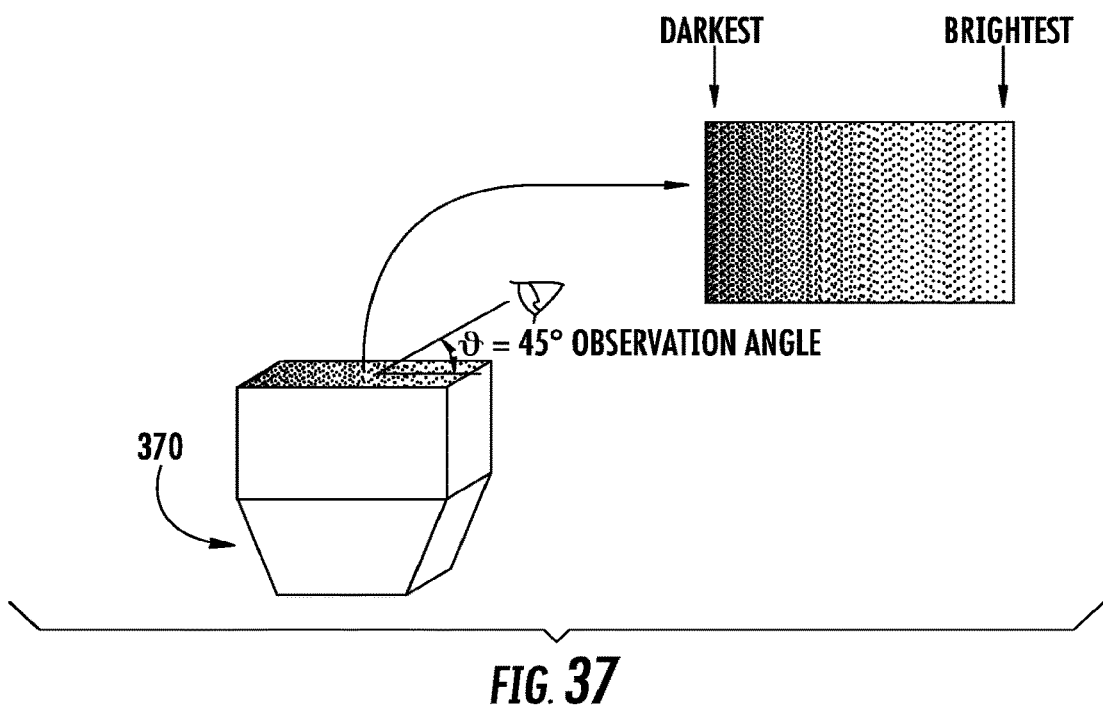
FIG. 37 illustrates the shading that an off-axis viewer will observe from light exiting the magnified end of a taper if the minified end is bonded to a display emitting a spatially uniform distribution of light.

FIG. 37 illustrates the shading that an off-axis viewer will observe from light exiting the magnified end of a taper 370 if the minified end is bonded to an energy source emitting a spatially uniform distribution of light. If the taper is placed in reverse, the opposite is possible where the field of view from the minified end is increased based upon the physics of the design and materials.

Figure 38:
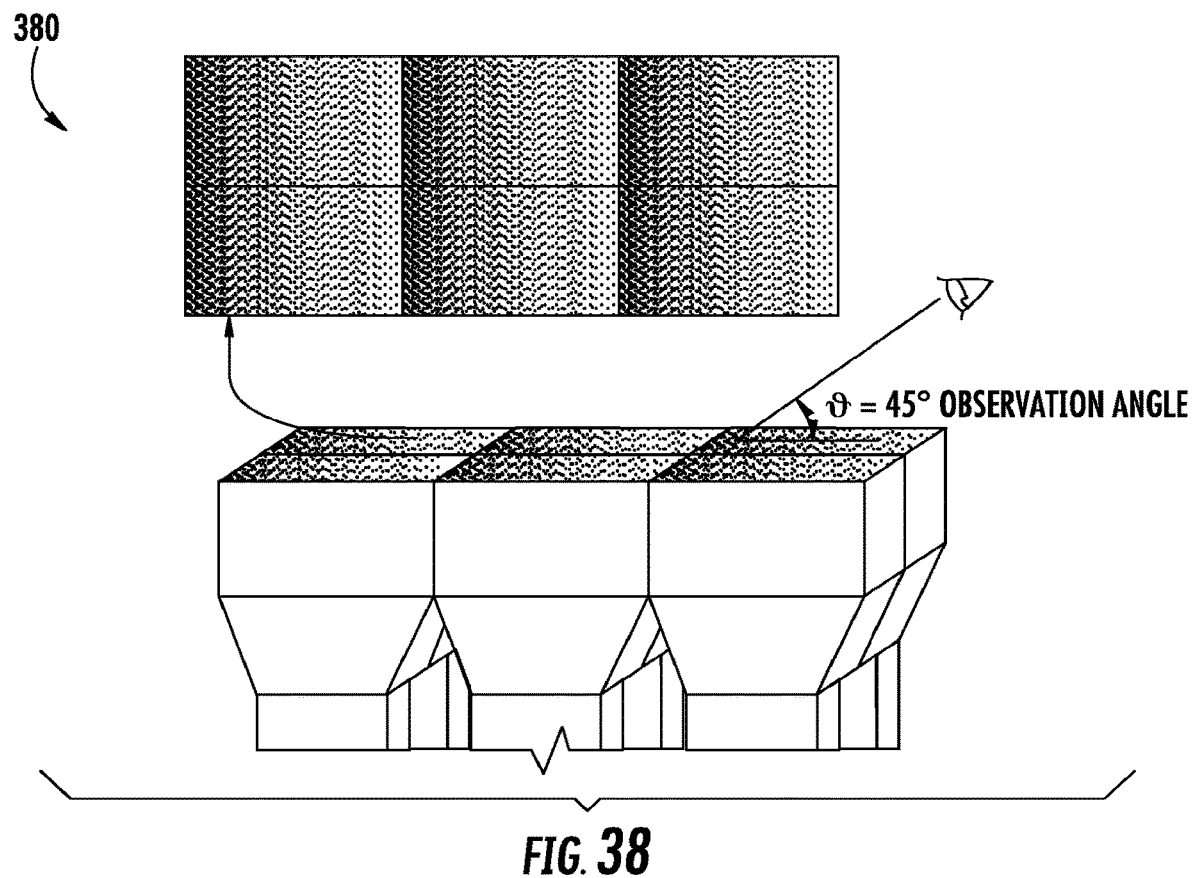
FIG. 38 illustrates the shading that an off-axis viewer will observe on a seamless output energy surface of an array of tapers, where the minified end of each taper is bonded to a display emitting a spatially uniform distribution of light.

FIG. 38 illustrates the shading that an off-axis viewer will observe on a seamless output energy surface of an array of tapers 380, where the minified end of each taper is bonded to an energy source emitting a spatially uniform distribution of light. The shading that occurs is a result of the positional dependence of the tilt in chief ray angle of the cone of light that exits across each individual optical relay surface. This means that the light output from the energy source is view dependent.

Generally speaking, the view dependence of light output from an energy source composed of an array of multiple tapers and/or other fiber elements is undesired feature for 2D energy source as well as a light field display.

Optical Relay for Field of View Extension

It may be possible to use additional relay elements to increase the viewing angle of any light source without introducing additional magnification.

Figure 39:
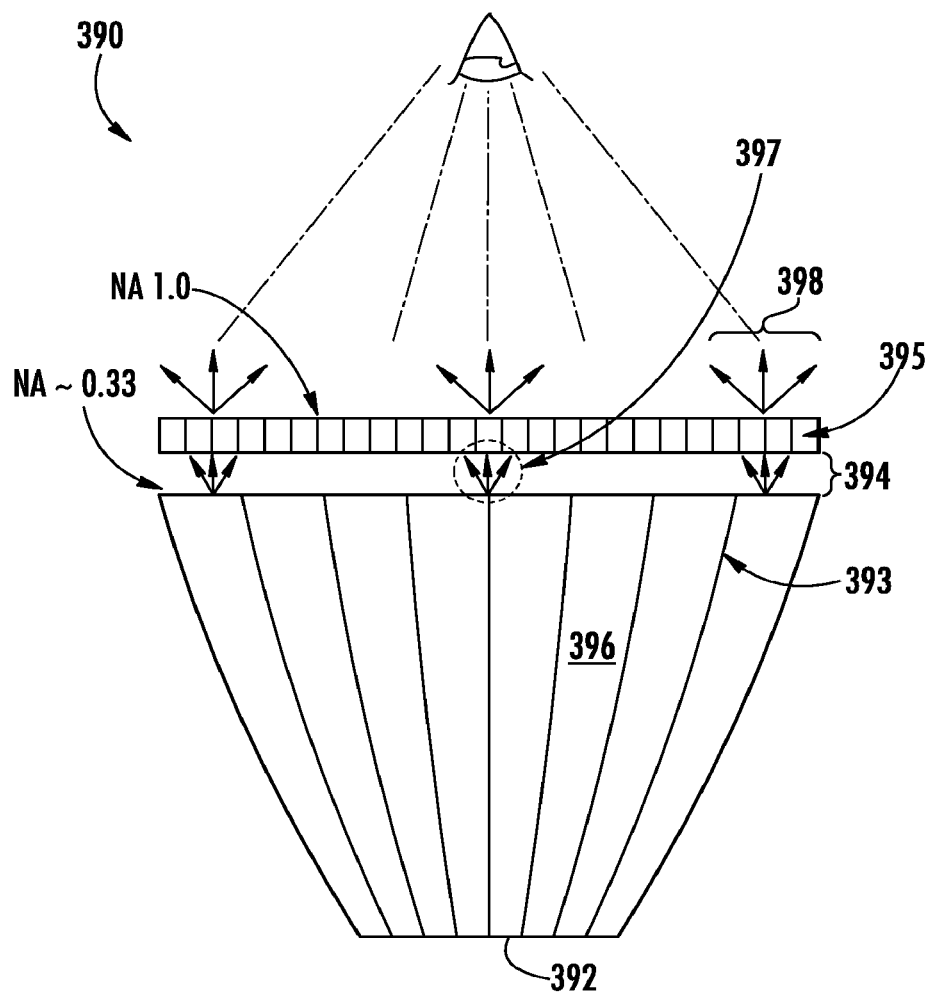
FIG. 39 illustrates an orthogonal view of an additional optical relay for field of view extension where an optical faceplate with a fine fiber pitch and higher NA exhibits an increase in uniformity and increased angle of view across an energy source surface, in accordance with one embodiment of the present disclosure.

FIG. 39 illustrates an orthogonal view of an additional optical relay for field of view extension wherein an optical faceplate with a fine pitch as small as several microns and a higher NA than the magnified end of the taper exhibits an increase in uniformity and increased angle of view across a display surface 390, in accordance with one embodiment of the present disclosure.

In such an embodiment, a design may consist of a tapered optical relay 396, and with an optical relay faceplate 395 placed several microns away from the magnified end of the taper, forming a small gap 394. This distance may be tuned depending on the desired effect, pitch of the faceplate fibers, bonding materials, faceplate materials, or other requirements of the optical design. The faceplate should have an NA larger than the effective NA of the exit of the taper. In FIG. 39, the path of light travels from the minified end of the tapered optical relay, 392, generally along the paths shown by lines 393, and to the display surface. When these conditions are met, the ray of light from the taper exits as a cone with a distribution of energy across the cone radius, forming a group of rays 397 that travel into a number of different small fibers contained within the faceplate with a higher acceptance angle of light, in such a way that each of the rays are now starting off-axis for each of the multiple faceplate fibers that they intersect, these off-axis faceplate fibers each generating an exit cone of its own 398, with rays exiting to the left of the optical center now also viewable to the right, and vice versa. Depending on the design, this implementation is able to achieve up to an exit of near the acceptance angle of the optical faceplate material, which is a significant increase in uniformity. However, the exit angle of the taper must maintain a relationship to the acceptance angle of the faceplate where rays of light exiting the taper must form a cone within the acceptance angle of the faceplate material in order for the rays of light to sufficiently form a more uniform distribution of the exit rays of light from the taper through the optical faceplate. A good rule of thumb is that the faceplate should have a NA of 2× the exit NA of the taper.

In one embodiment, a relay element, constructed with fiber optics, may be created to provide a taper with a 2:1 magnification ratio, a fiber pitch of 9 microns and a NA of 0.5 at the magnified end of the relay element. When light leaves the magnified end of the taper, light can only be viewed within, for example, approximately a +/−26.5 degree field of view due to the effective decrease of the exiting acceptance cone 397. An additional optical fiber faceplate with an NA of 1 and a fiber pitch of 3 microns may be placed with a 4.5 micron gap 394 above the surface of the taper, and the viewing angle may be increased to, for example, a +/−45 degree field of view 398. FIG. 39 illustrates this approach for the additional fiber optical relay for field of view extension.

In an additional embodiment, varied polishes are applied to either or both the energy source or the energy source surface or any other optical relay plane. Providing a rough polish acts to produce a ground-glass-like effect, thereby diffusing the image to address increased view angle distribution. This is at the cost of MTF depending on the amount of rough surface applied.

The disclosed embodiments are not limited to optical relays as this approach may be applicable to any other light-emitting sources as long as the pitch of the faceplate has higher density than the light emitting source and an NA with a large enough acceptance angle.

In one embodiment, the optical relay of FIG. 39 may be incorporated within a system with the relay element 396 having first and second different materials, the first and second materials being arranged in a substantially repeating internal structure in at least one of a transverse orientation and a longitudinal orientation such that the relay element has a higher transport efficiency in the longitudinal orientation versus the transverse orientation. In operation, energy is operable to be provided to a first end 392 of the relay element 396, the energy having a first resolution at the first end, where the first end 392 of the relay element 396 is configured to have a pitch of the substantially repeating internal structure in at least one of the transverse orientation and the longitudinal orientation, the pitch approximately equal to or less than the first resolution of the energy at the first end in the transverse orientation, and whereby the energy exiting a second end 394 of the relay element 396 has a second resolution, wherein the second resolution is no less than 50% of the first resolution. In another embodiment, the energy waves, while having a uniform profile when presented to the first surface, may pass through the second surface radiating in every direction with an energy density in the forward direction that substantially fills a cone with an opening angle of about +/−10 degrees relative to the normal to the second surface, irrespective of location on the second surface.

In another embodiment, the relay element 396 may include a third material different from the first and second materials, where the third material is arranged in a substantially repeating internal structure in at least one of the transverse orientation and the longitudinal orientation. In yet another embodiment, the relay element 396 may include a third material different from the first and second materials, where the third material is arranged in a substantially randomized internal structure in at least one of the transverse orientation and the longitudinal orientation.

In one embodiment, a center portion of the first end 392 of the relay element 396 may be configured to have an energy entry cone aligned substantially perpendicular to a first end surface of the relay element 396. In another embodiment, a center portion of the second end 394 of the relay element 396 may be configured to have an energy exit cone aligned substantially perpendicular to a second end surface of the relay element 396. In yet another embodiment, a center portion of the first end 392 of the relay element 396 may be configured to have an energy entry cone aligned non-perpendicular to a first end surface of the relay element 396, and where the first end 392 of the relay element 396 includes a non-planar end surface. In yet another embodiment, a center portion of the second end 394 of the relay element 396 may be configured to have an energy exit cone aligned non-perpendicular to a second end surface of the relay element 396, and where the second end 394 of the relay element 396 includes a non-planar end surface.

In one embodiment, the relay element includes a first region of an end surface and where the second end of the relay element includes a second region of the end surface. In another embodiment, each of the first and second ends of the relay element includes a plurality of discrete end portions.

In some embodiments, the relay element includes glass, carbon, optical fiber, optical film, plastic, polymer or mixtures thereof. In some embodiments, the relay element causes spatial magnification or spatial de-magnification of the energy.

In one embodiment, the relay element includes a stacked configuration having a plurality of faceplates. In some embodiments, the plurality of faceplates have different lengths, or are loose coherent optical relays.

In one embodiment, the relay element includes a sloped profile portion, where the sloped profile portion can be angled, linear, curved, tapered, faceted or aligned at a non-perpendicular angle relative to a normal axis of the relay element. In another embodiment, the energy is received from an energy source unit, the energy source unit having a mechanical envelope having a width different than the width of at least one of the first and the second ends of the relay element. In yet another embodiment, the mechanical envelope includes a projection system having a lens, and a plurality of energy source panels disposed adjacent to the lens, the plurality of energy source panels being planar, non-planar or combinations thereof.

In one embodiment, the plurality of energy source panels are arranged in various configurations including at least one of tilted, aligned at an angle, staggered, on-axis, off-axis, rotated, parallel, perpendicular, or any combinations thereof. In another embodiment, the plurality of energy source panels are arranged in a radially-symmetrical configuration. In some embodiments, the projection system includes focused energy transmission through a waveguide, and further includes a telecentric lens relay element at an off-aligned angle.

In one embodiment, the system further includes a curved energy source between the relay element and the projection system. In some embodiments, the first and second ends of the relay element are both planar, or the first and second ends of the relay element are both non-planar, or the first end of the relay element is non-planar and the second end of the relay element is planar, or the first end of the relay element is non-planar and the second end of the relay element is non-planar.

In some embodiments, the first and second ends of the relay element are both concave, or the first end of the relay element is concave and the second end of the relay element is convex, or the first end of the relay element is convex and the second end of the relay element is concave, or the first and second ends of the relay element are both convex.

In one embodiment, at least one of the first and second ends of the relay element is concave. In another embodiment, at least one of the first and second ends of the relay element is convex.

Figure 40:
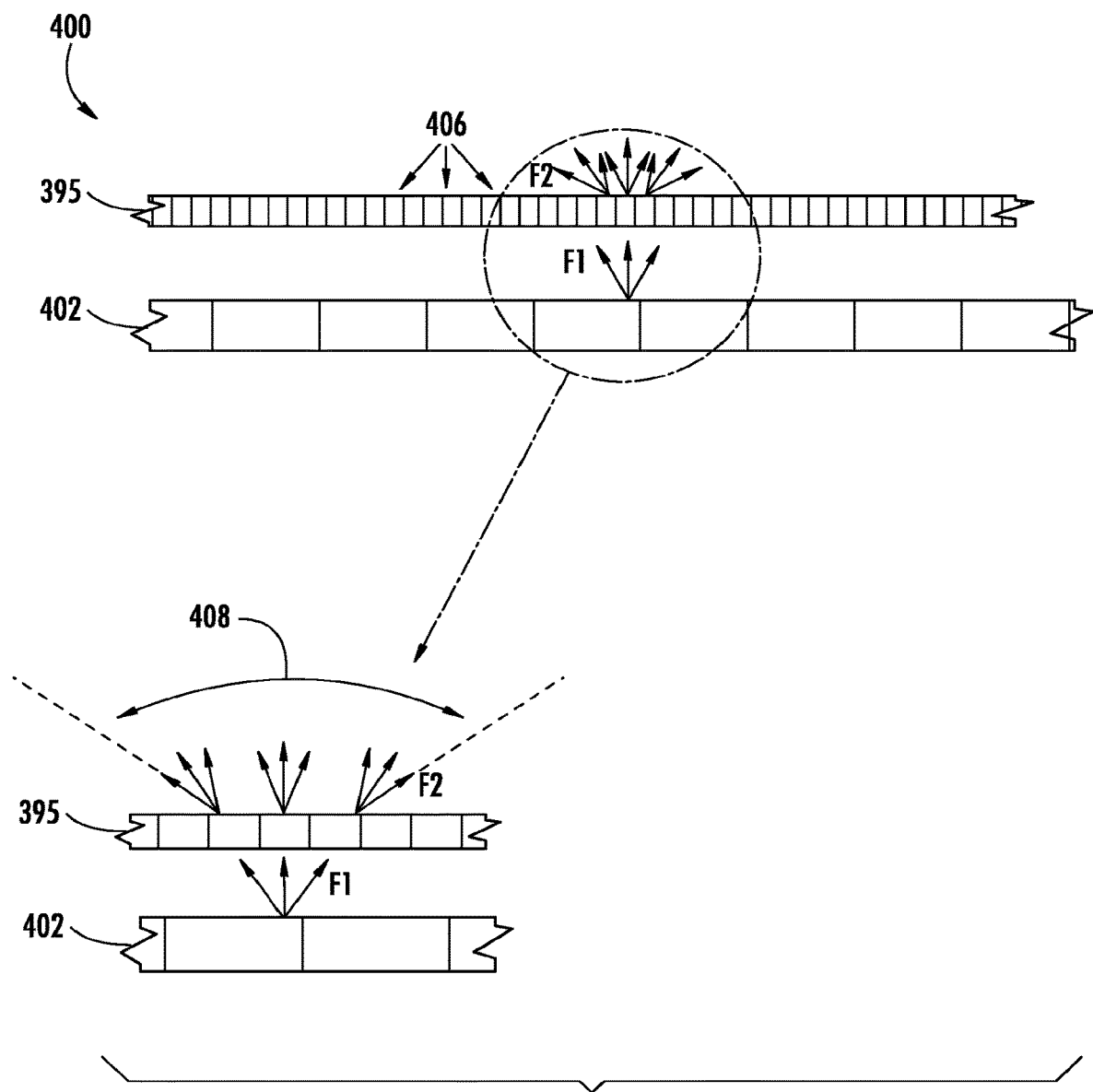
FIG. 40 illustrates an orthogonal view of the applicability of the design from FIG. 39 for a traditional display to increase the effective angle of view without any other optical elements other than the field of view extending optical faceplate, in accordance with one embodiment of the present disclosure.

FIG. 40 illustrates an orthogonal view 400 of the applicability of the design from FIG. 39 for a traditional energy source to increase the effective angle of view without any other optical elements other than the field of view extending optical faceplate relay 395, in accordance with one embodiment of the present disclosure. FIG. 40 illustrates the applicability of this design for a traditional backlight LCD, but can also be applied to projection, other energy source types and a myriad of other uses. In FIG. 40, the structure 402 represents the pixel pitch of the traditional display, while the individual fibers 406 of the optical faceplate relay have a substantially smaller pitch. The angle of emission of the light rays F2 from the faceplate form a wider field of view 408 than the rays F1 from the display alone.

In one embodiment, an energy source system 400 may include a plurality of energy source units 402 configured to provide an energy surface, the plurality of energy source units having a first pitch, a plurality of relay elements 406 disposed adjacent to an energy source, the plurality of relay elements 406 having a second pitch, the second pitch smaller than the first pitch, where a first energy source unit of the plurality of energy source units is configured to have a first field of view F1 defined by an angular extent of energy propagation paths through the first energy source unit 402, and where a subset of the plurality of relay elements disposed in the energy propagation paths are configured to redistribute the energy propagation paths such that the angular extent of the energy propagation paths through the subset of the plurality of relay elements 404 have a second field of view F2 wider than the first field of view.

In one embodiment, each of energy source unit 402 of the plurality of energy source units 402 may be a pixel. In another embodiment, each energy source unit 402 of the plurality of energy source units 402 may be a tapered relay element. In some embodiments, the energy propagation paths are light paths. In other embodiments, the energy source is provided on a surface of the plurality of energy source units 402.

In one embodiment, the surface on which the energy source is provided on is a virtual surface, where the virtual surface is a surface configured to receive energy relayed from the plurality of energy source units.

In some embodiments, the plurality of relay elements 404 include faceplates and optical fibers. In other embodiments, each of the plurality of relay elements 404 is operable to redistribute the energy through the energy propagation paths with higher transport efficiency in the longitudinal orientation than in the transverse orientation due to randomized refractive index variability of the each of the plurality of relay elements such that the energy is localized in the transverse orientation.

It should be noted that transverse Anderson localization techniques may be leveraged to produce the optical faceplate for the same effect. While the principle of the material does not have an explicit fiber pitch, the NA value and random distribution of the material within the taper, in the planar coordinate has a similar effect of providing increased uniformity of a ray of light upon exit.

For the avoidance of doubt, nothing in the present disclosure should be interpreted as a limitation of scope of a design that incorporates a source of light and an optical relay element that provides increased uniformity across the acceptance cone of the material.

Relay Waveguide Array Design

Figure 41:
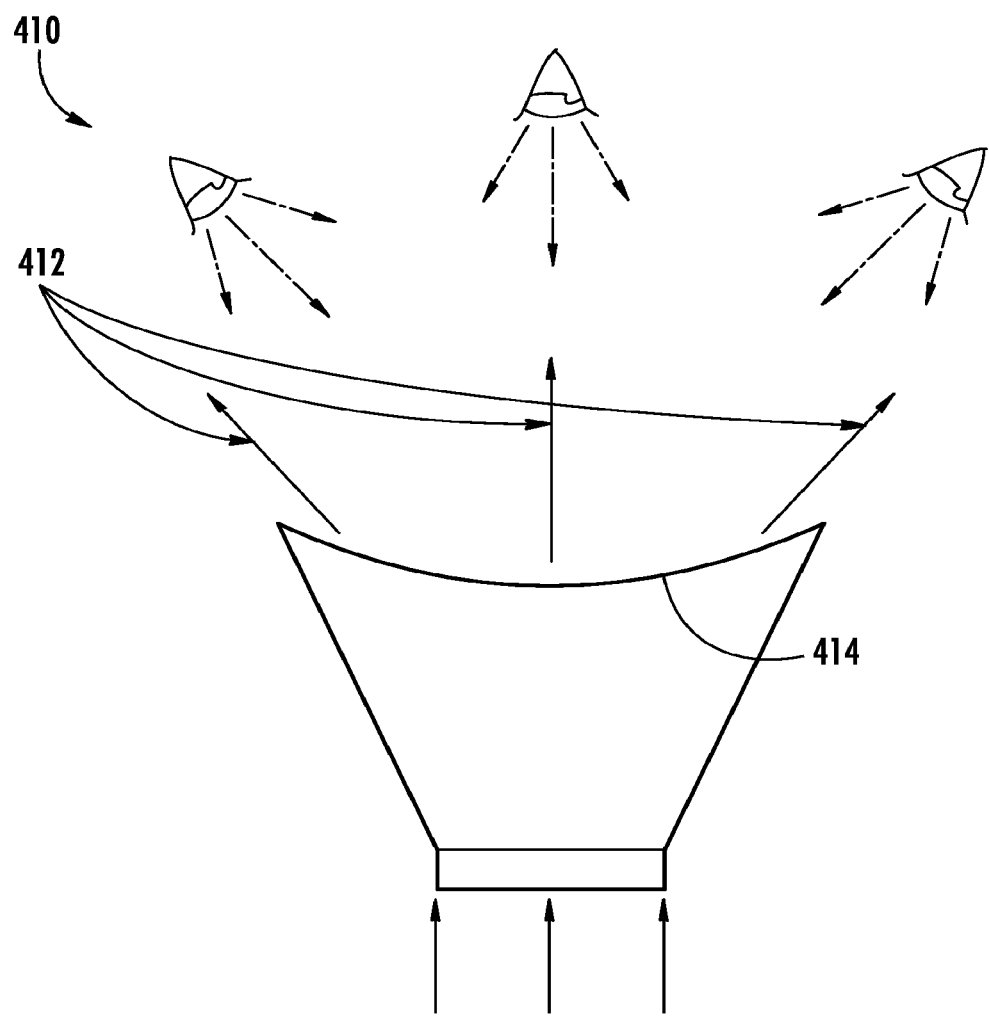
FIG. 41 illustrates an orthogonal view of the chief ray angles emitted from the magnified end of a single taper with a polished non-planar surface and controlled magnification, in accordance with one embodiment of the present disclosure.
Figure 42:
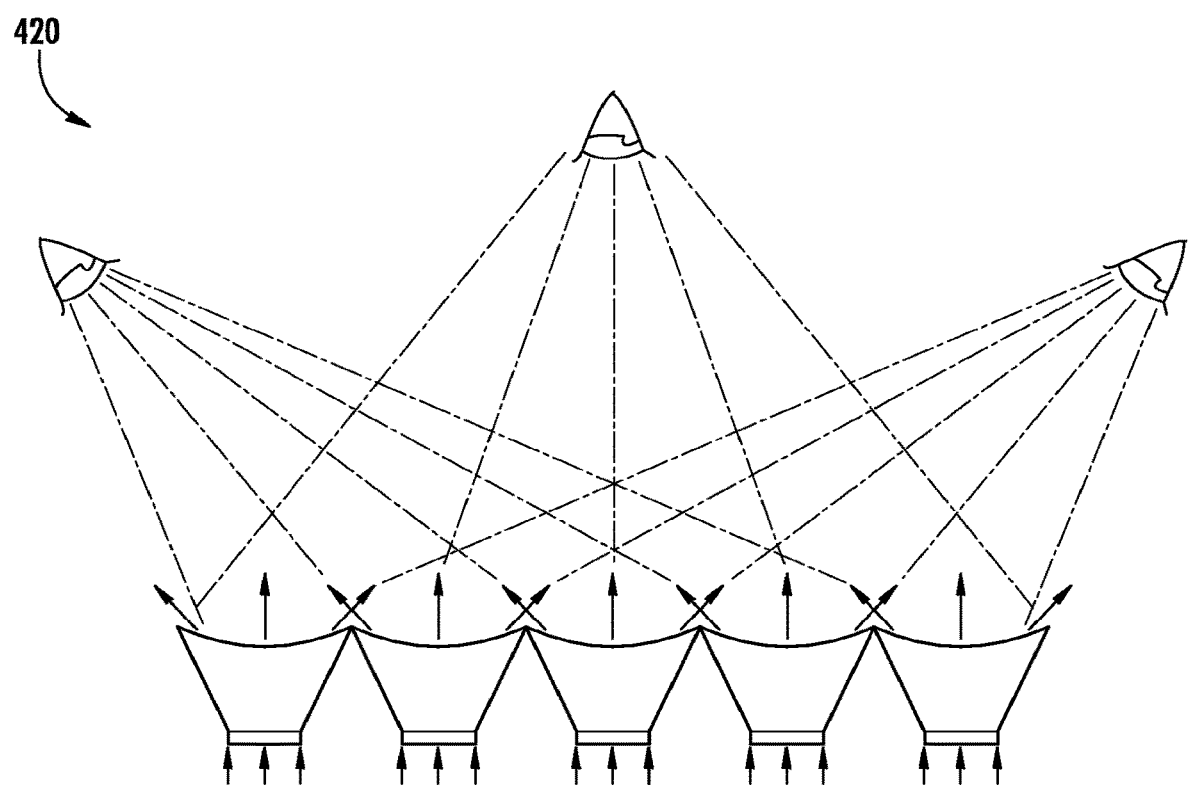
FIG. 42 illustrates an orthogonal view an array of tapers can control the overall light that is presented in space through the surface and magnification design of a taper, in accordance with one embodiment of the present disclosure.

FIG. 41 illustrates an orthogonal view 410 of the chief energy ray angles 412 emitted from the magnified end of a single tapered energy relay with a polished non-planar surface 414 and controlled magnification, in accordance with one embodiment of the present disclosure. FIG. 42 illustrates an orthogonal view of how an entire array 420 of the tapers shown in FIG. 41 can control the energy distribution that is presented in space through the detailed design of the tapered energy relay surface and magnification.

It is possible to polish the energy surface made from one taper of a mosaic of tapered energy relays in a rounded form based upon the angle of desired exit and the design of the material. This way, it is possible to directly control the direction of projected energy based upon the surface characteristics as well as the magnification of the material, even without using separate energy waveguide elements. The manufacturing process for tapers created in a polymer medium can include a molding process to generate an appropriate energy waveguide array surface that performs the full function of a waveguide array, or merely functions to augment the performance of a separate energy waveguide array.

It is also possible to create an entire array of tapered energy relays, where the tapers are the same size, or some amount larger or smaller, than the single elements of an energy waveguide array. However, this requires each taper to effectively represent N or some collection of N regions, and results in far more individual energy source components, and alignment becomes extremely challenging given the number of fixtures that would be involved.

Optical Ribbons, Energy Combiners, and
Simultaneous Energy Projection and Sensing
Through a Single Bidirectional Energy Surface While the embodiments discussed previously illustrate how to generate a contiguous infinite resolution display surface, it is also possible to split each tapered optical relay path into a second interlaced path with an optical ribbon or an energy combiner. An energy combiner is a method to produce a single energy surface with interlaced relay elements that split into two or more independent paths. While this can be used to effectively increase resolution, it can also be leveraged to source an energy wave while simultaneously sensing that energy wave.

Figure 43:
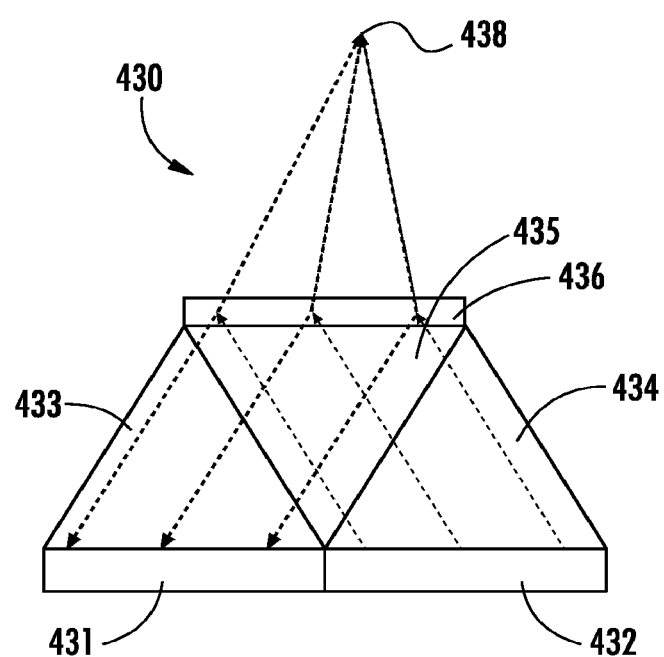
FIG. 43 illustrates an orthogonal view of a design of a single relay element in a system having an energy source which is connected to one leg of an interlaced relay element, an energy sensor connected to the other leg of an interlaced relay element, where the relay element includes each of the two legs as well as the interleaved single energy surface, in accordance with one embodiment of the present disclosure.

FIG. 43 illustrates an orthogonal view of a design of a single element 430 in this system consisting of an energy source 432 which is connected to one leg 434 of an interlaced relay element, an energy sensor 431 connected to the other leg 433 of an interlaced relay element, where the relay element is composed of each of the two legs 433, 434 as well as the interleaved single energy surface formed by 435. In FIG. 43, an energy waveguide array 436 is also shown, despite the fact that it is not part of the relay element, functioning to steer the outgoing energy waves to a convergence point 438, and simultaneously steer the incoming energy waves to the energy sensor. In one embodiment, an emissive display is used as the energy source, and an imaging sensor is used to detect the light from the display. FIG. 43 illustrates the design of a single relay element in this system consisting of one bidirectional energy surface, one interlaced segment to propagate energy, and a second interlaced segment to receive energy at the energy surface. In this fashion, this may be repeated for every energy relay module in the system to produce a bidirectional energy surface.

Through this approach, with just the single relay element and no energy waveguide array, it is possible to optically scan in real time with a high degree of accuracy a finger print(s) or any other object that touches the surface of the display like papers, documents, etc. Through an inverse calibration process, it is possible to correct for all optical artifacts and generate extremely high-quality resolution.

In another embodiment, this methodology for image capture with the image combiner provides the ability to generate an extremely accurate "white board" or artistic surface that can respond extremely accurately to location and interactively draw or perform any number of other display based functions.

An additional embodiment provides the ability to leverage this approach with an energy waveguide away incorporated, as shown in FIG. 43. In an embodiment for electromagnetic energy, by using the triangulation provided by the array waveguide elements, it is possible to determine the spatial location of objects in the environment with a relatively high degree of accuracy. This is more accurate for objects that are close, and moving objects with a relative transmission amount will have a high degree of success when determining the spatial location of the multiple subjects interacting with the environment without use of other active scanning techniques. In another embodiment for acoustic energy, it is possible to transmit and absorb sound waves in such a way to project and detect mechanical pressure differences.

For the avoidance of doubt, all optical technologies may be glass, plastic, disordered, coherent, exhibit transverse Anderson localization, or other optical or other relay technology. Further, nothing in the provided diagram should imply, limit, dictate, omit, require or otherwise any singular implementation or combination of the technology. Further, the design provided is in conceptual form and not to scale.

Various components within the architecture may be mounted in a number of configurations to include, but not limited to, wall mounting, table mounting, head mounting, or other appropriate implementation of the technology.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention (s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A device comprising:
   a structure formed of at least first and second component engineered structures, the structure having a first surface and a second surface;
   wherein the first surface has a surface area different than the second surface;
   wherein energy waves propagating between the first surface and the second surface travel substantially parallel to a first direction due to a substantially higher transport efficiency in the first direction than in a second direction;
   wherein the first surface having a first acceptance cone of a first angle and the second surface having a second acceptance cone of a second angle, the first and second angles being relative to the first direction and the first angle being different from the second angle;
   wherein the energy waves propagate between the first surface and the second surface through both the first component engineered structure and the second component engineered structure; and
   wherein the substantially higher transport efficiency in the first direction is provided, at least in part, by wave interference limiting the propagation of energy waves in the second direction.

2. The device of claim 1, wherein the energy waves passing through the first surface has a first resolution, wherein the energy waves passing through the second surface has a second resolution, and wherein the second resolution is no less than about 50% of the first resolution.

3. The device of claim 1, wherein the structure includes a plurality of elements in a stacked configuration in the first direction, wherein a first element of the plurality of elements includes the first surface and wherein a second element of the plurality of elements includes the second surface.

4. The device of claim 3, wherein the first element causes either spatial magnification or spatial de-magnification of the energy waves, and the second element causes either spatial magnification or special de-magnification of the energy waves.

5. The device of claim 3, wherein the plurality of elements in the stacked configuration includes a plurality of faceplates.

6. The device of claim 5, wherein the plurality of faceplates are loose coherent optical relays.

7. The device of claim 1, wherein the structure comprises more refractive index variability in the first direction such that the energy waves are spatially localized in the second direction.

8. The device of claim 1, wherein the first surface is configured to receive the energy waves from an energy source unit, the energy source unit comprising a mechanical envelope having a width different than the width of at least one of the first surface and the second surface.

9. The device of claim 8, wherein the mechanical envelope includes a projection system having a lens, and a plurality of energy source panels disposed adjacent to the lens, the plurality of energy source panels being planar, non-planar or combinations thereof.

10. The device of claim 9, wherein the plurality of energy source panels are arranged in various configurations including at least one of tilted, aligned at an angle, staggered, on-axis, off-axis, rotated, parallel, perpendicular, or any combinations thereof.

11. The device of claim 9, wherein the plurality of energy source panels are arranged in a radially-symmetrical configuration.

12. The device of claim 9, wherein the projection system includes focused energy transmission through a waveguide, and further comprises a telecentric lens relay element at an off-aligned angle.

13. The device of claim 1, wherein the first surface is either planar or non-planar, and the second surface is either planar or non-planar.

14. A method comprising:
    providing a structure formed of at least a first component engineered structure and a second component engineered structure, the structure having a first surface and a second surface, wherein the first surface has a surface area different than the second surface;
    propagating energy waves between the first surface and the second surface of the structure through both the first component engineered structure and the second component engineered structure, wherein the energy waves propagated therethrough travel substantially parallel to a first direction due to the structure having a substantially higher transport efficiency in the first direction than in a second direction;
    wherein the first surface having a first acceptance cone of a first angle and the second surface having a second acceptance cone of a second angle, the first and second angles being relative to the first direction and the first angle being different from the second angle; and
    wherein the substantially higher transport efficiency in the first direction is provided, at least in part, by wave interference limiting the propagation of energy waves in the second direction.

15. The method of claim 14, wherein the energy waves passing through the first surface has a first resolution, wherein the energy waves passing through the second surface has a second resolution, and wherein the second resolution is no less than about 50% of the first resolution.

16. The method of claim 14, wherein the structure comprises more refractive index variability in the second direction than in the first direction such that the energy waves are spatially localized in the second direction.

17. The method of claim 14, further comprising:
    stacking a plurality of elements of the structure in a stacked configuration in the first direction, wherein a first element of the plurality of elements includes the first surface and a second element of the plurality of elements includes the second surface.

18. The method of claim 17, further comprising:
    applying either spatial magnification or spatial de-magnification of the energy waves with the first element; and applying either spatial magnification or spatial de-magnification of the energy waves with the second element.

19. The method of claim 18, wherein the plurality of elements in the stacked configuration includes a plurality of faceplates.

20. The method of claim 19, wherein the plurality of faceplates are loose coherent optical relays.

\* \* \* \* \*